US011753040B1

(12) United States Patent
Gammelgard et al.

(10) Patent No.: US 11,753,040 B1
(45) Date of Patent: Sep. 12, 2023

(54) AUTONOMOUS VEHICLE DELIVERY

(71) Applicant: STATE FARM MUTUAL AUTOMOBILE INSURANCE COMPANY, Bloomington, IL (US)

(72) Inventors: Ryan Gammelgard, Bloomington, IL (US); Justin Davis, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 163 days.

(21) Appl. No.: 17/208,724

(22) Filed: Mar. 22, 2021

Related U.S. Application Data

(60) Provisional application No. 63/159,772, filed on Mar. 11, 2021, provisional application No. 63/158,968, filed on Mar. 10, 2021.

(51) Int. Cl.
| | |
|---|---|
| *B60W 60/00* | (2020.01) |
| *G05D 1/02* | (2020.01) |
| *G01C 21/34* | (2006.01) |
| *G05D 1/00* | (2006.01) |
| *B64U 10/13* | (2023.01) |
| *G06Q 50/28* | (2012.01) |
| *G06Q 10/0631* | (2023.01) |
| *G06Q 10/047* | (2023.01) |

(Continued)

(52) U.S. Cl.
CPC ... *B60W 60/00256* (2020.02); *G01C 21/3407* (2013.01); *G05D 1/0016* (2013.01); *G05D 1/0212* (2013.01); *G05D 1/0287* (2013.01); *G06Q 10/047* (2013.01); *G06Q 10/06315* (2013.01); *G06Q 50/28* (2013.01); *B60W 2540/21* (2020.02); *B64U 10/13* (2023.01); *B64U 2101/60* (2023.01); *G10L 15/22* (2013.01)

(58) Field of Classification Search
CPC ........ B60W 60/00256; B60W 2540/21; G01C 21/3407; G05D 1/0016; G05D 1/0212; G05D 1/0287; G06Q 10/047; G06Q 10/06315; G06Q 50/28; B64U 10/13; B64U 2101/60; G10L 15/22
See application file for complete search history.

(56) References Cited

U.S. PATENT DOCUMENTS

| | | | |
|---|---|---|---|
| 4,787,205 A | 11/1988 | Fontaine | |
| 9,311,271 B2 | 4/2016 | Wright | |
| 9,459,620 B1 * | 10/2016 | Schaffalitzky | ........... B64D 1/12 |

(Continued)

OTHER PUBLICATIONS

Non-final Office Action, U.S. Appl. No. 17/734,275, dated Oct. 25, 2022.

(Continued)

*Primary Examiner* — Anne Marie Antonucci
*Assistant Examiner* — Jingli Wang
(74) *Attorney, Agent, or Firm* — MARSHALL, GERSTEIN & BORUN LLP

(57) ABSTRACT

Autonomous vehicle methods and systems are described herein for communicating with an autonomous or semi-autonomous vehicle to remotely control operation of the vehicle, to detect and remove unauthorized passengers, to deliver loads, to receive registration information for the vehicle, to provide accessibility information to the vehicle, and/or to receive sensor or other environmental data to integrate with an electronic game or other extended reality experience.

20 Claims, 30 Drawing Sheets

(51) Int. Cl.
*G10L 15/22* (2006.01)
*B64U 101/60* (2023.01)

(56) References Cited

U.S. PATENT DOCUMENTS

| | | |
|---|---|---|
| 9,633,487 B2 | 4/2017 | Wright |
| 10,185,327 B1 | 1/2019 | Konrardy et al. |
| 10,192,369 B2 | 1/2019 | Wright |
| 10,198,879 B2 | 2/2019 | Wright |
| 10,324,463 B1 | 6/2019 | Konrardy et al. |
| 10,386,192 B1 | 8/2019 | Konrardy et al. |
| 10,810,504 B1 | 10/2020 | Fields et al. |
| 10,831,204 B1 | 11/2020 | Fields et al. |
| 11,441,916 B1 | 9/2022 | Konrardy et al. |
| 2005/0248444 A1 | 11/2005 | Joao |
| 2014/0156157 A1 | 6/2014 | Johnson et al. |
| 2014/0297061 A1 | 10/2014 | Takahashi |
| 2014/0343758 A1 | 11/2014 | Kraimer et al. |
| 2015/0091740 A1 | 4/2015 | Bai et al. |
| 2016/0116293 A1 | 4/2016 | Grover et al. |
| 2017/0316696 A1 | 11/2017 | Bartel |
| 2018/0086261 A1 | 3/2018 | Sugimoto et al. |
| 2018/0291575 A1 | 10/2018 | Roe, Jr. et al. |
| 2019/0012636 A1* | 1/2019 | Simon .................. G08G 7/00 |
| 2019/0149956 A1 | 5/2019 | Chiang et al. |
| 2020/0064141 A1 | 2/2020 | Bell et al. |
| 2020/0114871 A1 | 4/2020 | Kicinski et al. |
| 2020/0117217 A1* | 4/2020 | Yuzawa .......... B60W 60/00256 |
| 2020/0185112 A1 | 6/2020 | Aso et al. |
| 2021/0101563 A1 | 4/2021 | Azarko |
| 2021/0109538 A1 | 4/2021 | Graefe et al. |
| 2021/0155264 A1 | 5/2021 | MacPherson et al. |
| 2022/0108228 A1 | 4/2022 | Salter et al. |
| 2022/0126748 A1 | 4/2022 | Diamond et al. |
| 2022/0176999 A1 | 6/2022 | Golgiri et al. |
| 2022/0219605 A1 | 7/2022 | Mitsui et al. |
| 2022/0230081 A1 | 7/2022 | Goldman-Shenhar |
| 2022/0244736 A1 | 8/2022 | Konrardy et al. |
| 2022/0283582 A1 | 9/2022 | Crinklaw et al. |

OTHER PUBLICATIONS

Non-final Office Action, U.S. Appl. No. 17/208,790, dated Dec. 29, 2022.
Non-final Office Action, U.S. Appl. No. 17/208,778, dated Dec. 14, 2022.
Non-final Office Action, U.S. Appl. No. 17/208,770 dated Nov. 9, 2022.
Final Office Action, U.S. Appl. No. 17/208,770 dated Apr. 6, 2023.
U.S. Appl. No. 17/208,755, Nonfinal Office Action, dated Jun. 22, 2023.
U.S. Appl. No. 17/208,778, Final Office Action, dated Jun. 9, 2023.
U.S. Appl. No. 17/734,275, Final Office Action, dated Apr. 26, 2023.
U.S. Appl. No. 17/208,770, Nonfinal Office Action, dated Jul. 17, 2023.

* cited by examiner

AUTONOMOUS VEHICLE DELIVERY

CROSS-REFERENCE TO RELATED APPLICATIONS

This application claims priority to and the benefit of the filing date of (1) provisional U.S. Patent Application No. 63/158,968 entitled "Autonomous Vehicle Services and Operations," filed on Mar. 10, 2021, and (2) provisional U.S. Patent Application No. 63/159,772 entitled "Autonomous Vehicle Services and Operations," filed on Mar. 11, 2021, the entire contents of each of which is hereby expressly incorporated herein by reference.

FIELD

The present disclosure generally relates to autonomous vehicles, and more specifically, systems and methods for communicating with an autonomous or semi-autonomous vehicle to remotely control operation of the vehicle, to detect and remove unauthorized passengers, to deliver loads, to receive registration information for the vehicle, to provide accessibility information to the vehicle, to receive sensor or other environmental data to integrate with an electronic game or other extended reality experience, etc.

BACKGROUND

Conventional vehicles are typically operated by a human vehicle operator who controls both steering and motive controls. Operator error, inattention, inexperience, misuse, and/or distraction may lead to numerous vehicle collisions each year, resulting in injury and damage.

More recently, autonomous or semi-autonomous vehicles augment vehicle operators' information or replace vehicle operators' control commands to operate the vehicle, in whole or part, with computer systems based upon information from sensors within, or attached to, the vehicle. Such vehicles may be operated with or without passengers, thus requiring different means of control than traditional vehicles. Newer vehicles may also include a plurality of advanced sensors, capable of providing significantly more data (both in type and quantity) than is available even from GPS navigation assistance systems installed in traditional vehicles.

Ensuring safe operation of such autonomous or semi-autonomous vehicles is of the utmost importance because the automated systems of these vehicles may not function properly in all environments. Although autonomous operation may be safer than manual operation under ordinary driving conditions, unusual or irregular environmental conditions may significantly impair the functioning of the autonomous operation features controlling the autonomous vehicle. Under some conditions, autonomous operation may become impractical or excessively dangerous. As an example, fog or heavy rain may greatly reduce the ability of autonomous operation features to safely control the vehicle. Additionally, damage or other impairment of sensors or other components of autonomous systems may significantly increase the risks associated with autonomous operation. Such conditions may change frequently, thereby changing the safety of autonomous vehicle operation.

In some scenarios, an autonomous or semi-autonomous vehicle may switch from an autonomous mode to a manual mode, such as when there is a software or hardware malfunction and the vehicle is unable to perform autonomously. In these scenarios it is important that a human operator is ready and available to take control of the vehicle. Thus, it may be desirable to have a mechanism to keep human operators engaged during autonomous operation of the vehicle so that they are prepared if they have to take over.

Additionally, when a manually operated vehicle encounters law enforcement or another governmental entity (e.g., during a car crash, when the vehicle is pulled over, etc.), a human operator provides registration information and/or other vehicle information to law enforcement or the other governmental entity. However, this information may be more difficult to obtain from an autonomous vehicle, particularly if there is not a human operator within the vehicle.

Furthermore, manually operated vehicles and/or drones may deliver loads, such as packages, from shipping locations to recipient locations. In some scenarios, manually operated vehicles deliver several loads in the same trip when each load is going to the same location or geographic area. The manually operated vehicles may travel from one centrally located transportation hub to another transportation hub. Then additional vehicles may obtain the loads from the centrally located transportation hub and drop them off at the recipient locations. However, there may be inefficiencies when a load is scheduled for delivery just after a shipping vehicle has left the shipping location and began its daily route, or when a recipient location for a load is more than a threshold distance from each of the transportation hubs. Additionally, in the scenarios where an autonomous or semi-autonomous vehicle delivers a load, the autonomous or semi-autonomous vehicle may not be able to deliver the load directly to a recipient's doorstep. Accordingly, this process may require at least some manual operation.

Moreover, in some scenarios, an autonomous or semi-autonomous vehicle may malfunction or behave erratically. While the vehicles may have controls for a human to take over operation of the vehicle from within, there is no mechanism to take control of the vehicle when there are no passengers within the vehicle or the passengers are unable to operate a vehicle (e.g., the passengers are under the legal driving age, do not have a driver's license, are inebriated or incapacitated for any other reason, etc.).

Still further, an autonomous or semi-autonomous vehicle may pick up multiple passengers at various pickup locations and transport them to respective destination locations. In some scenarios, an unauthorized passenger may enter the vehicle or an authorized passenger may perform certain acts which may cause their authorization to be within the vehicle to be revoked (e.g., by damaging property within the vehicle, fighting with other passengers, lighting a fire within the vehicle, etc.). It may be desirable to have a mechanism to remove such passengers from the vehicle.

Also, in some scenarios, a person with a disability may request transportation via an autonomous or semi-autonomous vehicle. In the case of a manually operated vehicle, a human operator or other passenger may help the person into and out of the vehicle. However, an autonomous or semi-autonomous vehicle may not have any other human operators or passengers to help the person with the disability into the vehicle, direct the person into her seat, and/or help her out of the vehicle. Existing techniques and solutions may have additional or alternative drawbacks as well.

BRIEF SUMMARY

The present embodiments may be related to, inter alia, autonomous or semi-autonomous vehicle operation, including driverless operation of fully autonomous vehicles. The embodiments described herein relate particularly to various aspects of communication between autonomous operation features, components, and software. Specific systems and methods are summarized below. The methods and systems summarized below may include additional, less, or alternate actions, including those discussed elsewhere herein.

In one aspect, a computer-implemented method for disabling a vehicle having one or more autonomous operation features may be provided. The method may include: (1) receiving, at one or more processors (and/or associated transceivers) in a vehicle having one or more autonomous operation features, a communication from a remote entity; (2) analyzing, at the one or more processors of the vehicle, the communication to determine that the communication comprises instructions to disable the vehicle; (3) authenticating, at the one or more processors of the vehicle, the instructions by determining that the remote entity is authorized to disable the vehicle; and/or (4) causing, by the one or more processors of the vehicle, the vehicle to become disabled based upon the communication and the authentication. The method may include additional, less, or alternate actions and functionality, including that discussed elsewhere herein.

For instance, the remote entity may include an infrastructure component having one or more processors; the one or more processors of the infrastructure component may determine that the vehicle is going to collide with the infrastructure component; and/or the communication may further include time and distance stopping information required to stop the vehicle before the vehicle collides with the infrastructure component. Additionally or alternatively, the remote entity may be a law enforcement agency; and/or the communication may further include information indicating that the vehicle has not complied with a government regulation. Additionally or alternatively, the remote entity may be an automobile manufacturer or an automobile parts manufacturer; and/or the communication may further include information indicating that an automobile part of the vehicle makes the vehicle dangerous to operate.

In some embodiments, the remote entity may be the automobile manufacturer or the automobile parts manufacturer; and/or the method may further include: with one or more processors (and/or associated transceivers) of the remote entity: (i) determining that the vehicle has been modified to include a faulty component, and (ii) communicating the determination to an insurance agency to allow the insurance agency to modify or cancel an insurance policy of the vehicle.

In some embodiments, prior to the receiving the communication: one or more processors of the remote entity determine that the vehicle should be disabled because the vehicle is malfunctioning, or driving erratically. Additionally or alternatively, the causing of the vehicle to become disabled may include: ceasing to supply power to a component of an engine of the vehicle; and/or applying brakes of the vehicle. Additionally or alternatively, the causing of the vehicle to become disabled may further include: preventing the vehicle from operating in a manual mode; and/or locking at least one door of the vehicle from an inside of the vehicle and an outside of the vehicle.

In some embodiments, the causing of the vehicle to become disabled may further include: locking at least one door of the vehicle from an outside of the vehicle; ceasing to supply power to a component of the vehicle; and/or applying brakes of the vehicle.

The method may further include: determining, at the one or more processors of the vehicle, that other vehicles should be shut down based upon the analysis of the communication; and/or communicating, via the one or more processors of the vehicle, the determination that other vehicles should be shut down to at least one other vehicle. The method may further include: determining, by one or more processors of the remote entity, that the vehicle has: (i) entered an area that the vehicle is not authorized to enter, or (ii) is on a course to enter the area that the vehicle is not authorized to enter; and/or in response to the determination by the one or more processors of the remote entity, sending, by the one or more processors of the remote entity, the communication to the one or more processors of the vehicle. The method may further include: determining, by the one or more processors of the remote entity, that the vehicle is on course to enter either an accident area or a construction area; and/or the instructions to disable the vehicle may include instructions to disable the vehicle to prevent the vehicle from entering either the accident area or the construction area.

In another aspect, a computer-implemented method for causing a vehicle having one or more autonomous operation features to assist a person with a disability may be provided. The method may include: (1) receiving, at one or more processors (and/or associated transceivers) of a vehicle having one or more autonomous operation features, an instruction to provide service to a person; (2) detecting, by one or more processors of the vehicle, that the person has a disability; (3) determining, by the one or more processors, a type of the disability, wherein the type of the disability may be: (i) a mobility impairment, (ii) a vision impairment, and/or (iii) a hearing impairment; and/or (4) transmitting, by the one or more processors, a control signal to adjust at least one component of the vehicle based upon the type of the disability. The method may include additional, less, or alternate actions and functionality, including that discussed elsewhere herein.

For instance, when the type of disability comprises the mobility impairment, the adjusting at least one component of the vehicle may include deploying a ramp from the vehicle to assist the person in entering the vehicle. In some embodiments, the type of disability includes vision impairment, and the adjusting at least one component of the vehicle may include providing a haptic action to assist the person in entering the vehicle. In some embodiments, when the type of disability includes vision impairment, transmitting a control signal to adjust at least one component of the vehicle may include: (i) transmitting a first control signal to vibrate a handle of the vehicle to assist the person in entering the vehicle, and (ii) transmitting a second control signal to vibrate at least one component of an interior of the vehicle to guide the person to a seat of the interior of the vehicle.

In some embodiments, when the type of disability includes hearing impairment, adjusting at least one component of the vehicle may include activating at least one light of the vehicle to assist the person in entering the vehicle. In some embodiments, when the type of disability includes hearing impairment, transmitting a control signal to adjust at least one component of the vehicle may include: (i) transmitting a first control signal to illuminate at least one first light of a door of the vehicle to assist the person in entering the vehicle, and (ii) transmitting a second control signal to illuminate at least one second light of an interior of the vehicle to guide the person to a seat of the interior of the vehicle. In some embodiments, when the type of disability includes mobility impairment, determining the type of disability may include analyzing, by the one or more processors, an image to identify a wheelchair, crutches, or walker.

In some embodiments, when the type of disability includes vision impairment, determining the type of disability may include analyzing, by the one or more processors, an image to identify a walking cane for the visually impaired. Additionally or alternatively, the receiving of the instruction to provide service to the person may include receiving the instruction in a radio frequency identification (RFID) signal; and/or the type of disability may be determined based upon information received from the RFID signal.

In some embodiments, the receiving of the instruction to provide service to the person may include receiving the instruction from a mobile device of the person; and/or the type of disability may be determined based upon information received from the mobile device.

The method may further include: verifying, by the one or more processors, that an individual is the person of the received instruction by using at least one of: information of a mobile device of the individual; biometrics data of the individual; a radio frequency identification (RFID) tag; a sensor embedded in a wheelchair; a life alert bracelet; and/or a quick response (QR) code.

In yet another aspect, a computer-implemented method for transmitting an alert or adjusting control of a vehicle having one or more autonomous operation features in response to identifying an unauthorized individual in the vehicle or initiating entry to the vehicle may be provided. The method may include: (1) receiving, by at least one processor (and/or associated transceiver) of a vehicle, a signal from at least one sensor or transmitter associated with the vehicle; (2) identifying, by the at least one processor, an individual in the vehicle or initiating entry to the vehicle based upon the signal received from the at least one sensor or transmitter associated with the vehicle; (3) determining, by the at least one processor, that the individual is not authorized to be in the vehicle; and/or (4) transmitting, by the at least one processor (and/or associated transceiver), an alert or adjusting control of the vehicle based upon the determination that the individual is not authorized to be in the vehicle. The method may include additional, less, or alternate actions and functionality, including that discussed elsewhere herein.

For instance, the identifying of the individual may include creating, by the one or more processors, a profile of the individual by using a facial recognition technique; and/or the determining that the individual is not authorized to be in the vehicle may include: (i) receiving, by the one or more processors, a profile of a person authorized to be in the vehicle; and/or (ii) comparing, by the one or more processors, the profile of the person authorized to be in the vehicle with the profile of the individual to determine that the individual is not authorized to be in the vehicle.

In some embodiments, the determining that the individual is not authorized to be in the vehicle may include determining that the individual is: lighting a fire; smoking; committing an illegal activity; vandalizing the vehicle; inebriated; and/or harming another person in the vehicle. In some embodiments, the transmitting an alert or adjusting control of vehicle may include applying brakes of the vehicle, and opening a door of the vehicle.

In some embodiments, the transmitting an alert or adjusting control of vehicle may include disabling the vehicle by: ceasing to supply power to at least one component of an engine of the vehicle; and/or applying brakes of the vehicle.

In some embodiments, the transmitting an alert or adjusting control of vehicle may include sending an alert to a law enforcement agency. In some embodiments, the transmitting an alert or adjusting control of vehicle may include sending, by the one or more processors, to a law enforcement agency, a video stream depicting an interior of the vehicle.

In some embodiments, the transmitting an alert or adjusting control of vehicle may include sending, to a mobile device of the individual, an alert informing the individual that the individual is not authorized to be in the vehicle. In some embodiments, the transmitting an alert or adjusting control of vehicle may include activating an auditory alarm system of the vehicle to inform passengers of the vehicle to exit the vehicle because of a dangerous situation.

In some embodiments, the transmitting an alert or adjusting control of vehicle may include audibly broadcasting an instruction for the individual to exit the vehicle, and the audibly broadcasted instruction may include a name of the individual and may be above a predetermined decibel level.

In some embodiments, the determining that the individual is not authorized to be in the vehicle may include receiving a short-range wireless communication from a mobile device of the individual. In some embodiments, the determining that the individual is not authorized to be in the vehicle may include receiving biometric data of the individual.

In another aspect, a computer-implemented method for creating an extended reality environment for at least one passenger in a vehicle having one or more autonomous or semi-autonomous features may be provided. The method may include: (1) displaying, by one or more processors in an extended reality environment device within a vehicle having one or more autonomous or semi-autonomous features and operating in an autonomous mode, an extended reality environment to at least one passenger in the vehicle; (2) receiving, at the one or more processors, sensor data regarding an environment surrounding the vehicle from one or more sensors associated with the vehicle; (3) receiving, at the one or more processors, input signals from one or more user controls associated with the vehicle; and/or (4) modifying, by the one or more processors, the extended reality environment based at least upon: (i) the input signals, or (ii) the sensor data regarding the environment surrounding the vehicle. The method may include additional, less, or alternate actions and functionality, including that discussed elsewhere herein.

In some embodiments, the method may further include determining, based upon the sensor data regarding the environment surrounding the vehicle, to disable the vehicle's one or more autonomous or semi-autonomous features. The method may still further include displaying, by the one or more processors, a message indicating that the vehicle is changing to a manual driving mode and requesting the at least one passenger to take control of the vehicle. The method may yet further include exiting, by the one or more processors, the display of the extended reality environment. The method may further include disabling, by one or more processors in the vehicle having one or more autonomous or semi-autonomous features, the one or more autonomous or semi-autonomous features. In some embodiments, the extended reality environment may include a virtual reality environment and/or the extended reality environment device includes a virtual reality headset.

Additionally or alternatively, the extended reality environment may include an augmented reality environment and/or the extended reality environment device presents the augmented reality environment via at least one of: (i) one or more windows in the vehicle, or (ii) the vehicle's windshield.

The method may include creating, by the one or more processors, a system identification of one or more objects, and/or displaying, by the one or more processors and in the extended reality environment, a prompt for a user identification of the one or more objects. The method may include receiving, by the one or more processors, signals corresponding to user inputs to the extended reality device. The method may further include determining, by the one or more processors, that the user identification matches the system identification. The method may yet further include calculating, by the one or more processors, a user score based upon the matches between the user identification and the system identification, and/or displaying, by the one or more processors, the user score to the user.

In some embodiments, the method may further include obtaining, by the one or more processors of the extended environment device, a list of one or more training programs for learning how to operate a vehicle and/or executing, by the one or more processors of the extended environment device, the one or more training programs.

In some embodiments, the method may further include receiving, by the one or more processors, signals corresponding to user inputs to the extended reality environment device. The method may still further include determining, by the one or more processors of the extended reality environment device, that the user inputs are correct, wherein the user inputs are correct when they match a predetermined set of actions as displayed in a game environment. The method may yet further include performing, by the one or more processors, an action corresponding with the predetermined set of actions in response to the determination that the user inputs are correct.

In still another aspect, a computer-implemented method for determining information about an autonomous or semi-autonomous vehicle may be provided. The method may include: (1) uploading, by one or more processors of an autonomous or semi-autonomous vehicle, vehicle profile or telematics data to a database, the vehicle profile or telematics data including registration information for the vehicle; (2) receiving, at the one or more processors (and/or associated transceivers), a request from a client device within a threshold distance of the vehicle to access the vehicle profile or telematics data; (3) authenticating, by the one or more processors, a user of the client device to verify that the user is authorized to access the vehicle profile or telematics data for the autonomous or semi-autonomous vehicle; and/or (4) providing, by the one or more processors, access to the vehicle profile or telematics data to the client device in response to authenticating the user. The method may include additional, less, or alternate actions and functionality, including that discussed elsewhere herein.

In some embodiments, the autonomous or semi-autonomous vehicle may include processing hardware located on an exterior of the vehicle, and/or the request from the client device is received at the processing hardware from the client device via a very short-range communication link. In some embodiments, the database may be located on a vehicle head unit associated with the vehicle; the database communicates with the client device via a very short-range communication link; and/or the vehicle profile or telematics data is transmitted to the client device.

Additionally or alternatively, the database may be located on a server and/or the vehicle profile or telematics data is viewed via the client device.

In some embodiments, authenticating a user of the client device may include determining, by the one or more processors, at least one level of security to be applied to the vehicle profile or telematics data; categorizing, by the one or more processors, at least one subset of the vehicle profile or telematics data by the at least one level of security; designating, by the one or more processors, at least one class of individuals with authority to access the at least one level of security; receiving, by the one or more processors, a request from the user to access at least one subset of the vehicle profile or telematics data; determining, by the one or more processors, the user belongs to the at least one class of individuals with authority to access the at least one level of security for the at least one subset of the vehicle profile or telematics data; and/or providing, by the one or more processors, access to the at least one subset of the vehicle profile or telematics data.

In some embodiments, the client device includes an application for accessing vehicle profiles or telematics data. The method may further include providing, by the one or more processors, a prompt for entering identification information to the client device. The method may still further include receiving, by the one or more processors (and/or associated transceivers), the identification information. The method may yet further include verifying, by the one or more processors, the identity of a user of client device to ensure that the user is authorized to access the vehicle profile or telematics data. The method may further include providing, by the one or more processors, access to the vehicle profile or telematics data in response to verifying the identity of the user of the client device.

In some embodiments, the client device includes an application for accessing vehicle profiles or telematics data. The method may further include providing, by the one or more processors, a prompt for entering identification information to the client device. The method may still further include receiving, by the one or more processors, the identification information. The method may yet further include verifying, by the one or more processors, the identity of a user of client device to ensure that the user is authorized to access the vehicle profile or telematics data. The method may include providing, by the one or more processors and after verifying the identity of the user of the client device, a prompt for a second predetermined authentication factor. The method may further include verifying, by the one or more processors, the second predetermined authentication factor. The method may still further include providing, by the one or more processors, access to the vehicle profile or telematics data in response to verifying the second predetermined authentication factor.

In yet another aspect, a computer-implemented method for optimizing delivery routes and delivering loads using a combination of one or more autonomous or semi-autonomous vehicles and one or more drones may be provided. The method may include: (1) determining, by one or more processors, a destination location for transporting a first load from a starting location; (2) determining, by the one or more processors, a first route for one or more autonomous or semi-autonomous vehicles to transport the first load; (3) causing, by the one or more processors, the one or more autonomous or semi-autonomous vehicles to transport the first load to the destination location along the first route; (4) determining, by the one or more processors and after the one or more autonomous or semi-autonomous vehicles have begun to transport the first load, that a second load is to be transported to the destination location; (5) determining, by the one or more processors, a second route for one or more drones to transport the second load to the one or more autonomous or semi-autonomous vehicles at an intermediate location that intersects with the first route; and/or (6) causing, by the one or more processors, the one or more drones to transport the second load along the second route to the one or more autonomous or semi-autonomous vehicles at the intermediate location. The method may include additional, less, or alternate actions and functionality, including that discussed elsewhere herein.

In some embodiments, the first route is determined based upon at least one of: (i) geographical data for a geographic area including the starting location and the destination location, and/or (ii) one or more vehicle characteristics of the one or more autonomous or semi-autonomous vehicles; and/or the second route is determined based upon at least one of: (i) the geographical data, and/or (ii) one or more vehicle characteristics of the one or more drones.

In some embodiments, the one or more drones are one or more first drones. The method may further include causing, by the one or more processors, the one or more autonomous or semi-autonomous vehicles to transport one or more second drones along the first route.

In some embodiments, the method may further include determining, by the one or more processors, a third route for the one or more second drones to transport the first or second loads, wherein the third route intersects with the first route at a drop-off location. The method may further include causing, by the one or more processors, the one or more second drones to transport the first or second loads from the drop-off location to the destination location along the third route. In some embodiments, the drop-off location may be adjacent to the destination location and/or the one or more second drones transport the first or second loads to an entrance of the destination location.

The method may further include, in response to the one or more drones transporting at least the second load, receiving a verbal command directed to the one or more drones and/or performing, by the or more drones, one or more tasks based upon the verbal command.

In some embodiments, the method may include determining, by the one or more processors, one or more physical characteristics of the second load. The method may further include determining, by the one or more processors, a number of drones necessary to deliver the second load to the intermediate location within a user-determined time frame based upon the one or more physical characteristics of the second load. The method may yet further include determining, by the one or more processors, whether the one or more autonomous or semi-autonomous vehicles are capable of carrying the first and second loads and the determined number of drones based upon at least the one or more physical characteristics of the first and second loads.

Systems or computer-readable media storing instructions for implementing all or part of the system described above may also be provided in some aspects. Systems for implementing such methods may include one or more of the following: a special-purpose assessment computing device, a mobile computing device, a personal electronic device, an on-board computer, a remote server, one or more sensors, one or more communication modules configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1A:
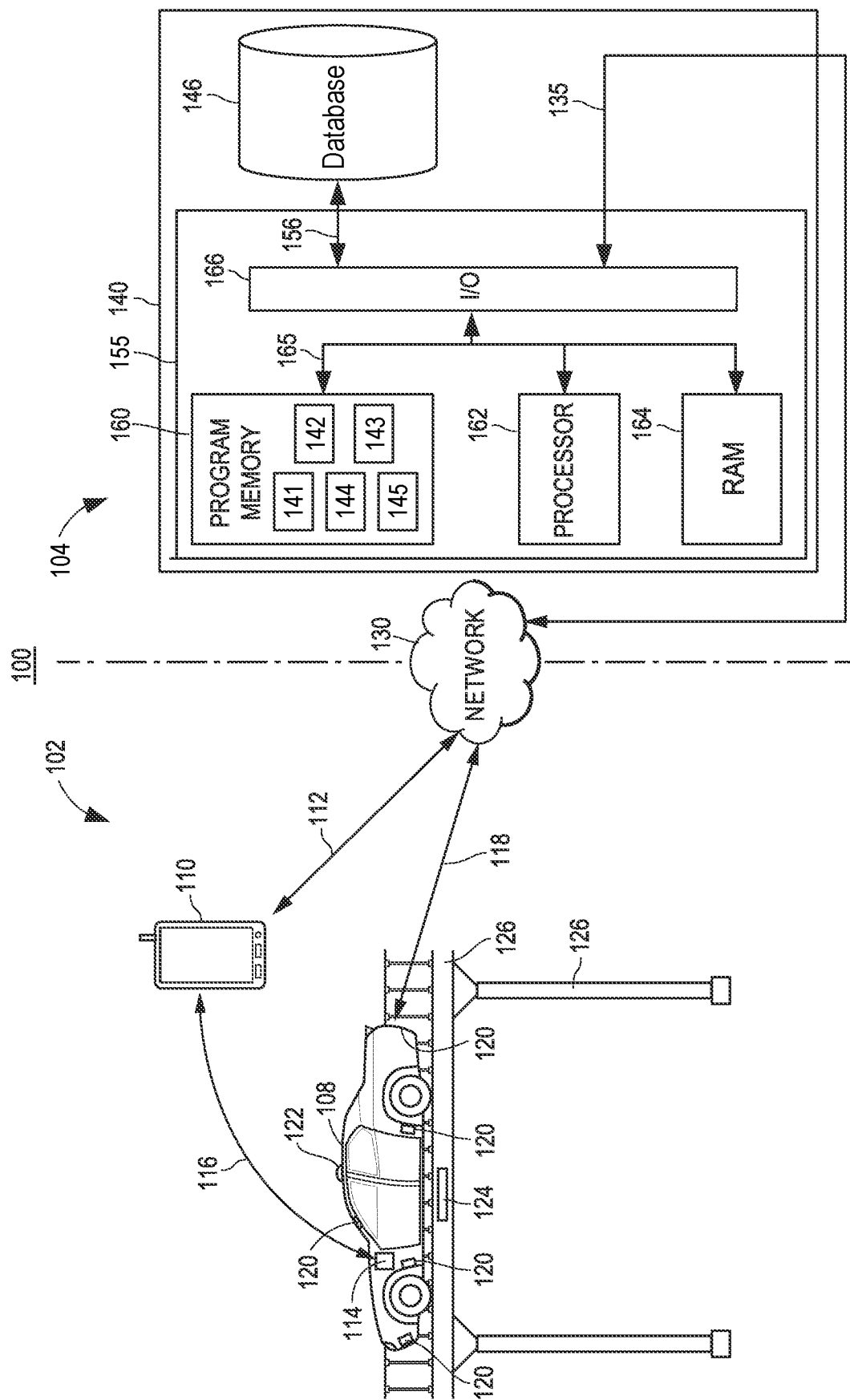
FIG. 1A illustrates a block diagram of an exemplary autonomous vehicle data system for autonomous vehicle operation, monitoring, communication, and related functions.

The systems and methods disclosed herein generally relate to various aspects of communication between autonomous operation features, components, and software. Remotely controlling operation of an autonomous or semi-autonomous vehicle, detecting and removing unauthorized passengers within an autonomous or semi-autonomous vehicle, delivering loads using autonomous or semi-autonomous vehicles, receiving registration information for an autonomous or semi-autonomous vehicle, providing passenger accessibility information to an autonomous or semi-autonomous vehicle, and receiving sensor or other environmental data from an autonomous or semi-autonomous vehicle to integrate with an electronic game or other extended reality experience are discussed below. To this end, the systems and methods may include collecting, communicating, evaluating, predicting, and/or utilizing data associated with autonomous or semi-autonomous operation features for controlling a vehicle.

The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network. These and other advantages are further described below.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle. Alternatively, autonomous operation features may be incapable of some actions typically taken by human operators, particularly when the features or other components of the vehicle are damaged or inoperable. Moreover, combinations of autonomous operation features may further affect operating risks due to synergies or conflicts between features. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use.

For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Exemplary Autonomous Vehicle Operation System

FIG. 1A illustrates a block diagram of an exemplary autonomous vehicle data system 100 on which the exemplary methods described herein may be implemented. The high-level architecture includes both hardware and software applications, as well as various data communications channels for communicating data between the various hardware and software components. The autonomous vehicle data system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 installed within the vehicle 108 and/or personal electronic devices that may communicate with the on-board computer 114. The front-end components 102 may further process the sensor data using the on-board computer 114 or a mobile device 110 (e.g., a smart phone, a tablet computer, a special purpose computing device, smart watch, wearable electronics, etc.) to determine when the vehicle is in operation and information regarding the vehicle.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 may communicate with the network 130 over links 112 and 118, respectively. Either or both of the mobile device 110 or on-board computer 114 may run a Data Application for collecting, generating, processing, analyzing, transmitting, receiving, and/or acting upon data associated with the vehicle 108 (e.g., sensor data, autonomous operation feature settings, or control decisions made by the autonomous operation features) or the vehicle environment (e.g., other vehicles operating near the vehicle 108). Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or communicate information to other vehicles 108 and/or to mobile devices 110.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. The network 130 may include one or more radio frequency communication links, such as wireless communication links 112 and 118 with mobile devices 110 and on-board computers 114, respectively. Where the network 130 comprises the Internet, data communications may take place over the network 130 via an Internet communication protocol.

The back-end components 104 include one or more servers 140. Each server 140 may include one or more computer processors adapted and configured to execute various software applications and components of the autonomous vehicle data system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, information regarding control decisions or control commands generated by the autonomous operation features, speed of the vehicle 108, RPM or other tachometer readings of the vehicle 108, lateral and longitudinal acceleration of the vehicle 108, vehicle accidents, incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle data system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds or thousands of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as autonomous operation feature information, vehicle accidents, road conditions, vehicle insurance policy information, or vehicle use information. Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a real-time communication application 143 for communicating information regarding vehicle or environmental conditions between a plurality of vehicles, a navigation application 144 for assisting autonomous or semi-autonomous vehicle operation, and an accident detection application 145 for identifying accidents and providing assistance. The various software applications may be executed on the same computer processor or on different computer processors.

Figure 1B:
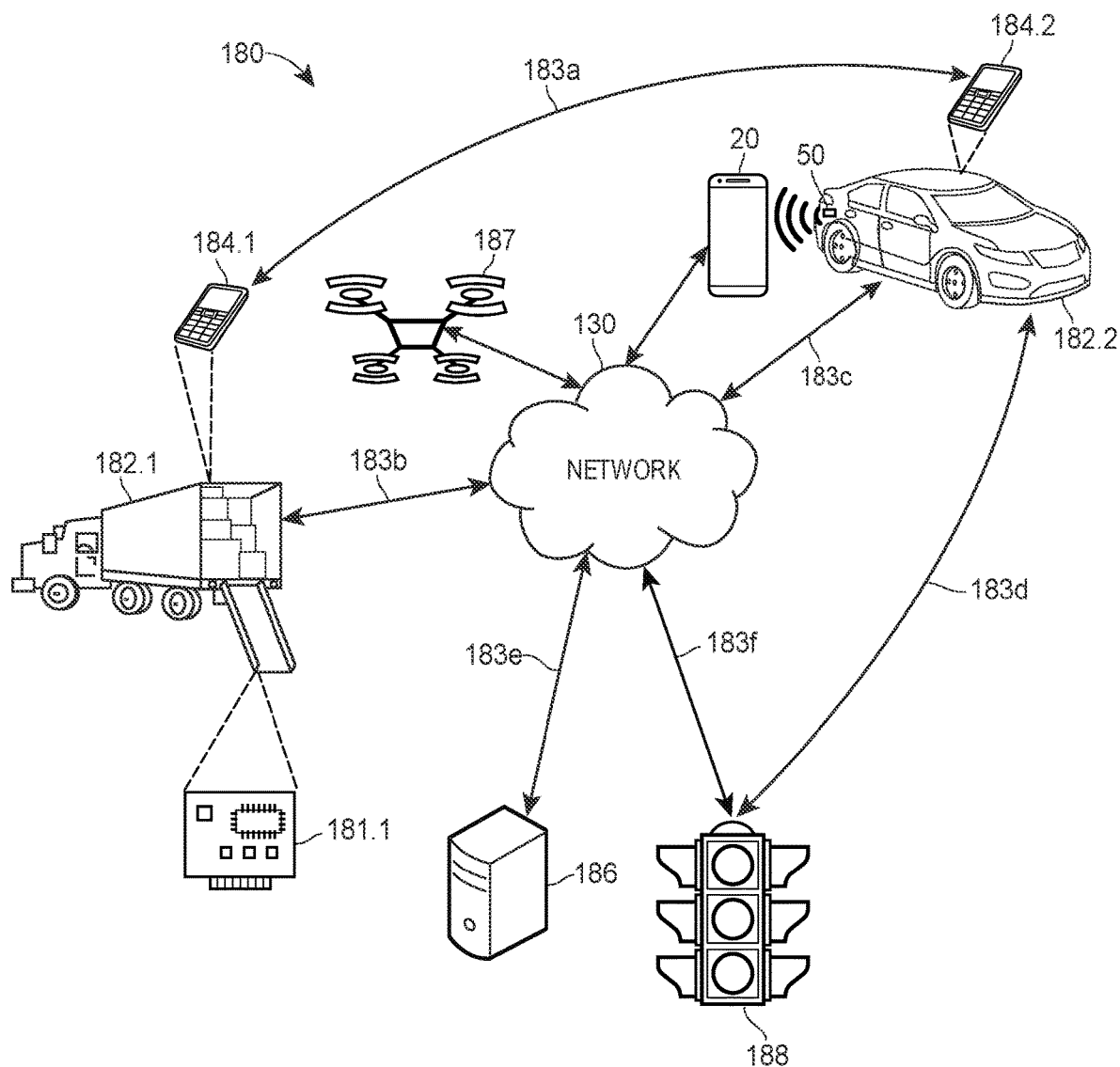
FIG. 1B illustrates a block diagram of an exemplary autonomous vehicle communication system, showing a plurality of vehicles and smart infrastructure components.

FIG. 1B illustrates a block diagram of an exemplary autonomous vehicle communication system 180 on which the exemplary methods described herein may be implemented. In one aspect, system 180 may include a network 130, N number of vehicles 182.1-182.N and respective mobile computing devices 184.1-184.N, one or several personal electronic devices (not shown), an external computing device 186, one or several drones 187, and/or a smart infrastructure component 188. In one aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features. As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) wireless communication and/or data transmission via the communication component 122, directly via the mobile computing devices 184, or otherwise.

The personal electronic devices may include any type of electronic device. For example, the personal electronic device may be a smart phone, a smart watch, a tablet, a virtual reality (VR) headset, a fitness tracker, a personal medical device (e.g., a pace maker, an insulin pump, etc.) and/or monitoring devices thereof, smart implants, a smart bracelet, and so on. The personal electronic device may monitor the conditions of the individual while the individual is present in one of the vehicles 182 and/or operating one of the vehicles 182 in a semi-autonomous mode.

At least some of the vehicles 182.2 may include electronic circuitry 50 proximately attached to the exterior of the vehicle 182.2. The electronic circuitry 50 proximately attached to the exterior of the vehicle 182.2 may be a combination of hardware and software components, also as described in more detail below. The electronic circuitry 50 may include a wireless transceiver for transmitting/receiving radio signals using Near Field Communication (NFC), Bluetooth, Universal Serial Bus (USB), Dedicated Short-Range Communications (DSRC), Radio-Frequency Identification (RFID), Wi-Fi, etc. The electronic circuitry 50 may communicate with the on-board computer 114 of the vehicle 182.2 via a first short-range communication link. The electronic circuitry 50 may also communicate with client devices 20 via a second very short-range communication link.

In some embodiments, the electronic circuitry 50 may include one or more processor(s) such as a microprocessor coupled to a memory. The client device 20 may be a smart phone, a tablet computer, a special purpose computing device, smart watch, wearable device, a laptop computer, or any other portable computing device. Additionally, the client device 20 may be external to the vehicle 182.2.

Moreover, the electronic circuitry 50 may store vehicle information or telematics data for the vehicle 182.2, such as vehicle registration information. For example, the electronic circuitry 50 may be paired with the on-board computer 114 via a Bluetooth connection. When a user requests vehicle information or telematics data from the vehicle 182.2 via the client device 20, the vehicle information or telematics data may be transmitted and/or stored in the electronic circuitry 50. In other embodiments, the on-board computer 114 may transmit the vehicle information or telematics data to electronic circuitry 50 each time the electronic circuitry 50 is called upon by the client device 20. The electronic circuitry 50 is described in more detail below with reference to FIG. 2B.

Although system 180 is shown in FIG. 1A as including one network 130, two mobile computing devices 184.1 and 184.2, two vehicles 182.1 and 182.2, one external computing device 186, and/or one smart infrastructure component 188, various embodiments of system 180 may include any suitable number of networks 130, mobile computing devices 184, vehicles 182, external computing devices 186, and/or infrastructure components 188. The vehicles 182 included in such embodiments may include any number of vehicles 182.*i* having vehicle controllers 181.*i* (such as vehicle 182.1 with vehicle controller 181.1) and vehicles 182.1 not having vehicles controllers (such as vehicle 182.2). Moreover, system 180 may include a plurality of external computing devices 186 and more than two mobile computing devices 184, any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer. In other aspects, each of mobile computing devices 184.1 and 184.2 may be configured to communicate indirectly with one another and/or any suitable device via communications over network 130, such as external computing device 186 and/or smart infrastructure component 188, for example. In still other aspects, each of mobile computing devices 184.1 and 184.2 may be configured to communicate directly and/or indirectly with other suitable devices, which may include synchronous or asynchronous communication.

Each of mobile computing devices 184.1 and 184.2 and/or personal electronic devices may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 and/or personal electronic devices may also be configured to communicate with vehicles 182.1 and 182.2, respectively, utilizing a BLUETOOTH communication protocol (radio link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 and/or personal electronic devices may be configured to communicate with one another via radio links 183*b* and 183*c* by each communicating with network 130 utilizing a cellular communication protocol. As an additional example, mobile computing devices 184.1 and/or 184.2 may be configured to communicate with external computing device 186 via radio links 183*b*, 183*c*, and/or 183*e*. Still further, one or more of mobile computing devices 184.1 and/or 184.2 and/or personal electronic devices may also be configured to communicate with one or more smart infrastructure components 188 directly (e.g., via radio link 183*d*) and/or indirectly (e.g., via radio links 183*c* and 183*f* via network 130) using any suitable communication protocols.

Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*. As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*f* may represent wired links, wireless links, or any suitable combination thereof. For example, the links 183*e* and/or 183*f* may include wired links to the network 130, in addition to, or instead of, wireless radio connections.

In some embodiments, the external computing device 186 may mediate communication between the mobile computing devices 184.1 and 184.2 based upon location or other factors. In embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary. For example, in some aspects, mobile computing device 184.1 may broadcast geographic location data and/or telematics data directly to mobile computing device 184.2.

In this case, mobile computing device 184.2 may operate independently of network 130 to determine operating data, risks associated with operation, control actions to be taken, and/or alerts to be generated at mobile computing device 184.2 based upon the geographic location data, sensor data, and/or the autonomous operation feature data. In accordance with such aspects, network 130 and external computing device 186 may be omitted.

However, in other aspects, one or more of mobile computing devices 184.1 and/or 184.2 and/or personal electronic devices may work in conjunction with external computing device 186 to determine operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the geographic location data, autonomous operation feature data, or data derived therefrom.

Mobile computing devices 184.1 and 184.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Such functionality may, in some embodiments be controlled in whole or part by a Data Application operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.).

External computing device 186 may be configured to execute various software applications, algorithms, and/or other suitable programs. External computing device 186 may be implemented as any suitable type of device to facilitate the functionality as described herein. For example, external computing device 186 may be a server 140 as discuses elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g. cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect data (e.g., geographic location data and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. Such insurance-related functions may include assisting insurance customers in evaluating autonomous operation features, limiting manual vehicle operation based upon risk levels, providing information regarding risk levels associated with autonomous and/or manual vehicle operation along routes, and/or determining repair/salvage information for damaged vehicles. For example, external computing device 186 may facilitate the receipt of autonomous operation or other data from one or more mobile computing devices 184.1-184.N, which may each be running a Data Application to obtain such data from autonomous operation features or sensors 120 associated therewith.

In aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, insurance policy numbers, a description and/or listing of insured assets, vehicle identification numbers of insured vehicles, addresses of insured structures, contact information, premium rates, discounts, etc. In this way, data received from one or more mobile computing devices 184.1-184.N may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N.

In some aspects, external computing device 186 may facilitate indirect communications between one or more of mobile computing devices 184, vehicles 182, and/or smart infrastructure component 188 via network 130 or another suitable communication network, wireless communication channel, and/or wireless link. Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a traffic light, a railroad crossing signal, a construction notification sign, a roadside display configured to display messages, a billboard display, a parking garage monitoring device, etc.

In some embodiments, the smart infrastructure component 188 may include or be communicatively connected to one or more sensors (not shown) for detecting information relating to the condition of the smart infrastructure component 188, which sensors may be connected to or part of the infrastructure communication device 124 of the smart infrastructure component 188. The sensors (not shown) may generate data relating to weather conditions, traffic conditions, or operating status of the smart infrastructure component 188. The smart infrastructure component 188 may be configured to receive the sensor data generated and determine a condition of the smart infrastructure component 188, such as weather conditions, road integrity, construction, traffic, available parking spaces, etc.

In some aspects, smart infrastructure component 188 may be configured to communicate with one or more other devices directly and/or indirectly. For example, smart infrastructure component 188 may be configured to communicate directly with mobile computing device 184.2 via radio link 183*d* and/or with mobile computing device 184.1 via links 183*b* and 183*f* utilizing network 130. As another example, smart infrastructure component 188 may communicate with external computing device 186 via links 183*e* and 183*f* utilizing network 130. To provide some illustrative examples of the operation of the smart infrastructure component 188, if smart infrastructure component 188 is implemented as a smart traffic light, smart infrastructure component 188 may change a traffic light from green to red (or vice-versa) or adjust a timing cycle to favor traffic in one direction over another based upon data received from the vehicles 182. If smart infrastructure component 188 is implemented as a traffic sign display, smart infrastructure component 188 may display a warning message that an anomalous condition (e.g., an accident) has been detected ahead and/or on a specific road corresponding to the geographic location data.

Exemplary Mobile Device/on-Board Computer

Figure 2A:
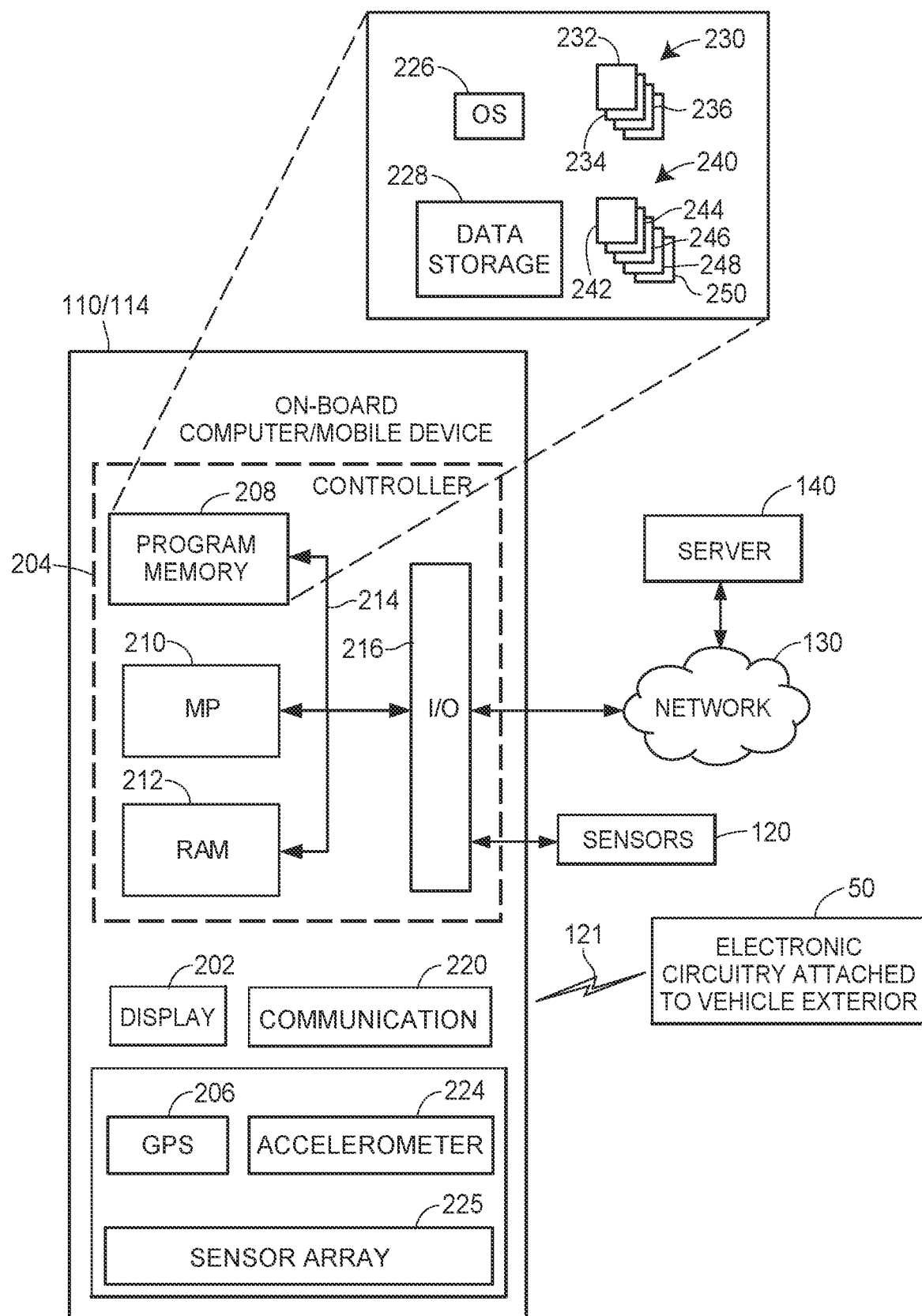
FIG. 2A illustrates a block diagram of an exemplary on-board computer or mobile device.

FIG. 2A illustrates a block diagram of an exemplary mobile device 110 or an exemplary on-board computer 114 consistent with the system 100 and the system 180. The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 and/or personal electronic devices to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2A depicts only one microprocessor 210, the controller 204 may include multiple microprocessors 210. Similarly, the memory of the controller 204 may include multiple RAMs 212 and multiple program memories 208. Although FIG. 2A depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300, described further below.

Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130. The Data Application for collecting, generating, processing, analyzing, transmitting, receiving, and/or acting upon autonomous operation feature data may also be stored as one of the plurality of applications 230 in the program memory 208 of the mobile computing device 110 or on-board computer 114, which may be executed by the one or more processors 210 thereof.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring method 400, the controller 204 may further implement the autonomous operation monitoring application 236 to communicate with the server 140 to provide information regarding autonomous vehicle operation. This may include information regarding settings or configurations of autonomous operation features, data from the sensors 120 regarding the vehicle environment, data from the sensors 120 regarding the response of the vehicle 108 to its environment, communications sent or received using the communication component 122 or the communication unit 220, operating status of the autonomous vehicle operation application 232 and the autonomous communication application 234, and/or control commands sent from the on-board computer 114 to the control components (not shown) to operate the vehicle 108.

In some embodiments, control commands generated by the on-board computer 114 but not implemented may also be recorded and/or transmitted for analysis of how the autonomous operation features would have responded to conditions if the features had been controlling the relevant aspect or aspects of vehicle operation. The information may be received and stored by the server 140 implementing the autonomous operation information monitoring application 141, and the server 140 may then determine the effectiveness of autonomous operation under various conditions by implementing the feature evaluation application 142, which may include an assessment of autonomous operation features compatibility. The effectiveness of autonomous operation features and the extent of their use may be further used to determine one or more risk levels associated with operation of the autonomous vehicle by the server 140.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle 108.

Furthermore, the communication unit 220 may communicate with other autonomous vehicles, infrastructure, or other external sources of information to transmit and receive information relating to autonomous vehicle operation. The communication unit 220 may communicate with the external sources via the network 130, via short-range communication links 121, or via any suitable wireless communication protocol network, such as wireless telephony (e.g., GSM, CDMA, LTE, etc.), Wi-Fi (802.11 standards), WiMAX, Bluetooth, infrared or radio frequency communication, etc.

The communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140. Additionally, the communication unit 220 may communicate with the electronic circuitry 50 and/or client devices 20 via any suitable short-range/very short-range wired or wireless communication protocol network 121, such as USB, Bluetooth, Wi-Fi, NFC, RFID, DSRC, etc.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Exemplary Electronic Circuitry

Figure 2B:
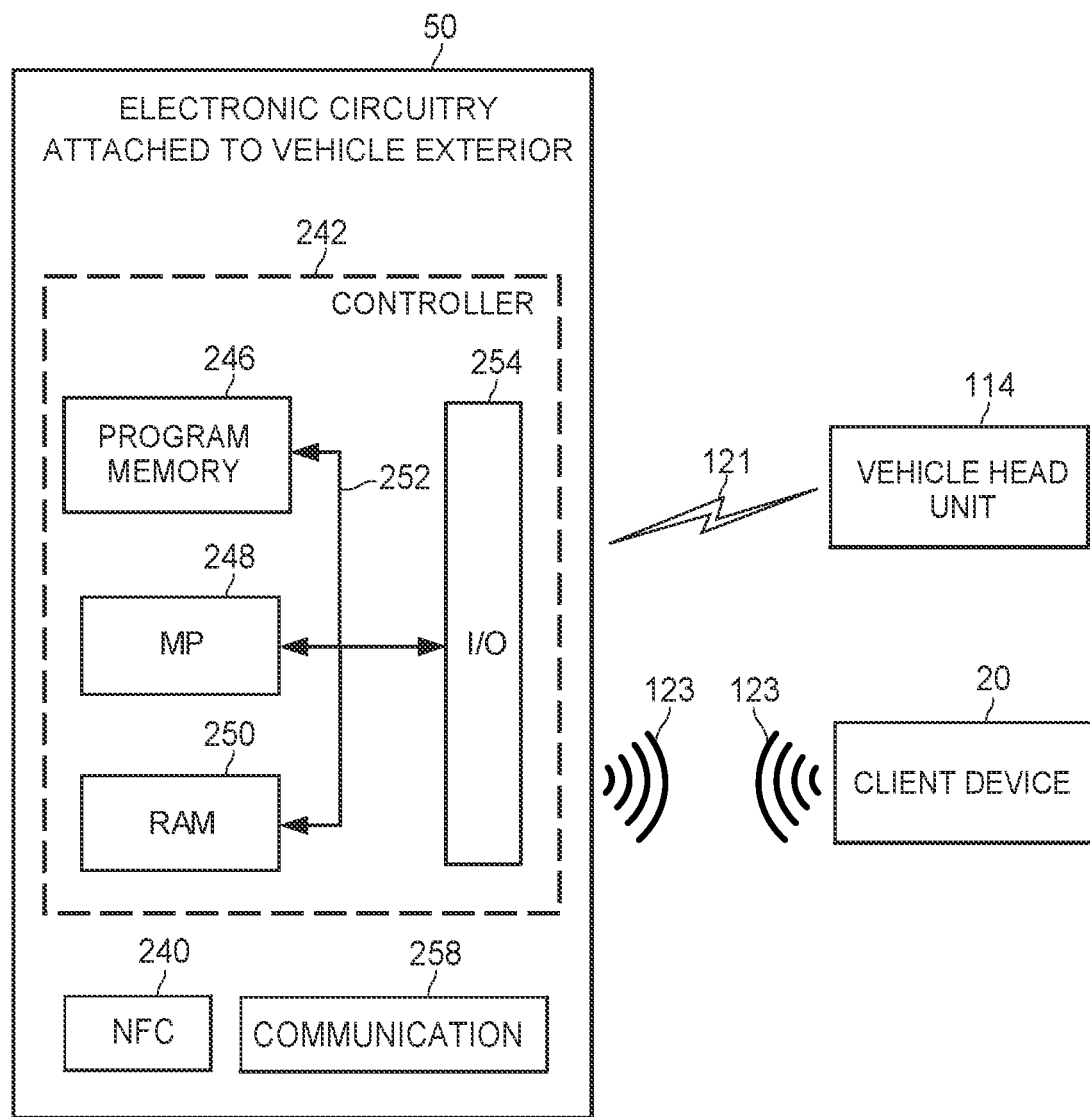
FIG. 2B illustrates a block diagram of exemplary electronic circuitry attached to the exterior of the vehicle.

Referring now to FIG. 2B, the electronic circuitry 50 (also referred to herein as a "vehicle electronic device") may include an NFC module 240 and a communication unit 258. The electronic circuitry 50 may be proximately attached to the exterior of the vehicle 182.2. Locations on the interior of the vehicle 182.2 which are within several inches or a foot from the exterior of the vehicle 182.2 may be proximate to the exterior of the vehicle 182.2. For example, the electronic circuitry 50 may be attached to a door panel or fuel cap of the vehicle 182.2 on the exterior of the vehicle 182.2. In another example, the electronic circuitry 50 may be attached to a fuel cap from the interior of the vehicle 182.2 and proximate to the exterior of the vehicle 182.2. In this manner, the electronic circuitry 50 may be placed in very close proximity of a client device 20 (e.g., within one inch, three inches, six inches, a foot, three feet, etc.) to securely transmit vehicle information or telematics data.

In some embodiments, like the on-board computer 114, the electronic circuitry 50 may also include a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include a data storage and/or a plurality of software routines. The data storage may include data such as vehicle information, telematics data, etc. In some embodiments, the controller 242 may also include, or otherwise be communicatively connected to, other data storage mechanisms (e.g., one or more hard disk drives, optical storage drives, solid state storage devices, etc.) that reside within the electronic circuitry 50.

The communication unit 258 may include one or more transceivers, and/or communicate with the on-board computer 114 and/or the client devices 20 via any suitable short-range/very short-range wired or wireless communication protocol network 121, 123, such as USB, Bluetooth, Wi-Fi, NFC, RFID, DSRC, etc. For example, using the NFC module 240, the communication unit 258 may communicate with the client devices 20 using NFC 123.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of a plurality of software routines residing in the program memory 246. One of the plurality of routines may include a device recognition routine which identifies devices within range for communication, such as a client device 20 which may communicate with the electronic circuitry 50. Another routine in the plurality of routines may include a vehicle information transmission routine which retrieves vehicle information or telematics data from data storage 246 or the on-board computer 114. The vehicle information transmission routine may then transmit the obtained vehicle information or telematics data to a client device 20.

Data Application

The mobile device 110 and/or on-board computer 114 may run a Data Application to collect, transmit, receive, and/or process autonomous operation feature data. Such autonomous operation feature data may include data directly generated by autonomous operation features, such as control commands used in operating the vehicle 108. Similarly, such autonomous operation feature data may include shadow control commands generated by the autonomous operation features but not actually used in operating the vehicle, such as may be generated when the autonomous operation features are disabled. The autonomous operation feature data may further include non-control data generated by the autonomous operation features, such as determinations regarding environmental conditions in the vehicle operating environment in which the vehicle 108 operates (e.g., traffic conditions, construction locations, pothole locations, worn lane markings, corners with obstructed views, etc.). The autonomous operation feature data may yet further include sensor data generated by (or derived from sensor data generated by) sensors 120 utilized by the autonomous operation features. For example, data from LIDAR and ultrasonic sensors may be used by vehicles for autonomous operation. Such data captures a much more detailed and complete representation of the conditions in which the vehicle 108 operates than traditional vehicle operation metrics (e.g., miles driven) or non-autonomous telematics data (e.g., acceleration, position, and time).

Autonomous operation feature data may be processed and used by the Data Application to determine information regarding the vehicle 108, its operation, or its operating environment. The autonomous operation feature data may further be communicated by the Data Application to a server 140 via network 130 for processing and/or storage. In some embodiments, the autonomous operation feature data (or information derived therefrom) may be transmitted directly via radio links 183 or indirectly via network 130 from the vehicle 108 to other vehicles (or to mobile devices 110). By communicating information associated with the autonomous operation feature data to other nearby vehicles, the other vehicles or their operators may make use of such data for routing, control, or other purposes.

This may be particularly valuable in providing detailed information regarding a vehicle environment (e.g., traffic, accidents, flooding, ice, etc.) collected by a Data Application of an autonomous vehicle 108 to a driver of a non-autonomous vehicle via a Data Application of a mobile device 110 associated with the driver. For example, ice patches may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the ice patches may be presented to the driver of vehicle 182.2. As another example, locations of emergency vehicles or accidents may be determined and communicated between vehicles 182, such as between an autonomous vehicle 182.1 and a traditional (non-autonomous) vehicle 182.2.

In further embodiments, a Data Application may serve as an interface between the user and an autonomous vehicle 108, via the user's mobile device 110 and/or the vehicle's on-board computer 114. The user may interact with the Data Application to locate, retrieve, park, control, or monitor the vehicle 108. For example, the Data Application may be used to select a destination and route the vehicle 108 to the destination, which may include controlling the vehicle to travel to the destination in a fully autonomous mode. In some embodiments, the Data Application may further determine and/or provide information regarding the vehicle 108, such as the operating status or condition of autonomous operation features, sensors, or other vehicle components (e.g., tire pressure). In yet further embodiments, the Data Application may be configured to assess risk levels associated with vehicle operation based upon location, autonomous operation feature use (including settings), operating conditions, or other factors. Such risk assessment may be further used in recommending autonomous feature use levels, generating warnings to a vehicle operator, or adjusting an insurance policy associated with the vehicle 108.

Data Applications may be installed and running on a plurality of mobile devices 110 and/or on-board computers 114 in order to facilitate data sharing and other functions as described herein. Additionally, such Data Applications may provide data to, and receive data from, one or more servers 140. For example, a Data Application running on a user's mobile device 110 may communicate location data to a server 140 via the network 130. The server 140 may then process the data to determine a route, risk level, recommendation, or other action. The server 140 may then communicate the determined information to the mobile device 110 and/or on-board computer 114, which may cause the vehicle 108 to operate in accordance with the determined information (e.g., travel along a determined optimal route). Thus, the Data Application may facilitate data communication between the front-end components 102 and the back-end components 104, allowing more efficient processing and data storage.

Exemplary Autonomous Vehicle Operation Method

Figure 3:
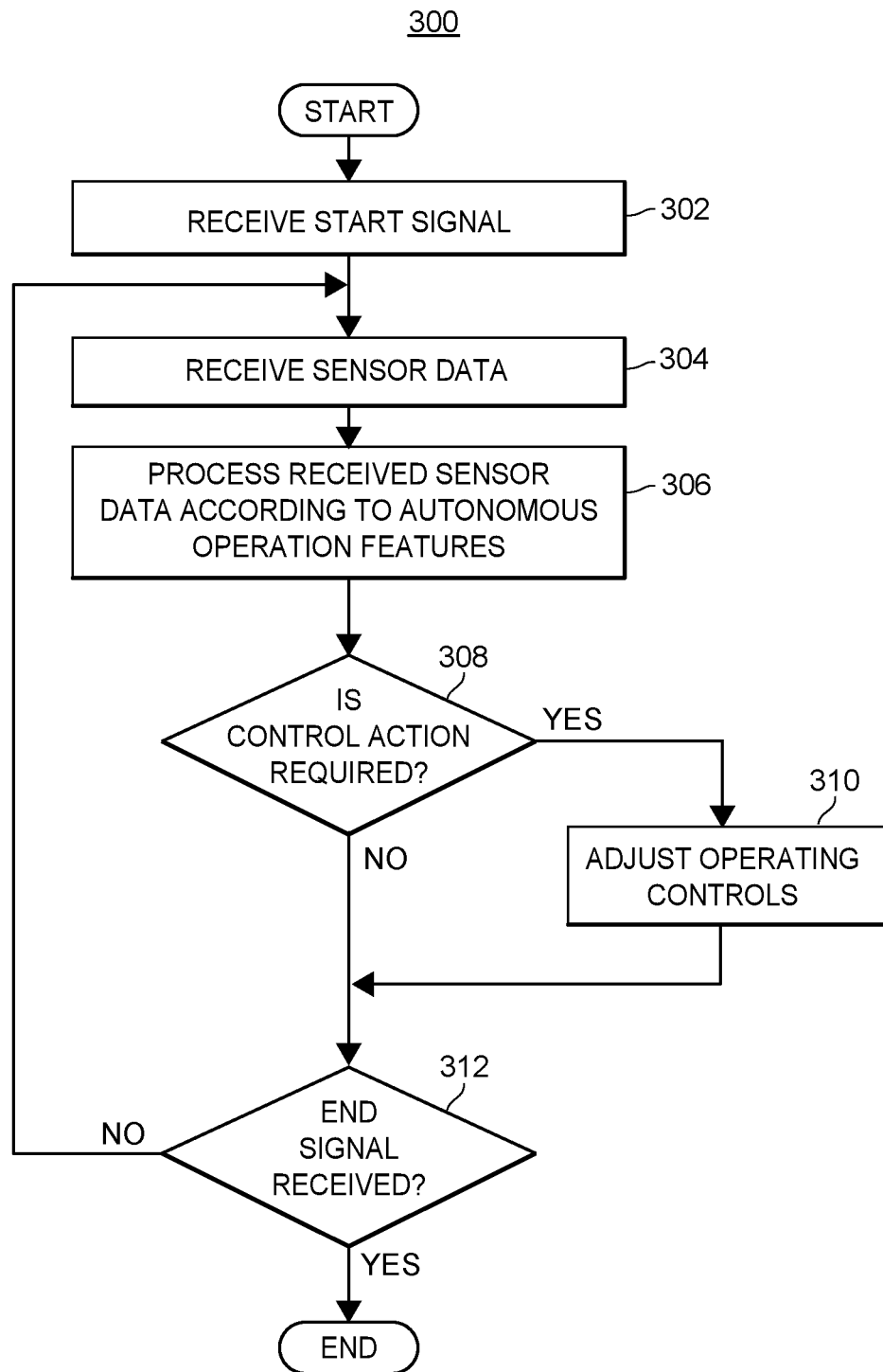
FIG. 3 illustrates a flow diagram of an exemplary autonomous vehicle operation method.

FIG. 3 illustrates a flow diagram of an exemplary autonomous vehicle operation method 300, which may be implemented by the autonomous vehicle data system 100. The method 300 may begin when the controller 204 receives a start signal (block 302). The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108.

In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For other autonomous vehicles, the settings may include enabling or disabling particular autonomous operation features, specifying thresholds for autonomous operation, specifying warnings or other information to be presented to the vehicle operator, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle.

In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle). In some embodiments, the start signal may be generated by or received by the Data Application running on a mobile device 110 or on-board computer 114 within the vehicle 108. The Data Application may further set or record settings for one or more autonomous operation features of the vehicle 108.

After receiving the start signal at block 302, the controller 204 receives sensor data from the sensors 120 during vehicle operation (block 304). In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The Data Application may receive the sensor data, or a portion thereof, and store or transmit the received sensor data. In some embodiments, the Data Application may process or determine summary information from the sensor data before storing or transmitting the summary information. The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data in accordance with the autonomous operation features (block 306). The controller 204 may process the sensor data to determine whether an autonomous control action is required or to determine adjustments to the controls of the vehicle 108 (i.e., control commands). For example, the controller 204 may receive sensor data indicating a decreasing distance to a nearby object in the vehicle's path and process the received sensor data to determine whether to begin braking (and, if so, how abruptly to slow the vehicle 108). As another example, the controller 204 may process the sensor data to determine whether the vehicle 108 is remaining with its intended path (e.g., within lanes on a roadway).

If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

In some embodiments, the Data Application may record information related to the processed sensor data, including whether the autonomous operation features have determined one or more control actions to control the vehicle and/or details regarding such control actions. The Data Application may record such information even when no control actions are determined to be necessary or where such control actions are not implemented. Such information may include information regarding the vehicle operating environment determined from the processed sensor data (e.g., construction, other vehicles, pedestrians, anomalous environmental conditions, etc.). The information collected by the Data Application may further include an indication of whether and/or how the control actions are implemented using control components of the vehicle 108.

When the controller 204 determines an autonomous control action is required (block 308), the controller 204 may cause the control components of the vehicle 108 to adjust the operating controls of the vehicle to achieve desired operation (block 310). For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed elsewhere herein, the controller 204 may also log or transmit the autonomous control actions to the server 140 via the network 130 for analysis. In some embodiments, an application (which may be a Data Application) executed by the controller 204 may communicate data to the server 140 via the network 130 or may communicate such data to the mobile device 110 for further processing, storage, transmission to nearby vehicles or infrastructure, and/or communication to the server 140 via network 130.

The controller 204 may continue to receive and process sensor data at blocks 304 and 306 until an end signal is received by the controller 204 (block 312). The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the vehicle 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not to be capable of resuming operation, the controller 204 may cause the vehicle to stop or take other appropriate action.

To control the vehicle 108, the autonomous operation features may generate and implement control decisions relating to the control of the motive, steering, and stopping components of the vehicle 108. The control decisions may include or be related to control commands issued by the autonomous operation features to control such control components of the vehicle 108 during operation.

In some embodiments, control decisions may include decisions determined by the autonomous operation features regarding control commands such feature would have issued under the conditions then occurring, but which control commands were not issued or implemented. For example, an autonomous operation feature may generate and record shadow control decisions it would have implemented if engaged to operate the vehicle 108 even when the feature is disengaged (or engaged using other settings from those that would produce the shadow control decisions).

Data regarding the control decisions actually implemented and/or the shadow control decisions not implemented to control the vehicle 108 may be recorded for use in assessing autonomous operation feature effectiveness, accident reconstruction and fault determination, feature use or settings recommendations, risk determination and insurance policy adjustments, or other purposes as described elsewhere herein. For example, actual control decisions may be compared against control decisions that would have been made by other systems, software versions, or with additional sensor data or communication data.

As used herein, the terms "preferred" or "preferably made" control decisions mean control decisions that optimize some metric associated with risk under relevant conditions. Such metric may include, among other things, a statistical correlation with one or more risks (e.g., risks related to a vehicle collision) or an expected value associated with risks (e.g., a risk-weighted expected loss associated with potential vehicle accidents). The preferably made, or preferred or recommended, control decisions discussed herein may include control decisions or control decision outcomes that are less risky, have lower risk or the lowest risk of all the possible or potential control decisions given various operating conditions, and/or are otherwise ideal, recommended, or preferred based upon various operating conditions, including autonomous system or feature capability; current road, environmental or weather, traffic, or construction conditions through which the vehicle is traveling; and/or current versions of autonomous system software or components that the autonomous vehicle is equipped with and using.

The preferred or recommended control decisions may result in the lowest level of potential or actual risk of all the potential or possible control decisions given a set of various operating conditions and/or system features or capabilities. Alternatively, the preferred or recommended control decisions may result in a lower level of potential or actual risk (for a given set of operating conditions) to the autonomous vehicle and passengers, and other people or vehicles, than some of the other potential or possible control decisions that could have been made by the autonomous system or feature.

Exemplary Monitoring Method

Figure 4A:
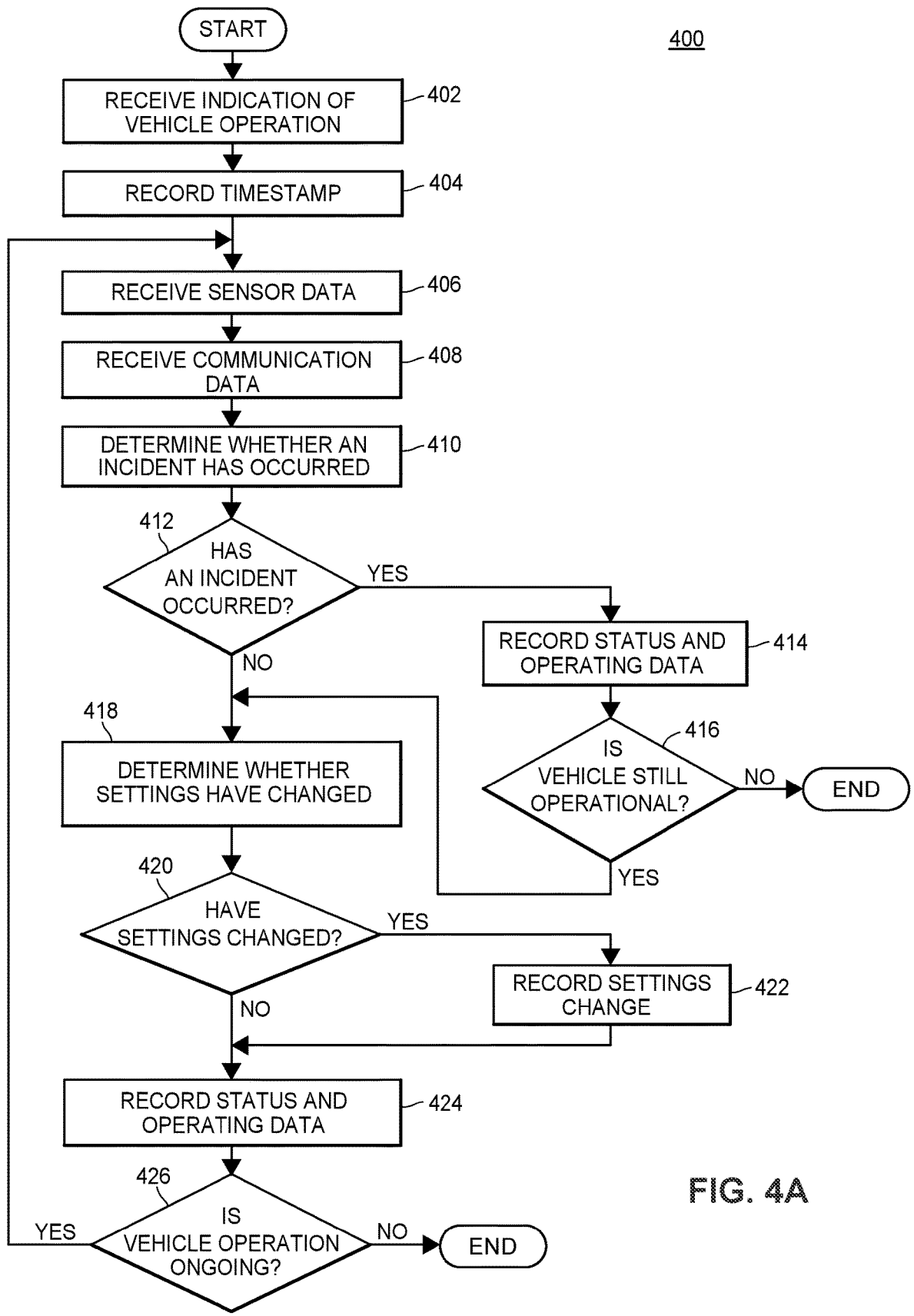
FIGS. 4A-B illustrate flow diagrams of exemplary autonomous vehicle operation monitoring methods for obtaining and recording information during vehicle operation.

FIG. 4A is a flow diagram depicting an exemplary autonomous vehicle operation monitoring method 400, which may be implemented by the autonomous vehicle data system 100. The method 400 monitors the operation of the vehicle 108 and transmits information regarding the vehicle 108 to the server 140, which information may then be used to determine autonomous operation feature usage or effectiveness. The method 400 may be used for monitoring the state of the vehicle 108, for providing data to other vehicles 182, for responding to emergencies or unusual situations during vehicle use, for testing autonomous operation features in a controlled environment, for determining actual feature use during vehicle operation outside a test environment, for assessment of feature operation, and/or for other purposes described herein. In alternative embodiments, the method 400 may be implemented whenever the vehicle 108 is in operation (manual or autonomous) or only when the autonomous operation features are enabled.

The method 400 may likewise be implemented as either a real-time process, in which information regarding the vehicle 108 is communicated to the server 140 while monitoring is ongoing, or as a periodic process, in which the information is stored within the vehicle 108 and communicated to the server 140 at intervals (e.g., upon completion of a trip or when an incident occurs). In some embodiments, the method 400 may communicate with the server 140 in real-time when certain conditions exist (e.g., when a sufficient data connection through the network 130 exists or when no roaming charges would be incurred). In further embodiments, a Data Application executed by the mobile device 110 and/or on-board computer 114 may perform such monitoring, recording, and/or communication functions, including any of the functions described below with respect to blocks 402-434.

The method 400 may begin when the controller 204 receives an indication of vehicle operation (block 402). The indication may be generated when the vehicle 108 is started or when an autonomous operation feature is enabled by the controller 204 or by input from the vehicle operator, as discussed above. In response to receiving the indication, the controller 204 may create a timestamp (block 404). The timestamp may include information regarding the date, time, location, vehicle environment, vehicle condition, and autonomous operation feature settings or configuration information. The date and time may be used to identify one vehicle trip or one period of autonomous operation feature use, in addition to indicating risk levels due to traffic or other factors. The additional location and environmental data may include information regarding the position of the vehicle 108 from the GPS unit 206 and its surrounding environment (e.g., road conditions, weather conditions, nearby traffic conditions, type of road, construction conditions, presence of pedestrians, presence of other obstacles, availability of autonomous communications from external sources, etc.).

Vehicle condition information may include information regarding the type, make, and model of the vehicle 108, the age or mileage of the vehicle 108, the status of vehicle equipment (e.g., tire pressure, non-functioning lights, fluid levels, etc.), or other information relating to the vehicle 108. In some embodiments, vehicle condition information may further include information regarding the sensors 120, such as type, configuration, or operational status (which may be determined, for example, from analysis of actual or test data from the sensors). In some embodiments, the timestamp may be recorded on the client device 114, the mobile device 110, or the server 140.

The autonomous operation feature settings may correspond to information regarding the autonomous operation features, such as those described above with reference to the autonomous vehicle operation method 300. The autonomous operation feature configuration information may correspond to information regarding the number and type of the sensors 120 (which may include indications of manufacturers and models of the sensors 120), the disposition of the sensors 120 within the vehicle 108 (which may include disposition of sensors 120 within one or more mobile devices 110), the one or more autonomous operation features (e.g., the autonomous vehicle operation application 232 or the software routines 240), autonomous operation feature control software, versions of the software applications 230 or routines 240 implementing the autonomous operation features, or other related information regarding the autonomous operation features.

For example, the configuration information may include the make and model of the vehicle 108 (indicating installed sensors 120 and the type of on-board computer 114), an indication of a malfunctioning or obscured sensor 120 in part of the vehicle 108, information regarding additional after-market sensors 120 installed within the vehicle 108, a software program type and version for a control program installed as an application 230 on the on-board computer 114, and software program types and versions for each of a plurality of autonomous operation features installed as applications 230 or routines 240 in the program memory 208 of the on-board computer 114.

During operation, the sensors 120 and/or personal electronic devices may generate sensor data regarding the vehicle 108 and its environment, which may include other vehicles 182 within the operating environment of the vehicle 108. In some embodiments, one or more of the sensors 120 and/or personal electronic devices may preprocess the measurements and communicate the resulting processed data to the on-board computer 114 and/or the mobile device 110. The controller 204 may receive sensor data from the sensors 120 and/or personal electronic devices (block 406). The sensor data may include information regarding the vehicle's position, speed, acceleration, direction, and responsiveness to controls.

The sensor data may further include information regarding the location and movement of obstacles or obstructions (e.g., other vehicles, buildings, barriers, pedestrians, animals, trees, or gates), weather conditions (e.g., precipitation, wind, visibility, or temperature), road conditions (e.g., lane markings, potholes, road material, traction, or slope), signs or signals (e.g., traffic signals, construction signs, building signs or numbers, or control gates), or other information relating to the vehicle's environment. In some embodiments, sensors 120 may indicate the number of passengers within the vehicle 108, including an indication of whether the vehicle is entirely empty.

In addition to receiving sensor data from the sensors 120, in some embodiments the controller 204 may receive autonomous communication data from the communication component 122 or the communication module 220 (block 408). The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), or other external sources (e.g., map databases, weather databases, or traffic and accident databases). In some embodiments, the communication data may include data from non-autonomous vehicles, which may include data regarding vehicle operation or anomalies within the operating environment determined by a Data Application operating on a mobile device 110 or on-board computer 114.

The communication data may be combined with the received sensor data received to obtain a more robust understanding of the vehicle environment. For example, the server 140 or the controller 204 may combine sensor data indicating frequent changes in speed relative to tachometric data with map data relating to a road upon which the vehicle 108 is traveling to determine that the vehicle 108 is in an area of hilly terrain. As another example, weather data indicating recent snowfall in the vicinity of the vehicle 108 may be combined with sensor data indicating frequent slipping or low traction to determine that the vehicle 108 is traveling on a snow-covered or icy road.

The controller 204 may process the sensor data, the communication data, and the settings or configuration information to determine whether an incident has occurred (block 410). As used herein, an "incident" is an occurrence during operation of an autonomous vehicle outside of normal safe operating conditions, such that one or more of the following occurs: (i) there is an interruption of ordinary vehicle operation, (ii) there is damage to the vehicle or other property, (iii) there is injury to a person, (iv) the conditions require action to be taken by a vehicle operator, autonomous operation feature, pedestrian, or other party to avoid damage or injury, and/or (v) an anomalous condition is detected that requires an adjustment outside of ordinary vehicle operation. Incidents may include collisions, hard braking, hard acceleration, evasive maneuvering, loss of traction, detection of objects within a threshold distance from the vehicle 108, alerts presented to the vehicle operator, component failure, inconsistent readings from sensors 120, or attempted unauthorized access to the on-board computer by external sources.

Incidents may also include accidents, vehicle breakdowns, flat tires, empty fuel tanks, or medical emergencies. Incidents may further include identification of construction requiring the vehicle to detour or stop, hazardous conditions (e.g., fog or road ice), or other anomalous environmental conditions.

In some embodiments, the controller 204 may anticipate or project an expected incident based upon sensor or external data, allowing the controller 204 to send control signals to minimize the negative effects of the incident. For example, the controller 204 may cause the vehicle 108 to slow and move to the shoulder of a road immediately before running out of fuel. As another example, adjustable seats within the vehicle 108 may be adjusted to better position vehicle occupants in anticipation of a collision, windows may be opened or closed, or airbags may be deployed.

When an incident is determined to have occurred (block 412), information regarding the incident and the vehicle status may be recorded (block 414), either in the data storage 228 or the database 146. The information recorded may include sensor data, communication data, and settings or configuration information prior to, during, and immediately following the incident. In some embodiments, a preliminary determination of fault may also be produced and stored. The information may further include a determination of whether the vehicle 108 has continued operating (either autonomously or manually) or whether the vehicle 108 is capable of continuing to operate in compliance with applicable safety and legal requirements. If the controller 204 determines that the vehicle 108 has discontinued operation or is unable to continue operation (block 416), the method 400 may terminate. If the vehicle 108 continues operation, then the method 400 may continue as described below with reference to block 418.

Figure 4B:
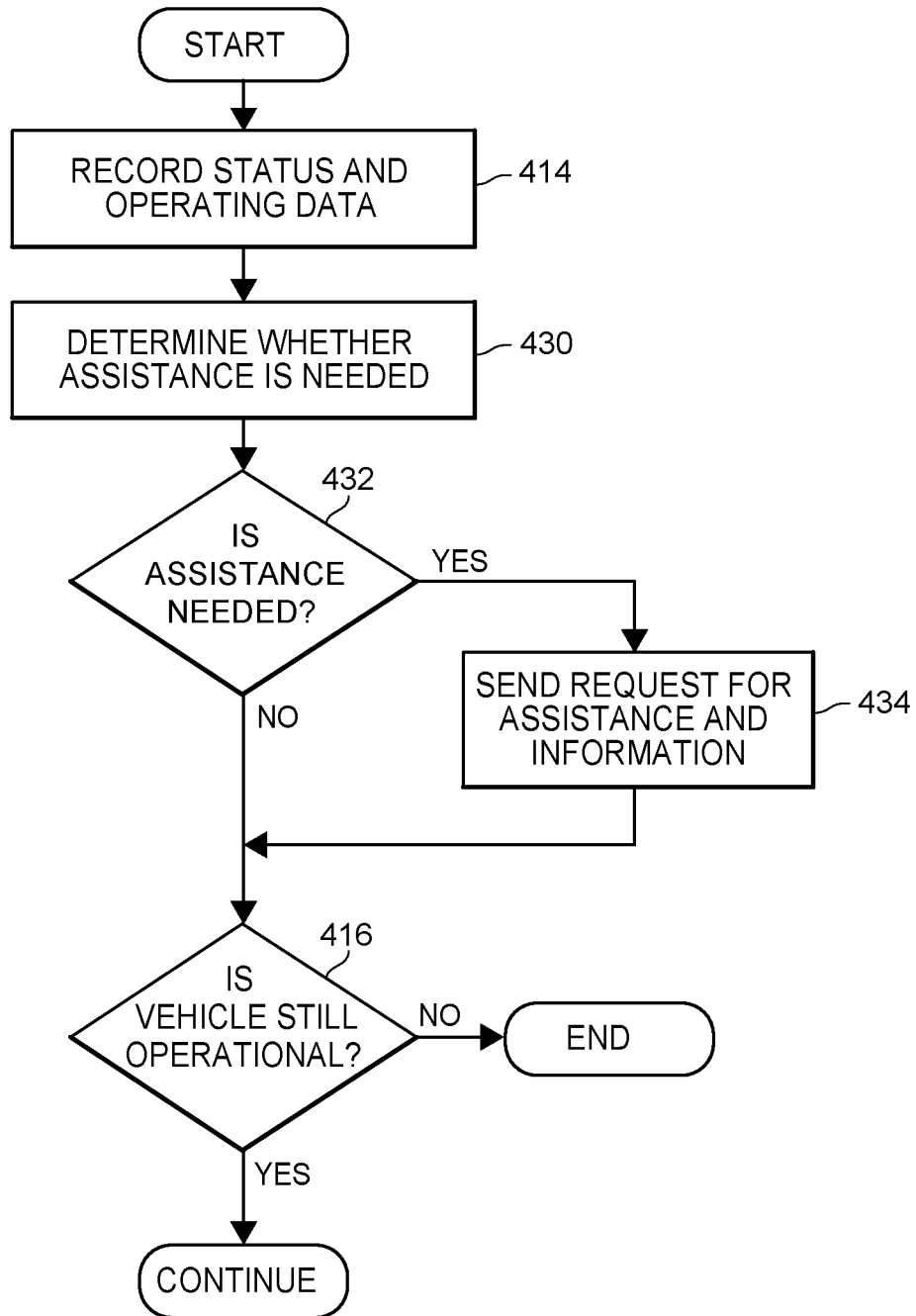

FIG. 4B illustrates an alternative portion of the computer-implemented method 400 following an incident. When an incident is determined to have occurred (block 412), the controller 204 or the server 140 may record status and operating information (block 414), as above. In some instances, the incident may interrupt communication between the vehicle 108 and the server 140 via network 130, such that not all information typically recorded will be available for recordation and analysis by the server 140.

Based upon the recorded data, the server 140 or the controller 204 may determine whether assistance may be needed at the location of the vehicle 108 (block 430). For example, the controller may determine that a head-on collision has occurred based upon sensor data (e.g., airbag deployment, automatic motor shut-off, LIDAR data indicating a collision, etc.) and may further determine based upon information regarding the speed of the vehicle 108 and other information that medical, police, and/or towing services will be necessary.

The determination that assistance is needed may further include a determination of types of assistance needed (e.g., police, ambulance, fire, towing, vehicle maintenance, fuel delivery, etc.). This determination may include analysis of the type of incident, the sensor data regarding the incident (e.g., images from outward facing or inward facing cameras installed within the vehicle, identification of whether any passengers were present within the vehicle, determination of whether any pedestrians or passengers in other vehicles were involved in the incident, etc.). The determination of whether assistance is needed may further include information regarding the determined status of the vehicle 108.

In some embodiments, the determination regarding whether assistance is needed may be supplemented by a verification attempt, such as a phone call or communication through the on-board computer 114. Where the verification attempt indicates assistance is required or communication attempts fail, the server 140 or controller 204 would then determine that assistance is needed, as described above. For example, when assistance is determined to be needed following an accident involving the vehicle 108, the server 140 may direct an automatic telephone call to a mobile telephone number associated with the vehicle 108 or the vehicle operator. If no response is received, or if the respondent indicates assistance is required, the server 140 may proceed to cause a request for assistance to be generated.

When assistance is determined to be needed (block 432), the controller 204 or the server 140 may send a request for assistance (block 434). The request may include information regarding the vehicle 108, such as the vehicle's location, the type of assistance required, other vehicles involved in the incident, pedestrians involved in the incident, vehicle operators or passengers involved in the incident, and/or other relevant information. The request for assistance may include telephonic, data, or other requests to one or more emergency or vehicular service providers (e.g., local police, fire departments, state highway patrols, emergency medical services, public or private ambulance services, hospitals, towing companies, roadside assistance services, vehicle rental services, local claims representative offices, etc.). After sending a request for assistance (block 434) or when assistance is determined not to be needed (block 432), the controller 204 or the server 140 may next determine whether the vehicle is operational (block 416), as described above. The method 400 may then end or continue as indicated in FIG. 4A.

In some embodiments, the controller 204 may further determine information regarding the likely cause of a collision or other incident. Alternatively, or additionally, the server 140 may receive information regarding an incident from the on-board computer 114 and determine relevant additional information regarding the incident from the sensor data. For example, the sensor data may be used to determine the points of impact on the vehicle 108 and another vehicle involved in a collision, the relative velocities of each vehicle, the road conditions at the time of the incident, and the likely cause or the party likely at fault. This information may be used to determine risk levels associated with autonomous vehicle operation, as described below, even where the incident is not reported to the insurer.

The controller 204 may determine whether a change or adjustment to one or more of the settings or configuration of the autonomous operation features has occurred (block 418). Changes to the settings may include enabling or disabling an autonomous operation feature or adjusting the feature's parameters (e.g., resetting the speed on an adaptive cruise control feature). For example, a vehicle operator may selectively enable or disable autonomous operation features such as automatic braking, lane centering, or even fully autonomous operation at different times. If the settings or configuration are determined to have changed, the new settings or configuration may be recorded (block 422), either in the data storage 228 or the database 146. For example, the Data Application may log autonomous operation feature use and changes in a log file, including timestamps associated with the features in use.

Next, the controller 204 may record the operating data relating to the vehicle 108 in the data storage 228 or communicate the operating data to the server 140 via the network 130 for recordation in the database 146 (block 424). The operating data may include the settings or configuration information, the sensor data, and/or the communication data discussed above. In some embodiments, operating data related to normal autonomous operation of the vehicle 108 may be recorded. In other embodiments, only operating data related to incidents of interest may be recorded, and operating data related to normal operation may not be recorded. In still other embodiments, operating data may be stored in the data storage 228 until a sufficient connection to the network 130 is established, but some or all types of incident information may be transmitted to the server 140 using any available connection via the network 130.

The controller 204 may then determine whether operation of the vehicle 108 remains ongoing (block 426). In some embodiments, the method 400 may terminate when all autonomous operation features are disabled, in which case the controller 204 may determine whether any autonomous operation features remain enabled. When the vehicle 108 is determined to be operating (or operating with at least one autonomous operation feature enabled), the method 400 may continue through blocks 406-426 until vehicle operation has ended. When the vehicle 108 is determined to have ceased operating (or is operating without autonomous operation features enabled), the controller 204 may record the completion of operation (block 428), either in the data storage 228 or the database 146. In some embodiments, a second timestamp corresponding to the completion of vehicle operation may likewise be recorded, as above.

Exemplary Extended Reality Environment within an Autonomous Vehicle

Autonomous and semi-autonomous vehicle technology is constantly improving. However, there are instances in which a manual touch is desired and/or required. For such instances, it is important that a user capable of driving remains aware of the surrounding area while the autonomous or semi-autonomous vehicle is in motion. A user falling asleep, for example, may have disastrous consequences should the autonomous or semi-autonomous vehicle need to switch to a manual control mode.

To address this concern, an autonomous or semi-autonomous vehicle may incorporate extended reality technology to keep a driver simultaneously engaged and aware of the surrounding area. An extended reality device may provide an interactive environment that reflects the environment surrounding the autonomous or semi-autonomous vehicle that the user may modify to accomplish these goals.

The disclosure below may also have applications outside of a standard driving environment. For example, an amusement park ride may make use of autonomous and/or semi-autonomous vehicle technology in conjunction with extended reality technology to create a game environment where certain tasks must be accomplished or score thresholds met to control aspects of the autonomous or semi-autonomous vehicle. Similarly, such an autonomous or semi-autonomous vehicle may be used in conjunction with extended reality technology as disclosed below for the purposes of training a driver that lacks experience, confidence, or familiarity.

Figure 5A:
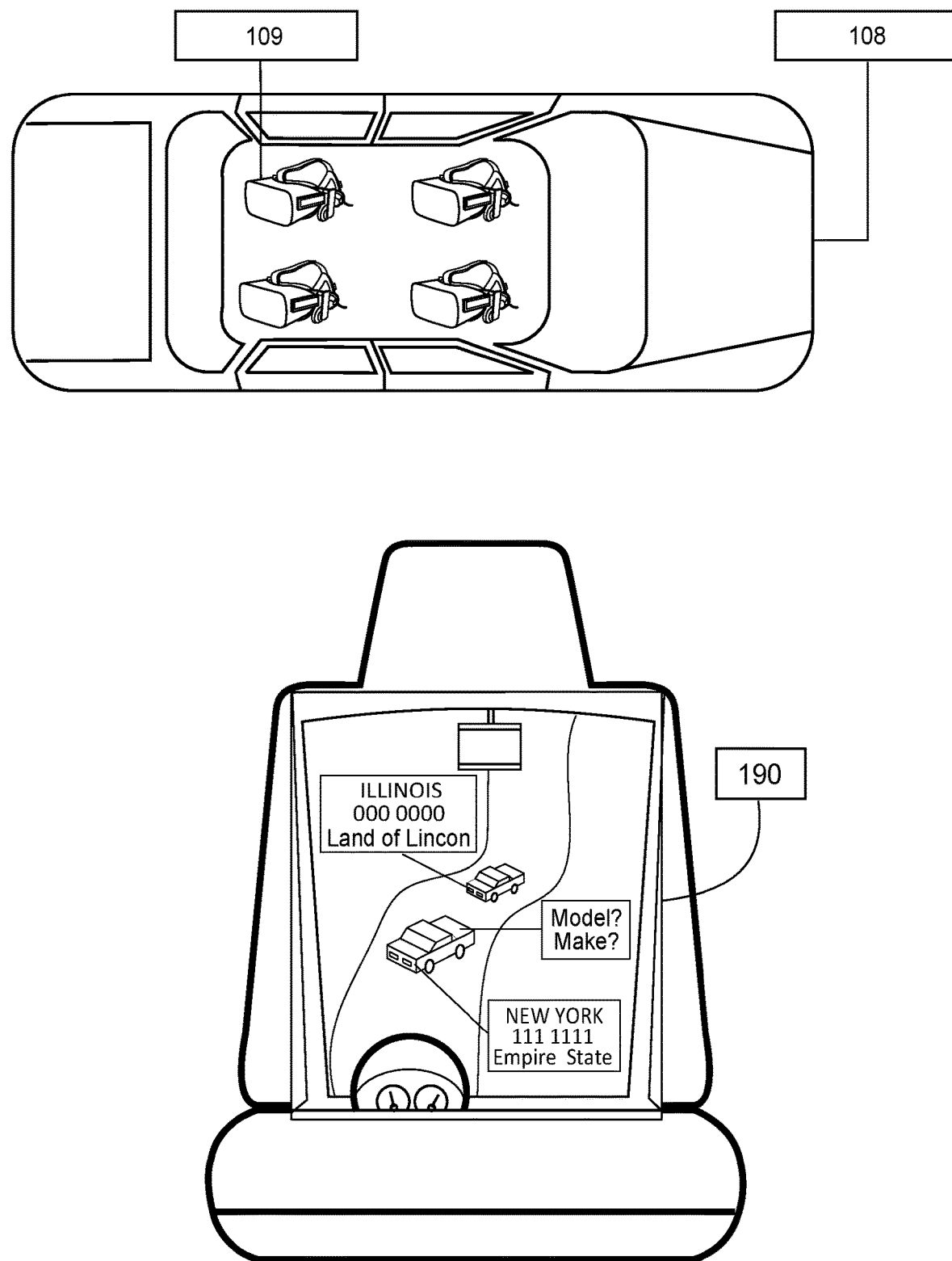
FIG. 5A illustrates an exemplary diagram for implementing an extended reality environment within an autonomous or semi-autonomous vehicle.

FIG. 5A depicts a diagram in which an extended reality device displays a surrounding environment to the users and passengers in an autonomous or semi-autonomous vehicle 108.

The extended reality device 109 may be a virtual reality headset that the user wears. In some embodiments, the virtual reality headset may be communicatively coupled to one or more user controllers 111. In further embodiments, the virtual reality headset may be configured to recognize hand movements from the user as inputs and the virtual reality headset may then treat the user as a user controller 111 for the purposes of receiving inputs. Depending on the embodiment, the user controller may be a joystick, part of the vehicle (such as a steering wheel, gas pedal, and/or brakes), a USB game controller, a touch screen, or some other controller capable of performing the functions as described herein.

In some implementations, the extended reality device 109 may be communicatively coupled to one or more other extended reality devices 109. For example, in an embodiment in which the extended reality device 109 is a virtual reality headset, the extended reality device may be communicatively coupled to an additional extended reality device 109 in the form of an additional virtual reality headset.

In some implementations, the coupled extended reality devices 109 may both display the same surrounding environments to both users and may take inputs from both users to modify the surrounding environment. For example, two people in an autonomous or semi-autonomous vehicle 108 may both be wearing virtual reality headsets displaying the surrounding area. The first user may input signals into the first virtual reality headset to indicate an object, such as a license plate. Both virtual reality headsets may then display the same modifications to the extended reality environment. In further implementations, the extended reality device 109 may be communicatively coupled to an external computing device 186 or extended reality device 109 outside the autonomous or semi-autonomous vehicle 108 by way of wireless communications such as Wi-Fi, BLUETOOTH, etc.

The extended reality device 109 may also be an augmented reality device in the autonomous or semi-autonomous vehicle 108. In some embodiments, the augmented reality device may be a mobile device that is communicatively coupled to an autonomous or semi-autonomous vehicle 108 and/or with an onboard vehicle computer 114. Depending on the implementation, such an augmented reality device may be coupled through wireless or wired means. In further embodiments, the augmented reality device may be integrated into the autonomous or semi-autonomous vehicle 108.

In some embodiments, the extended reality device 109 may be communicatively coupled with one or more augmented reality displays 190 in the autonomous or semi-autonomous vehicle 108. In some implementations, the displays 190 may be incorporated into the windows and/or windshield of the autonomous or semi-autonomous vehicle 108. In some implementations, the windows and/or windshield of the autonomous or semi-autonomous vehicle 108 may have a permanent, clear layer that functions as a monitor and/or display screen. In further implementations, when the augmented reality device connects with the augmented reality display 190, the display may only make modifications that do not reflect the area surrounding the autonomous or semi-autonomous vehicle 108. For example, the augmented reality display 190 may display a text box that pops up when a user indicates a sign but not the sign itself, as the user can already see the sign through the transparent screen.

In embodiments in which the autonomous or semi-autonomous vehicle is confined to a set locale (such as a ride or training device), the windows and/or windshield are connected to or are standard display screens. In some embodiments, the windows and/or windshield may display the view gathered from a camera or similar sensor attached to the autonomous or semi-autonomous vehicle as well as the augmented reality information.

In further implementations, the displays 190 may be screens incorporated into the backs of seats or on the dashboard of the autonomous or semi-autonomous vehicle 108. The displays 190 coupled to the extended reality device 109 may be configured to display different images or the same images simultaneously.

In some embodiments, the displays 190 may also function as user controllers 111 through the use of touch screen technology. In some embodiments, the user may tap the displays to input commands to the extended reality device 109. Depending on the implementation, the screens 190 may be communicatively coupled to one or more other screens 190, extended reality devices 109, and/or external computing devices 186.

The extended reality device 109 as a virtual reality headset may also be communicatively coupled to an extended reality device 109 in the form of an augmented reality device and one or more augmented reality displays 190 associated with the autonomous or semi-autonomous vehicle 108. In some embodiments, the augmented reality displays 190 may display what the user with the virtual reality headset sees and/or does. In further embodiments, the extended reality device 109 may also modify the surrounding extended reality environment.

Also depicted in FIG. 5A is an augmented reality screen 190 displaying an example extended reality environment. The augmented reality screen 190 may be presented on the windshield of the autonomous or semi-autonomous vehicle 108. The extended reality device 109 displays the view in front of the autonomous or semi-autonomous vehicle 108, such as the traffic and road ahead. A user may select one of the objects and/or vehicles in front of the autonomous or semi-autonomous vehicle 108, for example via the user controller 190 or touch screen. When a vehicle, for example, is selected, the extended reality device 109 may zoom in on the vehicle and/or display a prompt. In various embodiments, the prompt may be for information on the license plate, the make of the vehicle, the model of the vehicle, the speed at which it is traveling, or any other such characteristic. Similarly, the prompt may be for one or more characteristics of any such object selected by the user. The user may then input a response to the prompt. For example, the prompt may appear when a user indicates a vehicle in front of the autonomous or semi-autonomous vehicle 108.

In response, the extended reality device 109 may display a prompt for the user to identify the make and model of the indicated vehicle. The user may then input a response, identifying the make and/or model of the vehicle. In some implementations, the extended reality device 109 may then compare the user input to its own analysis and send a notification to the user that the user input was correct or incorrect. In further implementations, in response to the user inputting a response, the extended reality device 109 may score the user based upon the input response. In various further embodiments the extended reality device 109 may prompt the user to similarly find objects starting with particular letters, find types of road signs, or perform other similar activities.

Figure 5B:
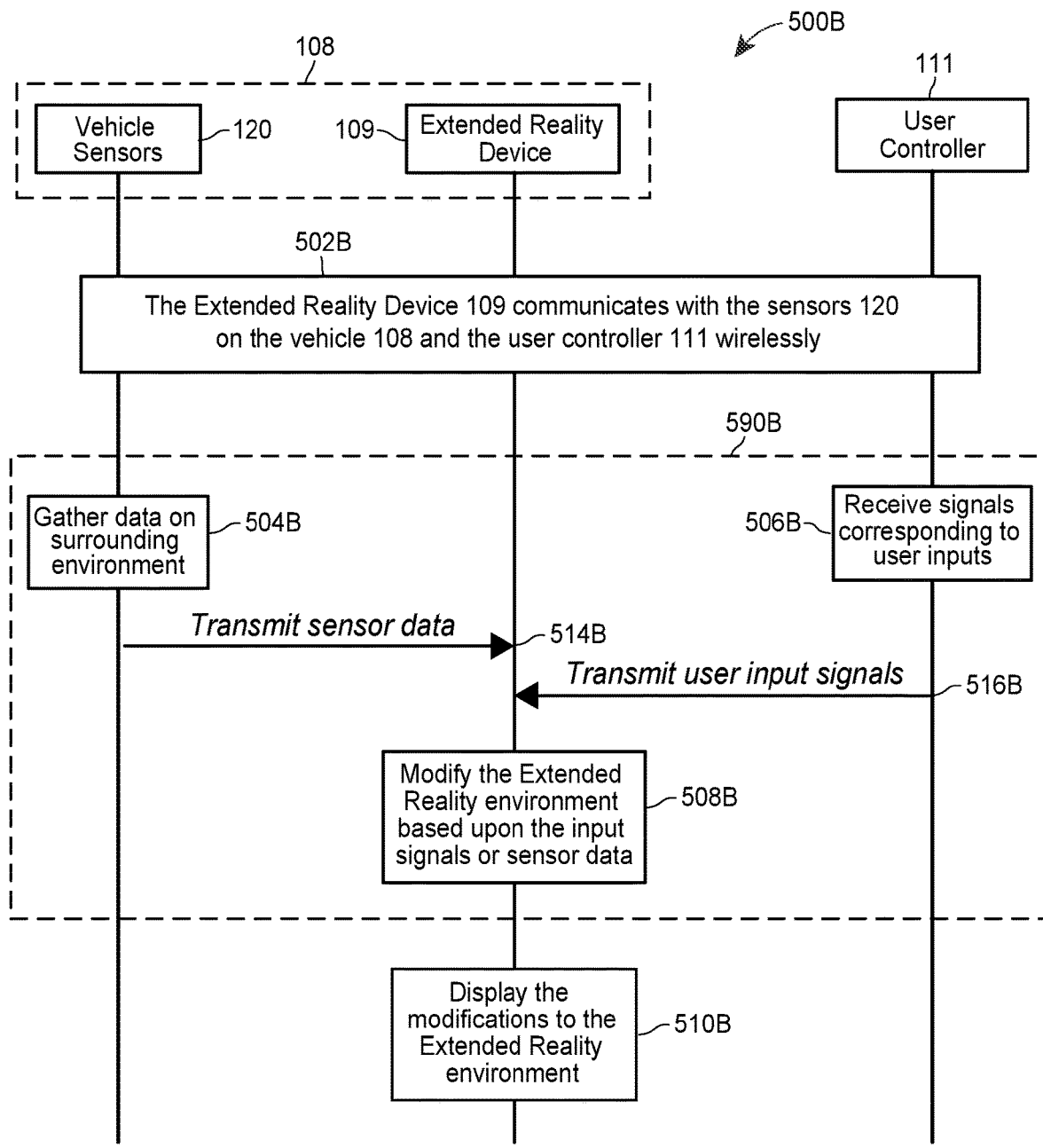
FIG. 5B illustrates a messaging diagram of an exemplary scenario for implementing an extended reality environment within an autonomous or semi-autonomous vehicle.

FIG. 5B depicts a messaging diagram of an exemplary scenario 500B for implementing an extended reality environment within an autonomous or semi-autonomous vehicle 108. In scenario 500B, an extended reality device 109 communicates 502B wirelessly with vehicle sensors 120 and user controller 111.

In some embodiments, extended reality device 109 may be attached to or otherwise part of the autonomous or semi-autonomous vehicle 108. In further embodiments, the extended reality device 109 may be an external computing device 186 and/or mobile device 110. Similarly, depending on the embodiment, the user controller 111 may be embedded within the autonomous or semi-autonomous vehicle 108, an external computing device 186 and/or mobile device 110. Further, the user controller 111 may be associated with the extended reality device 109.

Vehicle sensors 120 connected with the vehicle 108 gather 504B data on the surrounding environment and transmit 514B the data to the extended reality device 109. Similarly, the user controller 111 receives 506B signals corresponding to user inputs and transmits 516B the inputs to the extended reality device 109. In some embodiments, the received 506B signals may correspond with different button presses on a game controller acting as the user controller 111. In further embodiments, the received 506B signals may correspond with particular movements from a motion-based controller 111 (e.g., moving a motion controller up would transmit a signal representing upwards movement to the extended reality device 109).

In yet further embodiments, the controller 111 may be directly connected to and/or part of the extended reality device 109, and the received 506B signals may correspond with movement of the extended reality device 109 itself. In still further embodiments, the controller 111 may be directly associated with the autonomous or semi-autonomous vehicle 108 and the received 506B signals may correspond with manual movement of some portion of the vehicle 108 (e.g., movement of the steering wheel, movement of one or more seats, detected pressure on a touch screen embedded within a seat, opening or closing of a window, etc.).

Upon receiving the transmitted sensor data 514B and transmitted user input signals 516B, the extended reality device 109 analyzes the signals and determines appropriate modifications to make to the extended reality environment. For example, the extended reality device 109 may receive an input from the user controller 111 that indicates the user wants to select an oncoming sign. The extended reality device 109 may then present a listing of relevant information for the sign. The extended reality device 109 may display a clearer view of the sign (i.e. an exact replication of the sign). The extended reality device 109 may also display other characteristics of the sign, such as the shape, type, or color. When a sign for a restaurant, hotel, or other business is displayed, for example, the extended reality device 109 may also display a name, a distance, business hours, prices, a menu, or any similar piece of information. In further embodiments, the extended reality device 109 may display a prompt to the user, asking the user to identify key characteristics of the sign. Similarly, the extended reality device 109 may apply the above modifications to any such object selected by the user.

Modifications to the extended reality environment may also include rotating, zooming, and/or otherwise manipulating the surrounding environment based upon inputs from a user controller 111. Similarly, inputs from a user controller 111 may cause a virtual representation of the autonomous or semi-autonomous vehicle to move. In some embodiments, the autonomous or semi-autonomous vehicle 108 may directly communicate with the extended reality device 109 to modify the extended reality environment as described above.

The extended reality device 109 then actually modifies 508B the extended reality environment. Depending on the embodiment, the extended reality device 109 may modify 508B the extended reality environment based upon one or more of the transmitted input signals 516B and/or the transmitted sensor data 514B as described above.

Events 504B, 506B, 508B, 514B, and 516B collectively comprise the extended reality modification step 590B. In other FIGS. 5C-F, a similar collection of events may take place. In such instances, the series of events retains similar numbering (i.e. extended reality modification step 590C for FIG. 5C comprised of events 504C, 506C, 508C, 514C, and 516C).

After modifying 508B the extended reality environment, the extended reality device 109 displays 510B the modifications to the extended reality environment. In some embodiments, the extended reality environment may be an augmented reality environment and the extended reality device 109 displays 510B the modifications on a windshield, window, or screen display 190 of the vehicle 108. In further embodiments, the extended reality environment may be a virtual reality environment and the extended reality device 109 displays 510B the modifications through a screen display 190 associated with the extended reality device 109, such as a screen display 190 within a virtual reality headset.

Figure 5C:
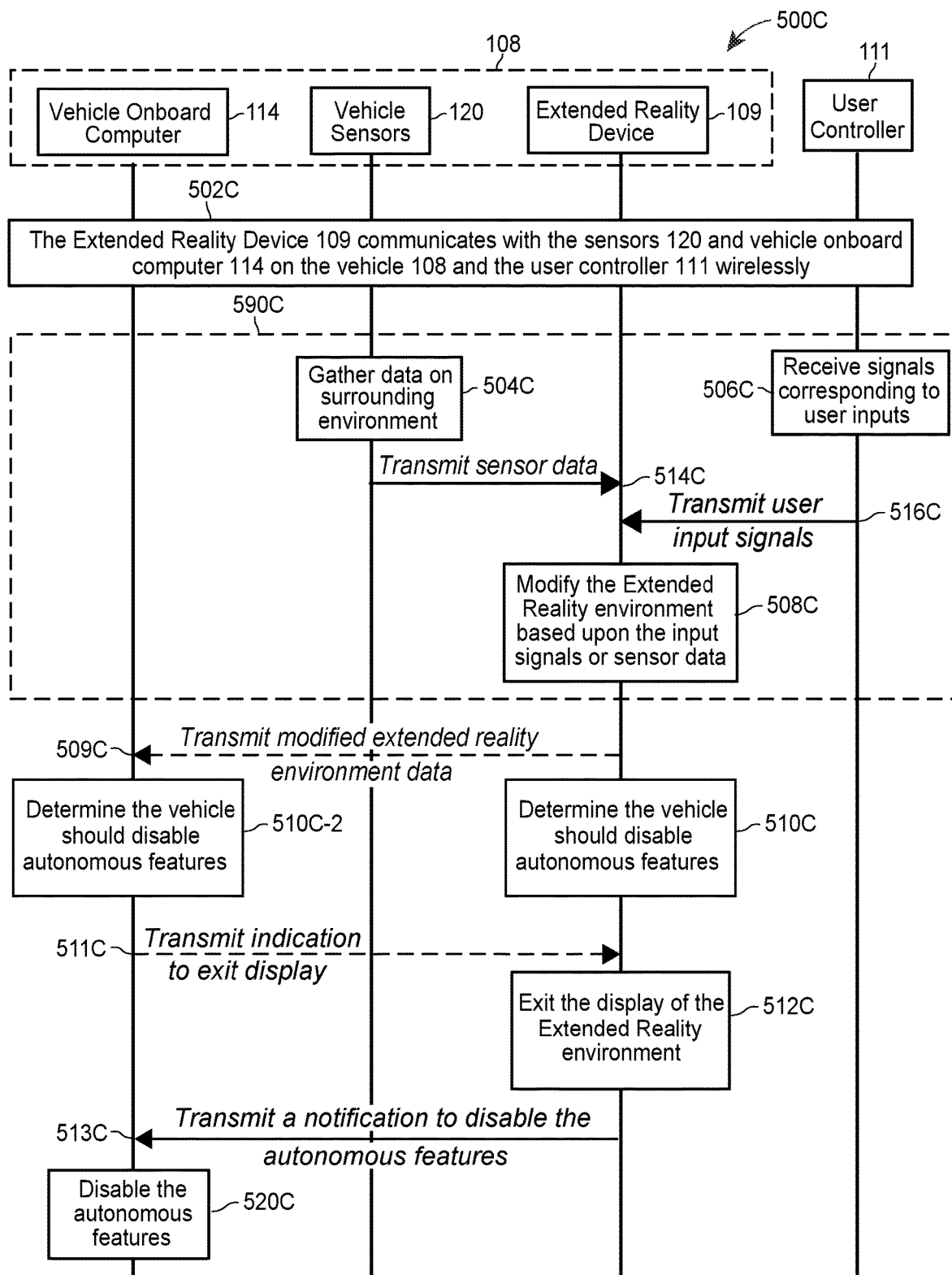
FIG. 5C illustrates a messaging diagram of an exemplary scenario in which the extended reality device implements an extended reality environment before eventually exiting the extended reality environment and returning manual control of the vehicle to a driver.

FIG. 5C depicts a messaging diagram of an exemplary scenario 500C for implementing an extended reality environment within an autonomous or semi-autonomous vehicle 108 before exiting the extended reality environment and returning manual control of the vehicle to a driver. In scenario 500C, an extended reality device 109 communicates 502C wirelessly with vehicle sensors 120, the vehicle onboard computer 114, and user controller 111. In some embodiments, extended reality device 109 may be attached to or otherwise part of the autonomous or semi-autonomous vehicle 108. In further embodiments, the extended reality device 109 may be an external and/or mobile device. Similarly, depending on the embodiment, the user controller 111 may be embedded within the autonomous or semi-autonomous vehicle 108, an external and/or mobile device, and/or may be associated with the extended reality device 109.

At least vehicle sensors 120, extended reality device 109, and user controller 111 collectively perform the extended reality modification step 590C as is described in step 590B of FIG. 5B. Vehicle sensors 120 connected with the vehicle 108 gather 504C data on the surrounding environment and transmit 514C the data to the extended reality device 109. Similarly, the user controller 111 receives 506C signals corresponding to user inputs and transmits 516C the inputs to the extended reality device 109. Upon receiving the transmitted sensor data 514C and transmitted user input signals 516C, the extended reality device 109 analyzes the signals and determines appropriate modifications to make to the extended reality environment. The extended reality device 109 then modifies 508C the extended reality environment. Depending on the embodiment, the extended reality device 109 may modify 508C the extended reality environment based upon one or more of the transmitted input signals 516C and/or the transmitted sensor data 514C.

After or as the extended reality environment is modified 508C, the extended reality device 109 may determine 510C that the vehicle should disable autonomous or semi-autonomous features. The extended reality device 109 may make the determination 510C through a number of different techniques. For example, the extended reality device 109 may use environmental data collected from sensors 120 to determine that upcoming terrain requires the user to take manual control of the vehicle. In further implementations, the extended reality device 109 may use data gathered by the vehicle onboard computer 114 to determine that traffic conditions are better suited to manual control. In still another example, the user may set a condition, fulfillment of which causes the autonomous or semi-autonomous features to be disabled (e.g., a certain amount of time lapsing, a particular time being reached, a geographical location being reached, coming within a set vicinity of a particular type of business or locale, etc.). The user may also input a command that allows the user to take manual control of the vehicle.

The extended reality device 109 exits 512C the display of the extended reality environment after determining 510C that the vehicle should disable autonomous or semi-autonomous features. In some embodiments, the extended reality device 109 first displays a message to the user, warning the user that autonomous features will be disabled. In further embodiments, the extended reality device 109 makes or causes the vehicle 108 to provide an audio warning to the user instead (e.g., a spoken warning in a previously indicated language, a spoken warning in a language determined by geographic location, a spoken warning in multiple languages, a spoken warning accompanied by a buzzer noise, etc.).

In still further embodiments, the extended reality device 109 provides both a visual and audio warning to the user. In yet further embodiments, the extended reality device 109 makes the determination 510C due to a user indication and thus provides no warning that a shift in autonomous or semi-autonomous features will occur. In some implementations, the extended reality device will provide a prompt to the user, requesting permission to disable the autonomous features.

In some embodiments, the extended reality device 109 transmits the modification 508C of the extended reality environment to the onboard vehicle computer 114, which instead makes the determination 510C-2. In such an embodiment, the onboard vehicle computer 114 transmits an indication to the extended reality device 109 to exit 512C the display of the extended reality environment. Similarly, in such an embodiment, the onboard vehicle computer 114 may make the determination 510C-2 using any of the methods described above for the extended reality device 109.

After the extended reality device 109 exits 512C the display of the extended reality environment, the extended reality device 109 transmits 513C a notification to disable the autonomous or semi-autonomous features to the onboard vehicle computer 114. In some embodiments, the extended reality device 109 may wait to receive confirmation from the user indicating the user is ready to take manual control of the autonomous or semi-autonomous vehicle 108 before transmitting 513C the notification to the onboard vehicle computer 114. Upon receipt of the notification, the onboard vehicle computer 114 disables 520C the autonomous or semi-autonomous features and restores manual control of the autonomous or semi-autonomous vehicle 108 to the user. In further embodiments, the onboard vehicle computer 114 may wait a predetermined period of time to allow a user to prepare for the shift to a manual mode.

Figure 5D:
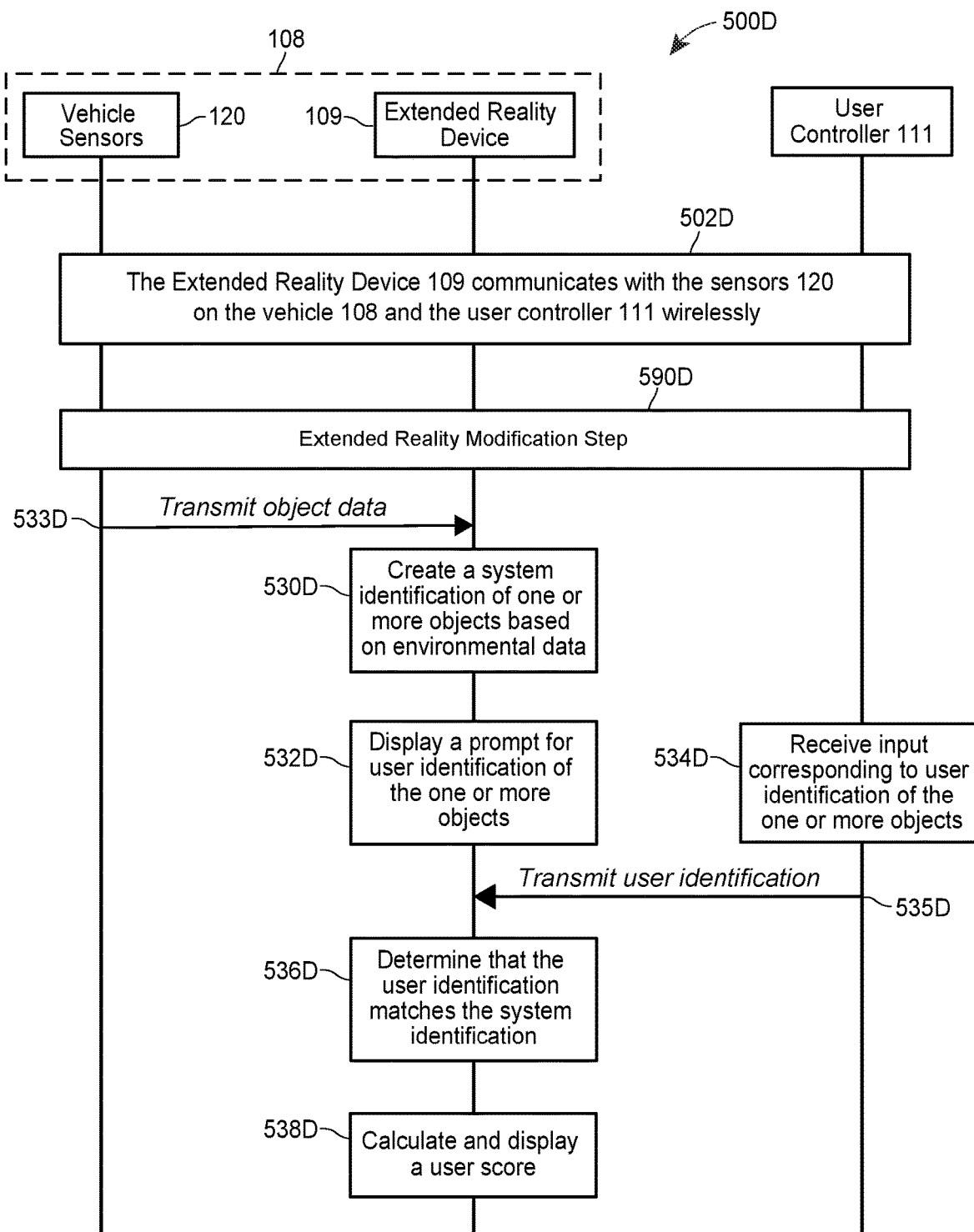
FIG. 5D illustrates a messaging diagram of an exemplary scenario in which the extended reality device implements an extended reality environment before creating and monitoring a game environment.

FIG. 5D depicts a messaging diagram of an exemplary scenario 500D for implementing an extended reality environment within an autonomous or semi-autonomous vehicle 108 in which the extended reality device 109 begins and monitors a game environment.

In scenario 500D, an extended reality device 109 communicates 502D wirelessly with vehicle sensors 120 and user controller 111. In some embodiments, extended reality device 109 may be attached to or otherwise part of the autonomous or semi-autonomous vehicle 108. In further embodiments, the extended reality device 109 may be an external and/or mobile device. Similarly, depending on the embodiment, the user controller 111 may be embedded within the autonomous or semi-autonomous vehicle 108, an external and/or mobile device, and/or may be associated with the extended reality device 109. Scenario 500D performs the extended reality modification step 590D similar to 590B of scenario 500B.

The vehicle sensors 120 transmit object data to the extended reality device 109. The object data being transmitted 533D may include: natural objects in the surrounding landscape (e.g., trees, rocks, lakes, etc.), artificial objects in the surrounding landscape (signs, traffic lights, buildings, etc.), other vehicles, wildlife, etc. The extended reality device 109 creates 530D a system identification of the objects in question. In some implementations, the system identification may be general (e.g., a tree, a car, a gas station). In further implementations, the system identification is more specific (e.g., a make and model of a car may be identified, a license plate number may be identified, a particular type of tree may be identified, etc.). In yet further implementations, the system identification is by a particular trait rather than object type (e.g., trees, grass, and a green awning all have system identifications of "green").

The extended reality device 109 displays 532D a prompt for user identification of the one or more objects. The prompt 532D may be visual, audio, or both (e.g., spoken and visually displayed in a previously indicated language, spoken and visually displayed in a language determined by geographic location, spoken and visually displayed in multiple languages, visually displayed only, spoken only, etc.).

After the prompt is displayed 532D, the user controller 111 receives inputs from the user corresponding to a user identification of the one or more objects. In some embodiments, the user may type out the user identification on a virtual or real keyboard. In further embodiments, the user may speak the user identification aloud, at which point the user controller 111 processes the user identification using natural language processing (NLP). In still further embodiments, the extended reality device 109 may display a list of potential options for identifications, and the user may select one. The user controller 111 then transmits 535D the user identification to the extended reality device 109.

The extended reality device 109 then determines 536D whether the user identification matches the system identification. In some embodiments, the extended reality device 109 determines 536D that the user identification matches the system identification when the two are precise matches. In further embodiments, the extended reality device 109 makes the determination 536D by comparing the user identification to synonyms for the system identification (e.g., the user identification of "shrub" would match a system identification of "bush"). In still further implementations, the extended reality device 109 may determine that the user identification does not match the system identification and instead displays a prompt (e.g., an object with a system identification of "willow tree" may display a prompt informing the user to be more specific if the user identification is "tree" or a prompt that the response is wrong if the user identification is "oak tree"). In some implementations, after a predetermined number of user identifications that do not match the system identification, the extended reality device 109 displays a secondary prompt (i.e. if the system identification includes both a make and model of a vehicle, the extended reality device may display the make but not the model as a hint). In further implementations, after a predetermined number of user identifications that do not match the system identification, the extended reality device 109 displays a new, unrelated prompt.

After the extended reality device 109 determines 536D that the user identification matches the system identification, the extended reality device 109 may calculate and/or display 538D a score to the user. In some implementations, the score is based upon the number of attempts made before the user identification matched the system identification. In further implementations, the score is based upon the time between the prompt and the determination 536D that the user identification matches the system identification. In still further embodiments, the score depends upon the number of consecutive times the user identification matches the system identification. Similarly, any other such method for calculating a score may be utilized.

In some embodiments, the user provides a user identification by picking an object that matches the system identification. The system then determines whether the user identification is correct. If the user identification is incorrect, the extended reality device 109 may provide a secondary system identification (e.g., a user may respond with "tree" to a system identification of "green", to which the extended reality device 109 may respond with a prompt of "artificial" when the correct object is a green sign).

Figure 5E:
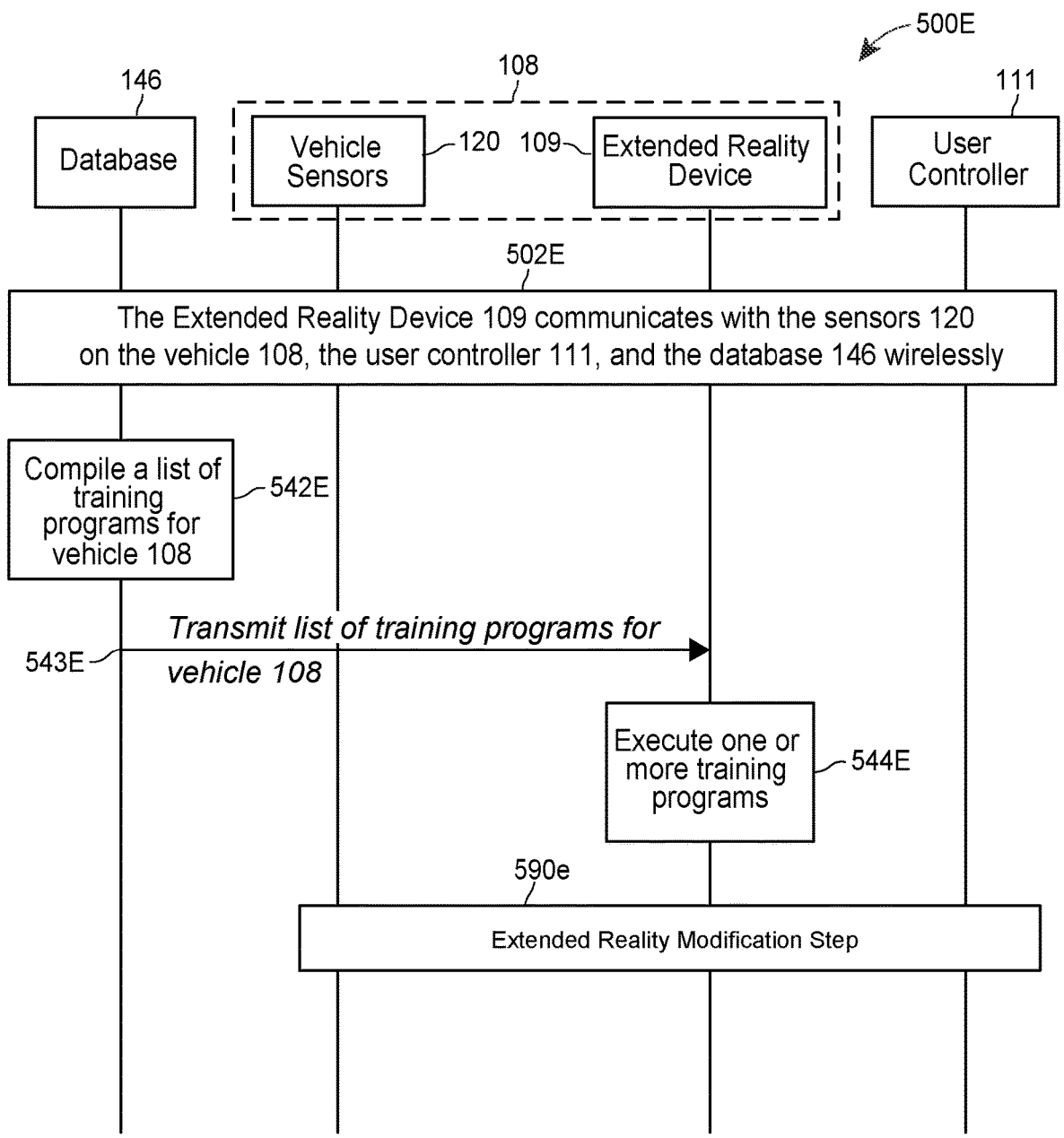
FIG. 5E illustrates a messaging diagram of an exemplary scenario in which the extended reality device chooses and runs a training program to be displayed via the extended reality device.

FIG. 5E depicts a messaging diagram of an exemplary scenario 500E for implementing an extended reality environment within an autonomous or semi-autonomous vehicle 108 after choosing a training program to be displayed via the extended reality device 109. In scenario 500E, an extended reality device 109 communicates 502E wirelessly with vehicle sensors 120, a database 146, and user controller 111. In some embodiments, extended reality device 109 may be attached to or otherwise part of the autonomous or semi-autonomous vehicle 108. In further embodiments, the extended reality device 109 may be an external and/or mobile device. Similarly, depending on the embodiment, the user controller 111 may be embedded within the autonomous or semi-autonomous vehicle 108, an external and/or mobile device, and/or may be associated with the extended reality device 109. In various embodiments, the database 146 may be contained on a vehicle head unit in autonomous or semi-autonomous vehicle 108 or may be external.

The database 146 compiles 542E a list of training programs for the user. In some embodiments, the list of training programs depends upon the make and model of the autonomous or semi-autonomous vehicle 108. In further embodiments, the list of training programs depends upon the type of autonomous or semi-autonomous vehicle 108 (e.g., car, truck, boat, etc.). In yet further embodiments, the list of training programs depends upon the experience level of the user. In still further embodiments, the list of training programs depends upon predetermined user preferences.

The training programs may, for example, encompass tutorials on how to drive and/or utilize different features of an autonomous or semi-autonomous vehicle 109. As an illustrative example, there may be a series of three training programs designed for a user driving a car. The first training program teaches basic driving rules. The second training program teaches what sorts of signs a driver may encounter and how to react to said signs. The third training program teaches how to activate and use specific features of the car.

The first training program in the above example may display basic information that is key to a driver in the present location. For example, the training program may show an indication of the action the autonomous or semi-autonomous vehicle is undertaking along with an explanation for why the autonomous or semi-autonomous vehicle is undertaking the action. For example, the extended reality device 109 may show a graphic of a car turning right at a red stoplight along with an explanation of circumstances under which a driver may turn right on red as the autonomous or semi-autonomous vehicle 108 turns right on red.

In the second training program in the above example, the extended reality device 109 may show a graphic of a stop sign and a vehicle slowing down in the corner of the display 190 along with an explanation noting that a driver must come to a complete stop at a stop sign as the autonomous or semi-autonomous vehicle 108 approaches a stop sign.

In the third training program in the above example, the extended reality device 109 may show a graphic and/or representation of a dashboard along with a view outside the front windshield. Pressing individual controls within the vehicle 108 may bring up an explanation of which function each control performs. In some examples, the extended reality device 109 may communicate with the autonomous or semi-autonomous vehicle to trigger the function of the control by pressing the virtual representation of said control.

After the database 146 compiles 542E a list of training programs for the user, the database 146 transmits 543E the list of training programs to the extended reality device 109. Upon receipt of the transmitted 543E list, the extended reality device 109 executes 544E one or more of the training programs. In some embodiments, the extended reality device 109 chooses a training program based upon completion of other training programs in the list. In further embodiments, the extended reality device 109 prompts the user to pick one or more training programs before executing 544E the chosen programs. In some implementations in which the user chooses multiple training programs, the extended reality device 109 may queue the programs to be executed sequentially, without the need for further user input.

After executing 544E the one or more training programs, the extended reality device 109, user controller 111, and the vehicle sensors 120 begin the extended reality environment modification step 590E, similar to 590B in FIG. 5B above.

Figure 5F:
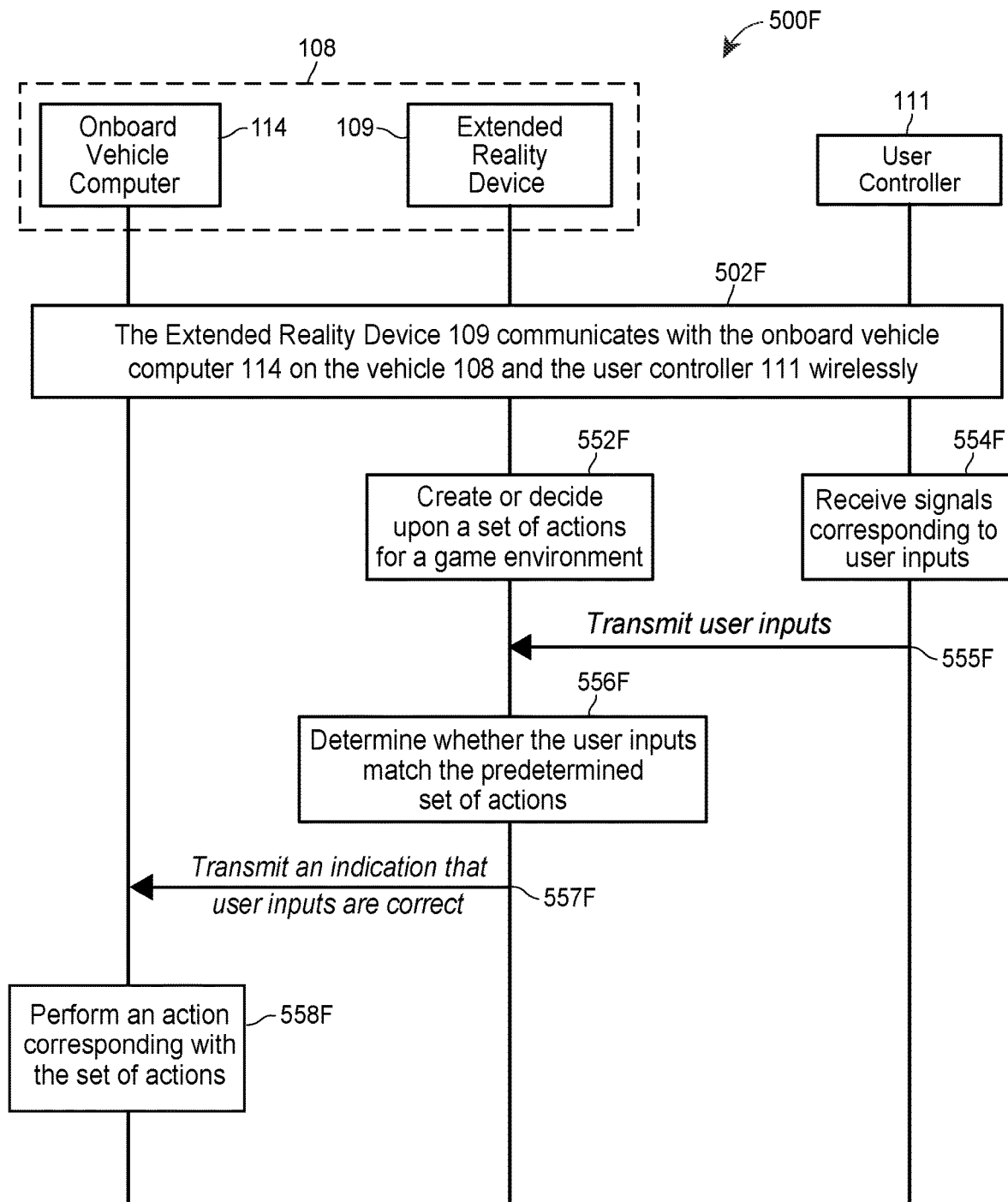
FIG. 5F illustrates a messaging diagram of an exemplary scenario similar to FIG. 5C, but in which the extended reality device issues commands to the autonomous or semi-autonomous vehicle.

FIG. 5F depicts a messaging diagram of an exemplary scenario 500F for implementing an extended reality environment within an autonomous or semi-autonomous vehicle 108 in which the extended reality device 109 begins and monitors a game environment while issuing commands to the autonomous or semi-autonomous vehicle 108.

In scenario 500F, an extended reality device 109 communicates 502F wirelessly with onboard vehicle computer 114 and user controller 111. In some embodiments, extended reality device 109 may be attached to or otherwise part of the autonomous or semi-autonomous vehicle 108. In further embodiments, the extended reality device 109 may be an external and/or mobile device. Similarly, depending on the embodiment, the user controller 111 may be embedded within the autonomous or semi-autonomous vehicle 108, an external and/or mobile device, and/or may be associated with the extended reality device 109.

The extended reality device creates 552F or decides upon a set of actions for a game environment. In some embodiments, creating 552F or deciding upon a set of actions may include determining a set of correct actions and timings (e.g., a turn left when a sign is displayed on a screen). The user controller 111 receives 554F signals corresponding to user inputs. Depending on the embodiment, the user controller 111 may receive 554F signals before, after, or while the extended reality device 109 creates 552F a set of actions for a game environment. After the user controller 111 receives 554F signals corresponding to user inputs, the user controller 111 transmits 555F the user input signals to the extended reality device 109.

After the extended reality device 109 creates 552F a set of actions for a game environment and the user controller 111 transmits 555F the user input signals to the extended reality device 109, the extended reality device 109 determines 556F whether the user input signals match the predetermined set of actions.

After the extended reality device 109 determines 556F whether the user input signals match the predetermined set of actions, the extended reality device 109 transmits 557F an indication to the onboard vehicle computer 114 that the user inputs are correct. The onboard vehicle computer 114 then performs 558F an action corresponding with the set of actions. In some embodiments, the autonomous or semi-autonomous vehicle 108 may be part of a ride, and the action taken may directly reflect the set of actions (e.g., turning the vehicle to "avoid" a virtual threat). In further embodiments, the vehicle 108 may be part of a ride, and the action taken may not directly reflect the set of actions (e.g., firing a toy gun at virtual threats—after "defeating" the threat, the vehicle then continues along a predetermined path).

Figure 5G:
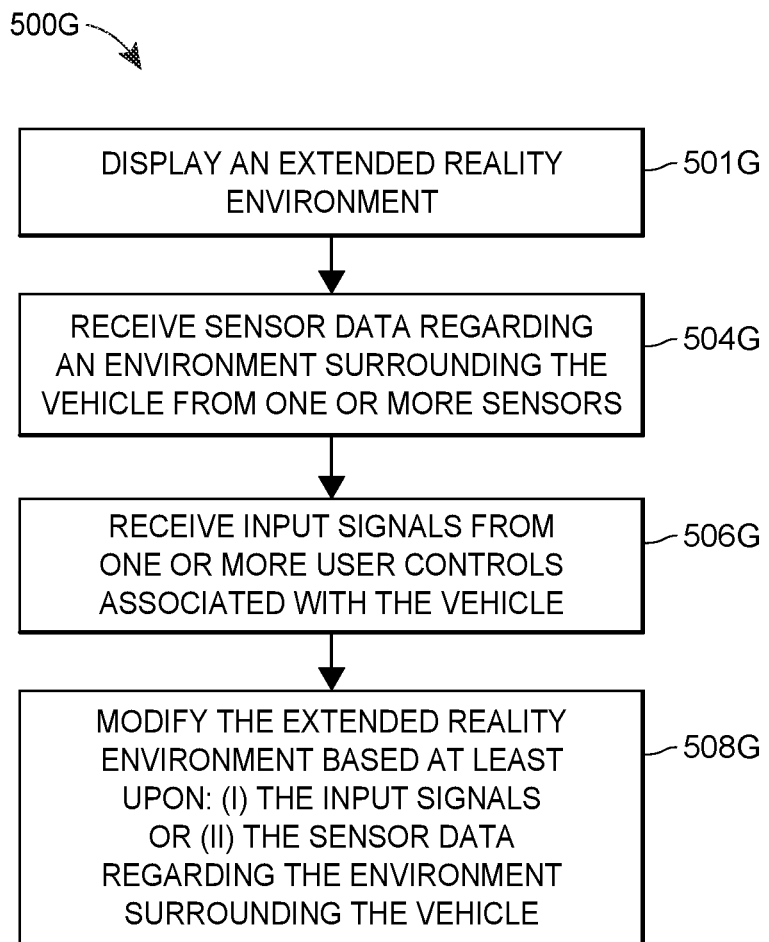
FIG. 5G illustrates an exemplary flow diagram for a computer-implemented method for implementing an extended reality environment within an autonomous or semi-autonomous vehicle.

FIG. 5G depicts an exemplary flow diagram for a computer-implemented method 500F for implementing an extended reality environment within an autonomous or semi-autonomous vehicle 108.

The method 500G may begin by displaying, by way of an extended reality device 109, an extended reality environment (block 501G). The extended reality device may then receive sensor data regarding an environment surrounding the vehicle from one or more sensors (block 504G). The extended reality device 109 may then further receive input signals from one or more user controls associated with the vehicle (block 506G). Subsequently, the extended reality device 109 then modifies the extended reality environment based at least upon: (i) the input signals or (ii) the sensor data regarding the environment surrounding the vehicle 108 (block 508G).

At block 501G, the extended reality device 109 displays an extended reality environment to the user. In some embodiments, the extended reality device 109 may display the extended reality environment by way of a virtual reality headset associated with the autonomous or semi-autonomous vehicle 108. In further embodiments, the extended reality device 109 may display the extended reality environment by way of one or more augmented reality screen displays 190 associated with the vehicle.

At block 504G and while displaying the extended reality environment, the extended reality device 109 may receive sensor data regarding an environment surrounding the vehicle from one or more vehicle sensors 120. At block 506G, the extended reality environment before, after, or contemporaneously with the received sensor data—may also receive input signals from one or more user controls associated with the autonomous or semi-autonomous vehicle 108. At block 508G and after receiving either the sensor data or the input signals, the extended reality device 109 modifies the extended reality environment based at least upon: (i) the input signals or (ii) the sensor data regarding the environment surrounding the autonomous or semi-autonomous vehicle 108.

Exemplary Autonomous Vehicle Validation Tool

Though the use of autonomous and semi-autonomous vehicle technology provides a great number of benefits, there are certain downsides with present implementations, particularly when a driver is not present. One such concern is a lack of a process for gathering information about an autonomous or semi-autonomous vehicle, such as registration information when a driver is not present in the vehicle. When an autonomous or semi-autonomous vehicle is in an accident, for example, it is important that law enforcement and other similarly interested parties be able to quickly gain access to information about the owner of the vehicle. Registration information that may be relevant, then, may include a name, address, phone number, or other similarly identifying information.

Figure 6A:
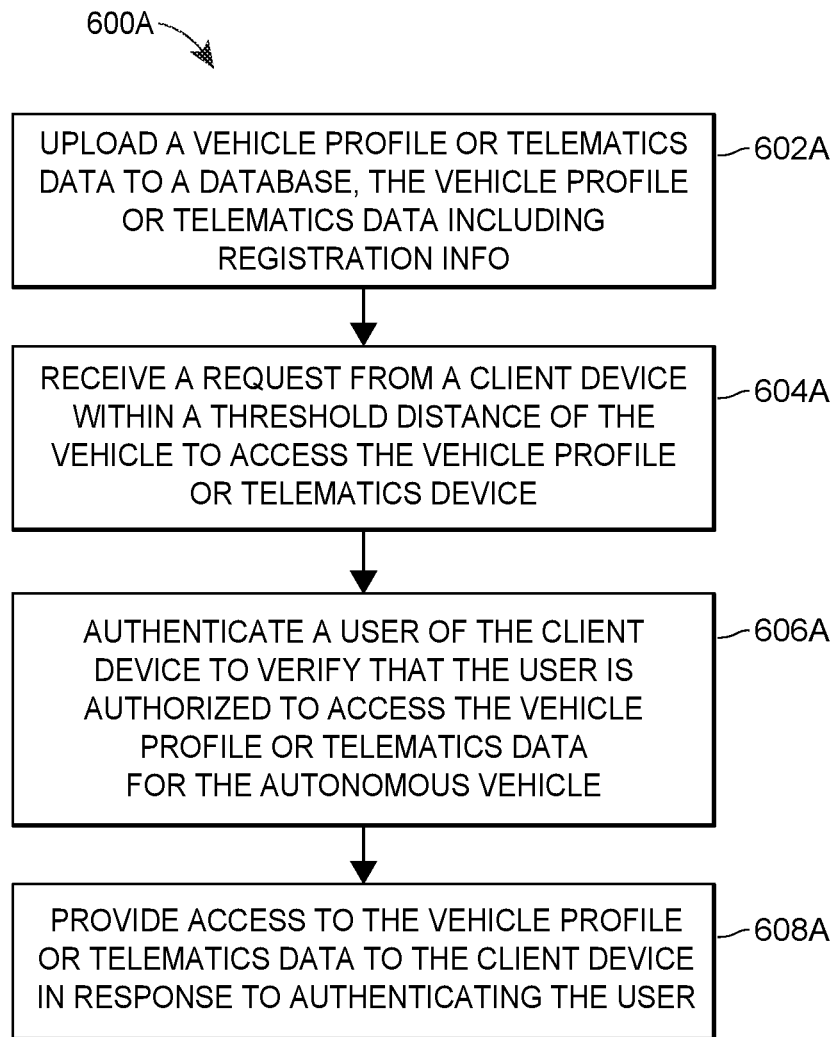
FIG. 6A illustrates an exemplary flow diagram for a computer-implemented method in which an autonomous or semi-autonomous vehicle may receive and grant access for a request from a device for access to a vehicle profile or telematics data, including registration information.

FIG. 6A depicts an exemplary computer-implemented method 600A in which an autonomous or semi-autonomous vehicle 108 may receive a request from a mobile device 110 at a vehicle onboard computer 114 for access to a vehicle profile or telematics data, said vehicle profile or telematics data including registration information for the autonomous or semi-autonomous vehicle 108. The vehicle onboard computer 114 may then authenticate the user of the client mobile device 110 before providing or denying access.

The client mobile device 110 may be a mobile phone, laptop, law enforcement device, or other such client device. Depending on the embodiment, the user may be able to download the vehicle profile or telematics data including registration information from a database 146 onto the client device 110. Alternatively or additionally, a server may provide a link to a website where the user may view the information temporarily. Further, the vehicle onboard computer 114 may provide the user with a number and/or location the user can use to gain access to the information via the client device 110.

In method 600A, the onboard vehicle computer 114 uploads a vehicle profile or telematics data to a database, including registration information (block 602A). The onboard vehicle computer 114 may then receive a request from a client device 110 within a threshold distance of the vehicle to access the vehicle profile or telematics device (block 604A). The onboard vehicle computer 114 may then authenticate a user of the client device to verify that the user is authorized to access the vehicle profile or telematics data for the autonomous or semi-autonomous vehicle 108 (block 606A). The onboard vehicle computer 114 may then provide access to the vehicle profile or telematics data to the client device 110 in response to authenticating the user (block 608A).

At block 602A, the vehicle onboard computer 114 of an autonomous or semi-autonomous vehicle 108 uploads a vehicle profile or telematics data to a database 146. The vehicle profile or telematics data may include registration information for the autonomous or semi-autonomous vehicle 108. In further embodiments, the vehicle onboard computer 114 of the autonomous or semi-autonomous vehicle 108 may upload the vehicle profile or telematics data periodically on a set time interval (once per hour, once per day, once per week, etc.) and/or in response to irregularly occurring events (when repaired, at a tollway, etc.). The vehicle onboard computer 114 of the autonomous or semi-autonomous vehicle 108 may also upload the vehicle profile or telematics data in response to receiving a request by a user to upload the vehicle profile or telematics data.

The database 146 may be physically present on a head unit of the autonomous or semi-autonomous vehicle 108 or may be part of an external server 140. For embodiments in which the database 146 is part of an external server 140, the vehicle onboard computer 114 may communicate with the database 146 via network 130 using wireless communication techniques such as Wi-Fi, BLUETOOTH, etc. For embodiments in which the database 146 is part of a head unit of the autonomous or semi-autonomous vehicle 108, the vehicle onboard computer 114 may also communicate with the database 146 via a vehicle bus and/or via network 130.

At block 604A, the vehicle onboard computer 114 then receives a request from a client mobile device 110 to access the vehicle profile or telematics data. As noted above, the client mobile device 110 may be a smart phone, a law enforcement smart phone, a laptop, a specially-designed laptop (such as a Toughbook), a piece of specialized law enforcement technology, or other similar device. In some embodiments, the autonomous or semi-autonomous vehicle 108 may include processing hardware for a communication component 122 located on the exterior of the autonomous or semi-autonomous vehicle 108. In some implementations of such embodiments, communication component 122 uses NFC technology and the client mobile device 110 must be within a threshold distance of the autonomous or semi-autonomous vehicle 108 to communicate with the communication component 122 using link 116.

At block 606A and after receiving the request from the client mobile device 110, the vehicle onboard computer 114 may then authenticate the user of the client mobile device 110 to verify that the user is authorized to access the vehicle profile or telematics data for the autonomous or semi-autonomous vehicle 108. In some embodiments, the client device 110 may transmit a unique identifier or key to the communication component 122 that the onboard computer compares to a list of authorized identifiers for authentication. Depending on the embodiment, the unique identifier or key may be a username and password; a cryptographic key; a transmitted ID; a picture; results of facial recognition; a unique, randomly generated code; or any other similar identifier as described herein.

The client device 110 may transmit the unique identifier automatically or may prompt the user to allow the client device 110 to send the identifier, such as through an app notification on mobile device 110. In further embodiments, the vehicle onboard computer 114 may send an additional prompt for authentication as a dual authentication method. Depending on the implementation, the additional prompt may be any of the authentication methods listed herein.

In some embodiments, in response to the vehicle onboard computer 114 successfully authenticating the mobile device 110, the mobile device 110 displays a notification that authentication was successful to the user. Similarly, in response to the vehicle onboard computer 114 failing to authenticate the mobile device 110, the mobile device 110 displays a notification that authentication failed to the user. In some implementations, the notification that authentication has failed may include an explanation (i.e., insufficient permissions, connection failure, etc.). In further implementations, the vehicle onboard computer 114 may send a notification to the owner of the autonomous or semi-autonomous vehicle 108.

In further embodiments, in response to the vehicle onboard computer 114 successfully authenticating the mobile device 110, the vehicle onboard computer 114 may automatically update the vehicle profile or telematics data in the database before providing access to the vehicle profile or telematics data.

At block 608A and in response to successfully authenticating the mobile device 110, the vehicle onboard computer 114 provides access to the vehicle profile or telematics data to the client device 110. In some embodiments, the vehicle onboard computer 114 transmits the vehicle profile or telematics data to the client device 110. In some scenarios, the user is only able to view the vehicle profile or telematics data on the client mobile device 110 that was authenticated.

Figure 6B:
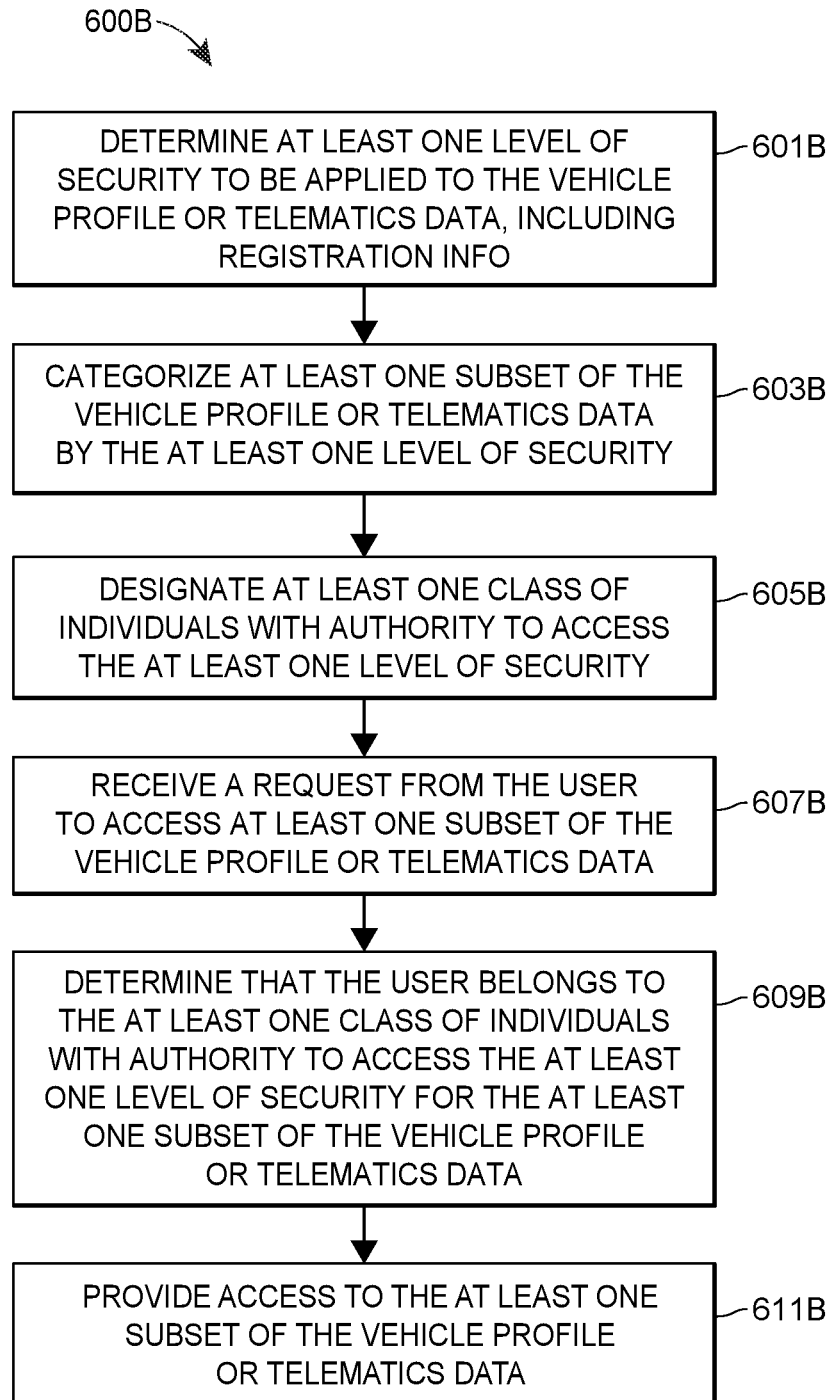
FIG. 6B illustrates an exemplary flow diagram for a computer-implemented method in which a vehicle onboard computer and/or external computing device determines that a user is authorized to access a vehicle profile or telematics data, including registration information.

FIG. 6B depicts an exemplary computer-implemented method 600B for a vehicle onboard computer 114 and/or external computing device 186 to determine that a user is authorized to access a vehicle profile or telematics data including registration information for an autonomous or semi-autonomous vehicle 108.

In method 600B, the vehicle onboard computer 114 and/or external computing device 186 may determine at least one level of security to be applied to the vehicle profile or telematics data, including registration info (block 601B). The vehicle onboard computer 114 and/or external computing device 186 may then categorize at least one subset of the vehicle profile or telematics data by the at least one level of security (block 603B). The vehicle onboard computer 114 and/or external computing device 186 may then designate at least one class of individuals with authority to access the at least one level of security (block 605B). The vehicle onboard computer 114 and/or external computing device 186 may then receive a request from the user to access at least one subset of the vehicle profile or telematics data (block 607B).

The vehicle onboard computer 114 and/or external computing device 186 may then determine that the user belongs to the at least one class of individuals with authority to access the at least one level of security for the at least one subset of the vehicle profile or telematics data (block 609B). The vehicle onboard computer 114 and/or external computing device 186 may then provide access to the at least one subset of the vehicle profile or telematics data (block 611B).

At block 601B, the vehicle onboard computer 114 and/or external computing device 186 determines at least one level of security to be applied to the vehicle profile or telematics data, including registration information. At block 603B, the vehicle onboard computer 114 and/or external computing device 186 then categorizes at least one subset of the vehicle profile or telematics data by the at least one level of security. In some embodiments, the vehicle onboard computer 114 and/or external computing device 186 applies a single level of security to the vehicle profile or telematics data.

In further embodiments, the vehicle onboard computer 114 and/or external computing device 186 applies multiple levels of security for different aspects of the vehicle profile or telematics data. For example, there may be a master level of security assigned to users such as the owner of the autonomous or semi-autonomous vehicle 108, the manufacturer, and/or law enforcement that allows the user access to the entire vehicle profile as well as a lesser level of access that may only allow a user to access the registration information but not the rest of the vehicle profile or telematics data.

At block 605B and after categorizing the vehicle profile or telematics data, the vehicle onboard computer 114 and/or external computing device 186 designates at least one class of individuals with authority to access the at least one level of security. In some embodiments, the manufacturer may modify the designations. In further embodiments, the owner of the autonomous or semi-autonomous vehicle 108 may modify the designations. In some implementations, the owner may modify the designations for some users but not for others (e.g., the manufacturer, law enforcement, etc.).

At block 607B, the vehicle onboard computer 114 then receives a request from the mobile device 110 of a user to access at least one subset of the vehicle profile or telematics data. In some embodiments, the user may designate which subset is to be accessed. In further embodiments, the mobile device 110 may automatically designate the appropriate subset. In still further embodiments, the vehicle onboard computer 114 may designate the proper subset based upon the mobile device 110 identity.

At block 609B, the vehicle onboard computer 114 then determines that the user of the mobile device 110 belongs to the at least one class of individuals with authority to access the at least one level of security for the at least one subset of the vehicle profile or telematics data. In some embodiments, the vehicle onboard computer 114 may determine that the user of the mobile device 110 does not belong to the class of individuals with authority to access the requested subset of the vehicle profile or telematics data and may display an error message. In further embodiments, the vehicle onboard computer 114 may determine that the user of the mobile device 110 does not belong to a class of individuals with authority to access the requested subset of the vehicle profile or telematics data, but has permission to access a different subset and may instead display any and/or all subsets of the vehicle profile or telematics data that the user does have authority to access.

At block 611B and upon determining that the user of the mobile device 110 belongs to the at least one class of individuals with authority to access the at least one level of security for the at least one subset of the vehicle profile or telematics data, the vehicle onboard computer 114 then provides access to the at least one subset of the vehicle profile or telematics data. In some embodiments, the vehicle onboard computer 114 may transmit the subsets of the vehicle profile or telematics data. In further embodiments the vehicle onboard computer 114 may make the subsets available for remote viewing. In still further embodiments, the vehicle onboard computer 114 may allow some classes of individuals to download the vehicle profile or telematics data while only allowing other classes of individuals to view the information remotely.

Figure 6C:
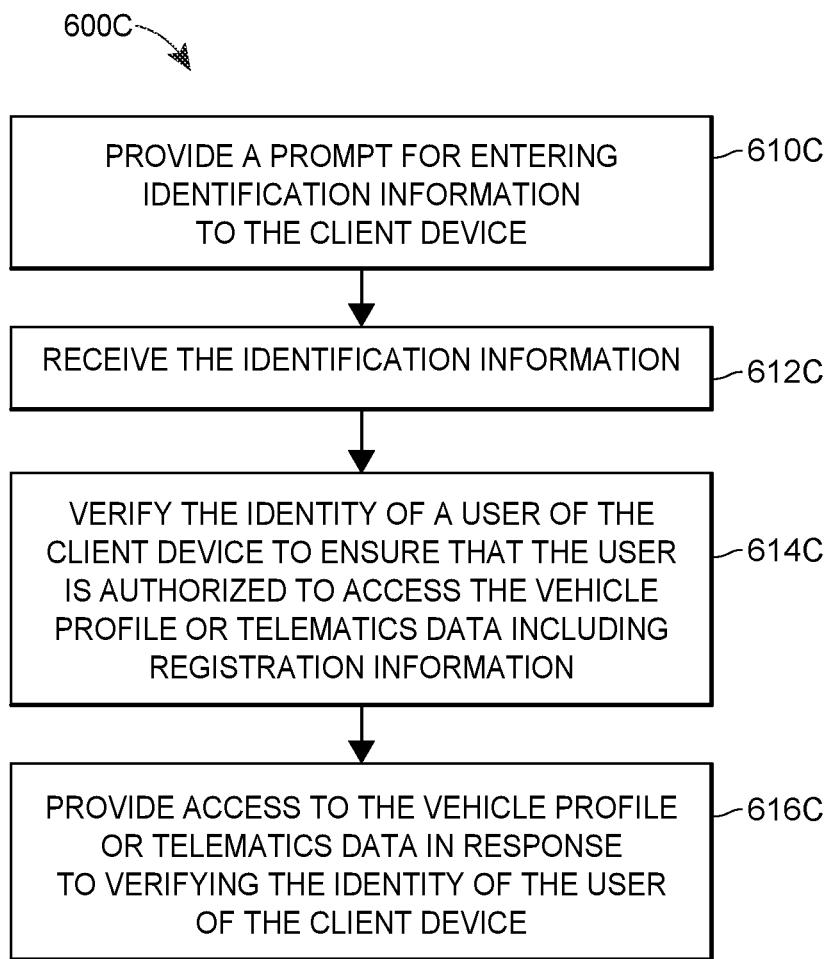
FIG. 6C illustrates an exemplary flow diagram for a computer-implemented method for verifying the identity of a client device requesting access to the vehicle profile or telematics data, including registration information for an autonomous or semi-autonomous vehicle.

FIG. 6C depicts an exemplary computer-implemented method 600C for verifying the identity of a client mobile device 110 requesting access to the vehicle profile or telematics data including registration information for an autonomous or semi-autonomous vehicle 108.

In method 600C, the vehicle onboard computer 114 and/or external computing device 186 may provide a prompt for entering identification information to the client device (block 610C). The vehicle onboard computer 114 and/or external computing device 186 may then receive the identification information (block 612C). The vehicle onboard computer 114 and/or external computing device 186 may then verify the identity of a user of the client device to ensure that the user is authorized to access the vehicle profile or telematics data including registration information (block 614C). The vehicle onboard computer 114 and/or external computing device 186 may then provide access to the vehicle profile or telematics data in response to verifying the identity of the user of the client device (block 616C).

At block 610 C, the vehicle onboard computer 114 provides a prompt to the mobile device 110 for the user to enter identification information. Depending on the embodiment, the prompt may be for a username and password, a button in an application on the mobile device 110 which a user must login to access, a security question, a privacy key, or any other similar prompt. At block 612C and after the user enters the identification information, the mobile device 110 transmits the information to the vehicle onboard computer 114, which receives the information.

At block 614C and after receiving the identification information, the vehicle onboard computer 114 uses the identification information to verify the identity of the user of the client device 110 to ensure that the user is authorized to access the vehicle profile or telematics data including registration information. At block 616C and in response to verifying the identity of the user of the client device 110, the vehicle onboard computer 114 provides access to the vehicle profile or telematics data as described herein.

Figure 6D:
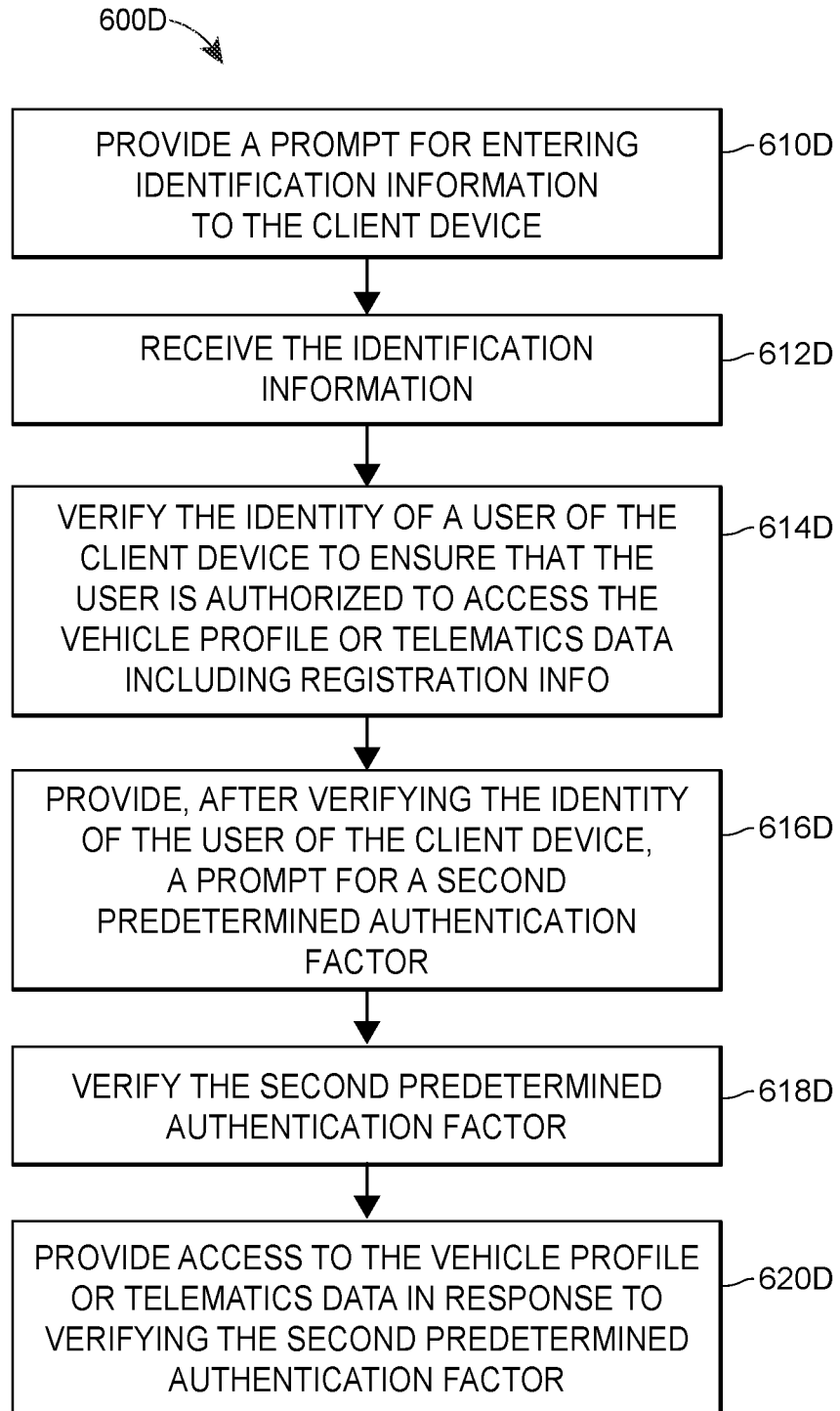
FIG. 6D illustrates an exemplary flow diagram for a computer-implemented method similar to FIG. 6C, but in which a second authentication factor is used to verify the identity of the client device.

FIG. 6D depicts an exemplary computer-implemented method 600D for verifying the identity of a client mobile device 110 requesting access to the vehicle profile or telematics data including registration information for an autonomous or semi-autonomous vehicle 108, similar to 600C.

In method 600D, the vehicle onboard computer 114 and/or external computing device 186 may provide a prompt for entering identification information to the client device (block 610D). The vehicle onboard computer 114 and/or external computing device 186 may then receive the identification information (block 612D). The vehicle onboard computer 114 and/or external computing device 186 may then verify the identity of a user of the client device to ensure that the user is authorized to access the vehicle profile or telematics data including registration information (block 614D). After verifying the identity of the user of the client device, the vehicle onboard computer 114 and/or external computing device 186 may then provide a prompt for a second predetermined authentication factor (block 616D). The vehicle onboard computer 114 and/or external computing device 186 may then verify the second predetermined authentication factor (block 618D). In response to verifying the second predetermined authentication factor, the vehicle onboard computer 114 and/or external computing device 186 may then provide access to the vehicle profile or telematics data (block 620D).

At block 610D, the vehicle onboard computer 114 provides a prompt for entering identification information to the client device. At block 612 D and after the user responds to the prompt, the vehicle onboard computer 114 receives the identification information and, at block 614D, uses the identification information to verify the identity of the user of the client device 110. By verifying the identity of the user of the client device 110, the vehicle onboard computer 114 may ensure that the user is authorized to access the vehicle profile or telematics data including registration information for the autonomous or semi-autonomous vehicle 108.

At block 616D and after verifying the identity of the user, the vehicle onboard computer 114 provides a prompt for a second predetermined authentication factor. In some embodiments, the second prompt is transmitted to a second mobile device (not shown) to address the possibility that the first mobile device 110 has been stolen or lost. Depending on the implementation, the second prompt may be a security question the user has set previously, an application notification for dual authentication, an email address, a link via email, or other similar prompts.

At block 618D, the vehicle onboard computer 114 then receives the response to the second prompt and verifies the second predetermined authentication factor. At block 620D and after verifying the user, the vehicle onboard computer 114 provides access to the vehicle profile or telematics data as described herein.

In some embodiments, the vehicle onboard computer 114 transmits a notification in response to a failed verification. Depending on the implementation, the notification may be transmitted to the user mobile device 110 and/or to an additional device as designated by the owner of the autonomous or semi-autonomous vehicle 108.

Figure 6E:
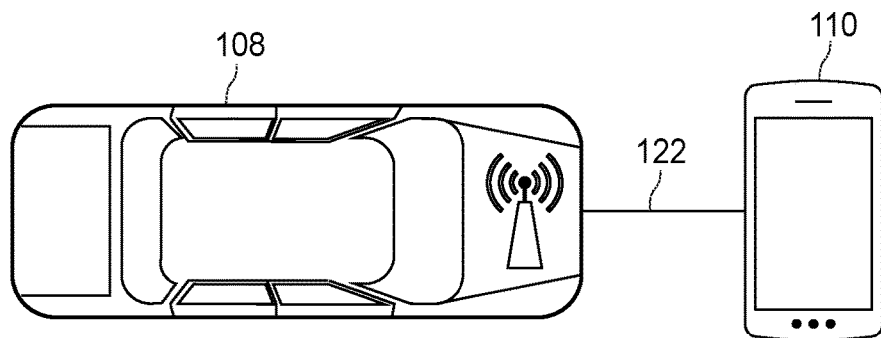
FIG. 6E illustrates an exemplary block diagram of a client device and a vehicle, where the client device attempts to gain access to a vehicle profile or telematics data by communicating with the vehicle.

FIG. 6E depicts a diagram of an autonomous or semi-autonomous vehicle 108 with a communication component 122 located on the exterior of the autonomous or semi-autonomous vehicle 108. A user with mobile device 110 approaches the autonomous or semi-autonomous vehicle 108 and, upon coming within a threshold distance of the communication component 122, the client mobile device 110 begins communicating with the communication component 122. In some embodiments, communication may be via an NFC link, radio link, BLUETOOTH, Wi-Fi, or other similar communication link.

Figure 6F:
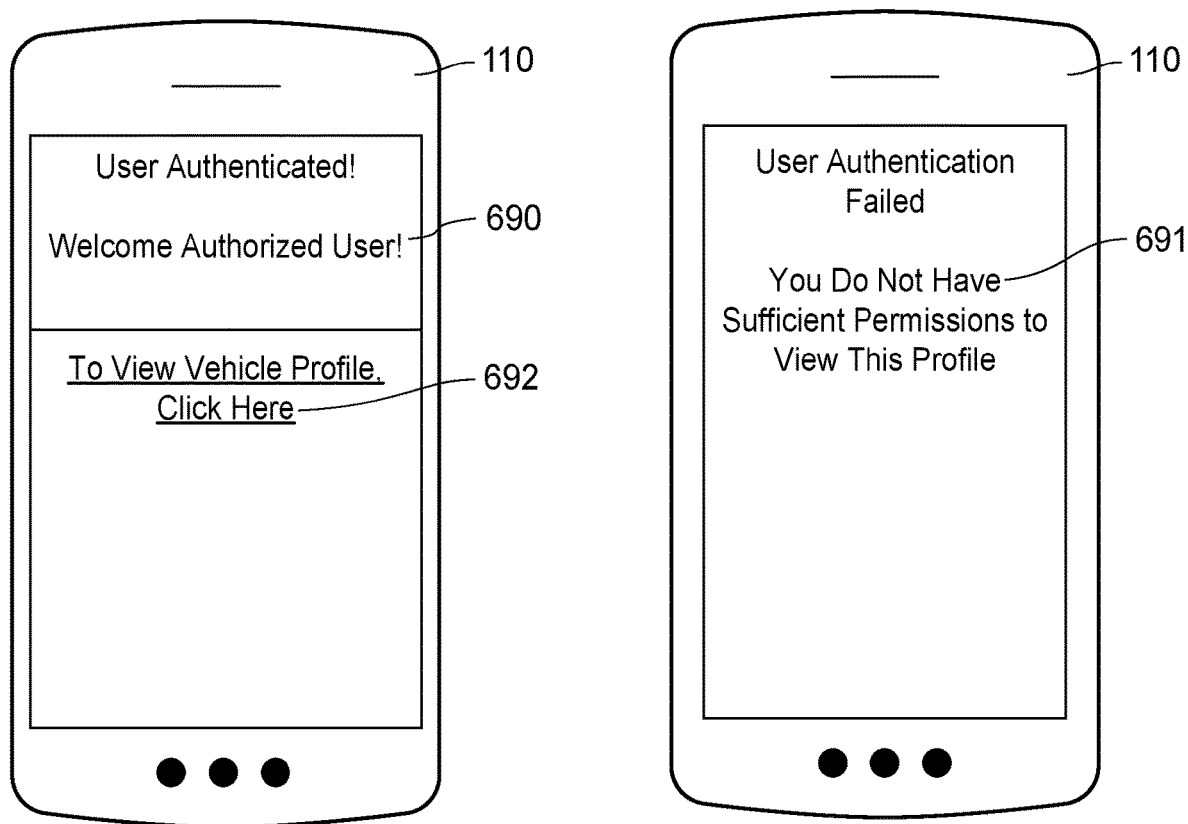
FIG. 6F illustrates exemplary displays which may be presented on the client device depicting the results of a successful attempt, and the results of a failed attempt to gain access to a vehicle profile or telematics data as in FIG. 6E.

FIG. 6F depicts a diagram of two potential outcomes to the communication in FIG. 6E. When the user and/or mobile device 110 are successfully authenticated, the mobile device 110 may display a notification that authentication was successful 690. In addition to the notification of success, the mobile device 110 may also display further information and/or options 692. In some embodiments, the further information and/or options may include a link to view and/or download the vehicle profile or telematics data.

If the vehicle onboard computer 114 fails to authenticate the user and/or mobile device 110, the mobile device 110 may display a notification that user authentication has failed 691. In some embodiments, the message may include an error message describing the reason behind the failure (e.g., insufficient permissions, no vehicle in range, incorrect identification information, etc.).

Exemplary Network of Autonomous Vehicle and Drones for Delivering Loads

Delivery vehicles typically deliver large loads to a single location, such as a redistribution center. In such instances an additional load that needs to be delivered after a delivery vehicle leaves a starting location may require dispatching an additional vehicle, leading to inefficiencies in the delivery chain. Alternatively, the delivery vehicle may need to turn around or pause and wait for another vehicle to catch up, leading to similar inefficiencies in the delivery process. As such, there exists a need for a method and system for minimizing the time spent waiting for and loading an additional load onto the delivery vehicle.

This problem, along with many others, can be addressed with autonomous and/or semi-autonomous vehicles in conjunction with unmanned aerial vehicles such as drones. Further, using drones in conjunction with autonomous or semi-autonomous vehicles allows for deliveries to difficult-to-reach locations as well as contactless delivery over short distances.

Figure 7A:
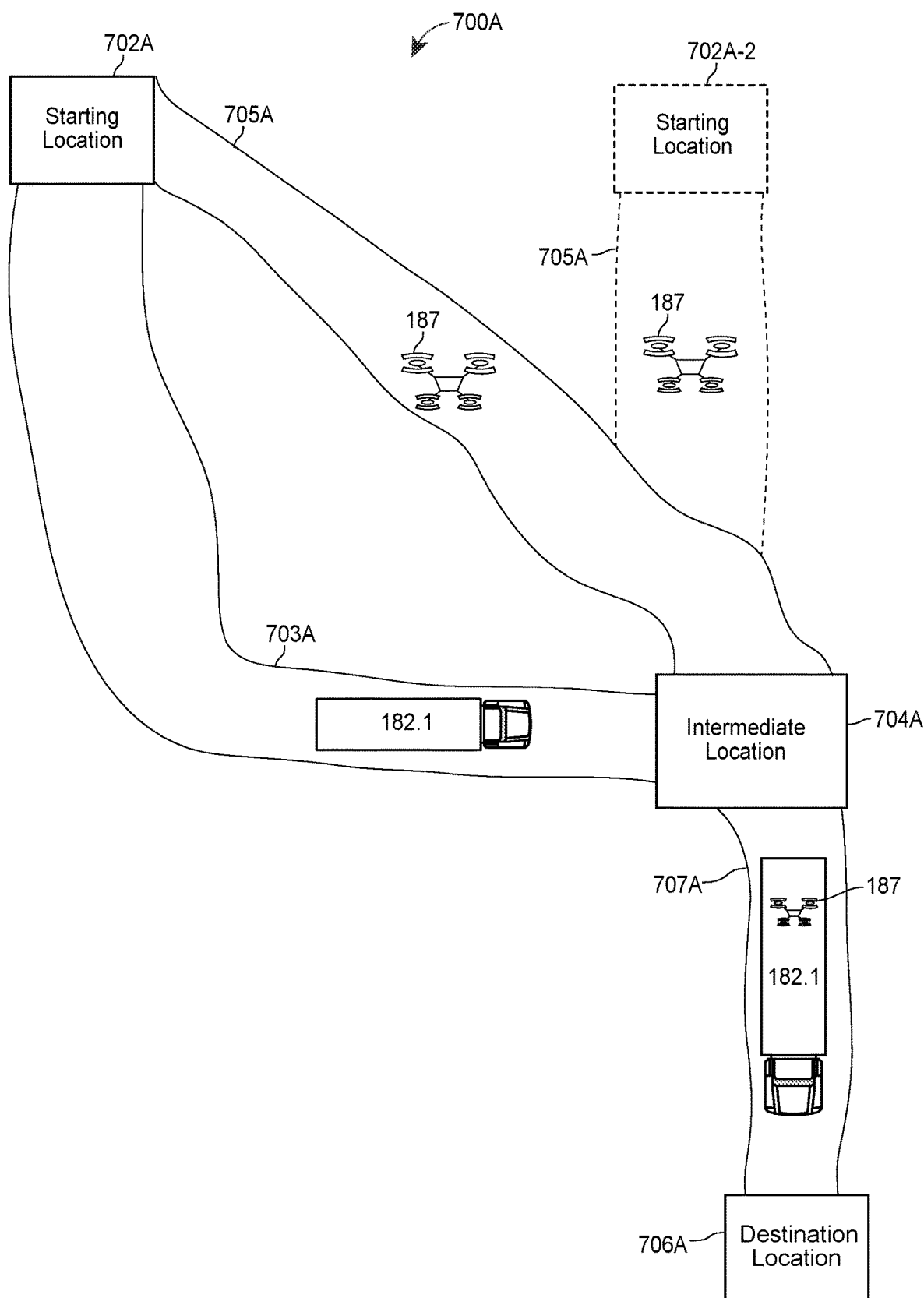
FIG. 7A illustrates an exemplary diagram depicting a path along which an autonomous or semi-autonomous vehicle carrying a first load travels to an intermediate location, at which point the vehicle is met by one or more drones carrying a second load, and the vehicle transports the first and second loads to the destination.

FIG. 7A depicts an exemplary path created by vehicle controller 181.1 and/or external computing device 186 in scenario 700A, in which an autonomous or semi-autonomous vehicle 182.1 delivers a first load to a destination location 706A by traveling along a route. On the way to the destination location 706A, the autonomous or semi-autonomous vehicle 182.1 travels to an intermediate location 704A, at which point it is met by one or more drones 187 carrying a second load. The one or more drones 187 and the second load may then also be transported by autonomous or semi-autonomous vehicle 182.1 from the intermediate location 704A to the destination location 706A.

In scenario 700A, autonomous or semi-autonomous vehicle 182.1 begins at a starting location 702A. Starting location 702A may be any location which may need to transport a load comprised of at least one item (e.g., a delivery facility or warehouse, an office building, a government building, a military base, a restaurant, a residential building, a park, a dock, a mine, an oilfield, an airport, a national preserve, etc.). Autonomous or semi-autonomous vehicle 182.1 travels along a first route 703A. At some point after the autonomous or semi-autonomous vehicle leaves the starting location 702A, an external computing device 186 determines that a second load is to be delivered to the same destination location 706A. The external computing device 186 then calculates and/or plots a second route 705A between the starting location 702A and the intermediate location 704A.

In some embodiments, the external computing device 186 and/or the onboard vehicle computer 114 may identify an intermediate location by calculating an intersection between the first route 703A and the second route 705A. In some implementations, the intersection may be determined by calculating the time it will take autonomous or semi-autonomous vehicle 182.1 following the first route 703A and one or more drones 187 following the second route 705A to cross paths. In further implementations, the external computing device 186 may calculate the intermediate location by determining an approximate time period and/or area in which the autonomous or semi-autonomous vehicle 182.1 following the first route 703A and one or more drones 187 following the second route 705A may be within a threshold distance of one another.

The external computing device 186 may then determine a suitable location where the autonomous or semi-autonomous vehicle 182.1 may temporarily wait until the one or more drones 187 reach the intermediate location 704A. In still further implementations, the external computing device 186 may replot the first route 703A to bring the autonomous or semi-autonomous vehicle 182.1 closer to the second route 705A. Depending on the embodiment, the external computing device 186 may determine and/or change the intermediate location 704A in real time.

In embodiments in which the intermediate location 704A is on or substantially near the first route 703A, the external computing device 186 and/or onboard vehicle computer 114 may cause the autonomous or semi-autonomous vehicle 182.1 to continue following the first route 703A to the destination location 706A after leaving the intermediate location 704A. In further embodiments, the external computing device 186 and/or onboard vehicle computer 114 may plot and/or calculate an additional path between the intermediate location 704A and the destination location 706A. The external computing device 186 and/or onboard vehicle computer 114 may then cause the autonomous or semi-autonomous vehicle 182.1 to traverse the additional path between the intermediate location 704A and the destination location 706A.

In some embodiments, the second route 705A is identical to the first route 703A. In further embodiments, the second route 705A may be shorter and/or more direct than first route 703A. The external computing device 186 then causes one or more drones 187 to follow second route 705A to intermediate location 704A. In some embodiments, second route 705A may additionally or alternatively be between intermediate location 704A and starting location 702A-2, in which starting location 702A-2 is distinct and separate from starting location 702A.

At intermediate location 704A, the one or more drones 187 arrive with the second load. In some implementations, the one or more drones 187 unload the load onto the autonomous or semi-autonomous vehicle 182.1 to be transported to the destination location 706A. In further implementations, the one or more drones 187 are loaded onto semi-autonomous vehicle 182.1 to be transported to the destination location 706A. The autonomous or semi-autonomous vehicle 182.1 then transports the load along the remainder of the first route 703A to the destination location 706A. In some embodiments, the external computing device 186 may calculate a third route 707A to the destination location 706A from the intermediate location 704A and cause the autonomous or semi-autonomous vehicle 182.1 to follow the third route 707A instead.

Depending on the implementation, the intermediate location 704A may be located some distance away from first route 703A. In such implementations, the vehicle controller 181.1 and/or external computing device 186 may transmit a signal to the autonomous or semi-autonomous vehicle 182.1 with the location of the intermediate location 704A and cause the autonomous or semi-autonomous vehicle 182.1 to navigate to the intermediate location 704A. In such implementations, the path to intermediate location 704A may be considered part of first route 703A, second route 705A, third route 707A, or may be considered a simple diversion.

In still further embodiments, the one or more drones 187 instead transport the first and second load carried by the autonomous or semi-autonomous vehicle 182.1 to the destination location 706A. In some implementations, the one or more drones 187 join with other drones already at the intermediate location 704A or are carried to the intermediate location 704A by the autonomous or semi-autonomous vehicle 182.1 along the first route 703A. One skilled in the art will appreciate that, though drones 187 are described as drones, any unmanned aerial vehicle (UAV) appropriate for the task may be used. In some implementations, a land-based and/or water-based autonomous or semi-autonomous vehicle 187 may be used.

In some embodiments, the first route 703A, second route 705A, and/or third route 707A are man-made paths (e.g., a city street, a highway road, a sidewalk, a driveway, a parking lot, a bridge, etc.). In such embodiments, the vehicle controller 181.1 and/or external computing device 186 may calculate and/or plot the first route 703A, the second route 705A, and/or the third route 707A using one or more vehicle sensors 120, such as GPS sensors.

In further implementations, the vehicle controller 181.1 and/or external computing device 186 calculate and/or plot the first route 703A, the second route 705A, and/or the third route 707A using information stored on a database 146, such as a map or navigation database. In still further implementations of such embodiments, the vehicle controller 181.1 and/or external computing device 186 calculate and/or plot the first route 703A, the second route 705A, and/or the third route 707A using a third-party's distributed information (i.e., using a map database to plot a path).

In certain embodiments, the first route 703A, the second route 705A, and/or the third route 707A are natural paths (e.g., dirt paths, clear paths through forest, mountain paths, etc.). In such embodiments, the vehicle controller 181.1 and/or external computing device 186 may also calculate and/or plot the first route 703A, the second route 705A, and/or the third route 707A based at least partially upon information related to movements of wildlife in the area. In some implementations of such embodiments, the vehicle controller 181.1 and/or external computing device 186 calculate and/or plot the first route 703A, the second route 705A, and/or the third route 707A based at least partially upon location data related to impassable obstacles (e.g., a lake, a cliff face, trees grown too close to navigate, etc.).

In some embodiments, the first route 703A, the second route 705A, and/or the third route 707A are unmarked paths (e.g., across a field, through a body of water, in the air, etc.). In some implementations of such embodiments, the first route 703A, the second route 705A, and/or the third route 707A are mostly or entirely vertical (e.g., a path through the air up a cliff face, a path above a prohibitively steep slope, etc.).

In further embodiments, the first route 703A, the second route 705A, and/or the third route 707A are some combination of artificial paths, natural paths, and unmarked paths. In such embodiments, the vehicle controller 181.1 and/or external computing device 186 may calculate and/or plot the first route 703A, the second route 705A, and/or the third route 707A using any of the implementations described above, individually or in concert where applicable.

In some embodiments, the autonomous or semi-autonomous vehicle 182.1 may have a user onboard who is prepared to or actually does drive for some portion of the routes 703A, 705A, and 707A. In such embodiments, the vehicle controller 181.1 and/or external computing device 186 may additionally or alternatively send the first route 703A, second route 705A, and/or third route 707A to a computing device for the user, such as a mobile computing device 184. The first route 703A, second route 705A, and/or third route 707A may be displayed to the user via text on the computing device and/or on an extended reality screen as detailed above, via audio cues, and/or via some combination of text and audio.

In certain embodiments, there may be multiple intermediate locations 704A and/or destination locations 706A. In some implementations, one or more destination locations 706A may serve as intermediate locations 704A.

In some scenarios, a load or loads may need to be distributed to multiple destination locations, all within a particular range. For example, a delivery vehicle may need to deliver loads to a number of houses within the same neighborhood. In such instances, an autonomous or semi-autonomous vehicle may take one or more drones or other UAVs to a drop-off location within a threshold radius of the one or more delivery locations. At the drop-off location, the one or more drones may take the one or more loads and deliver the loads simultaneously, allowing for faster and more efficient delivery. Similarly, even with a single destination location, a drop-off location for drones may allow for deliveries to locales in which the autonomous or semi-autonomous vehicle would not normally be capable of reaching.

Figure 7B:
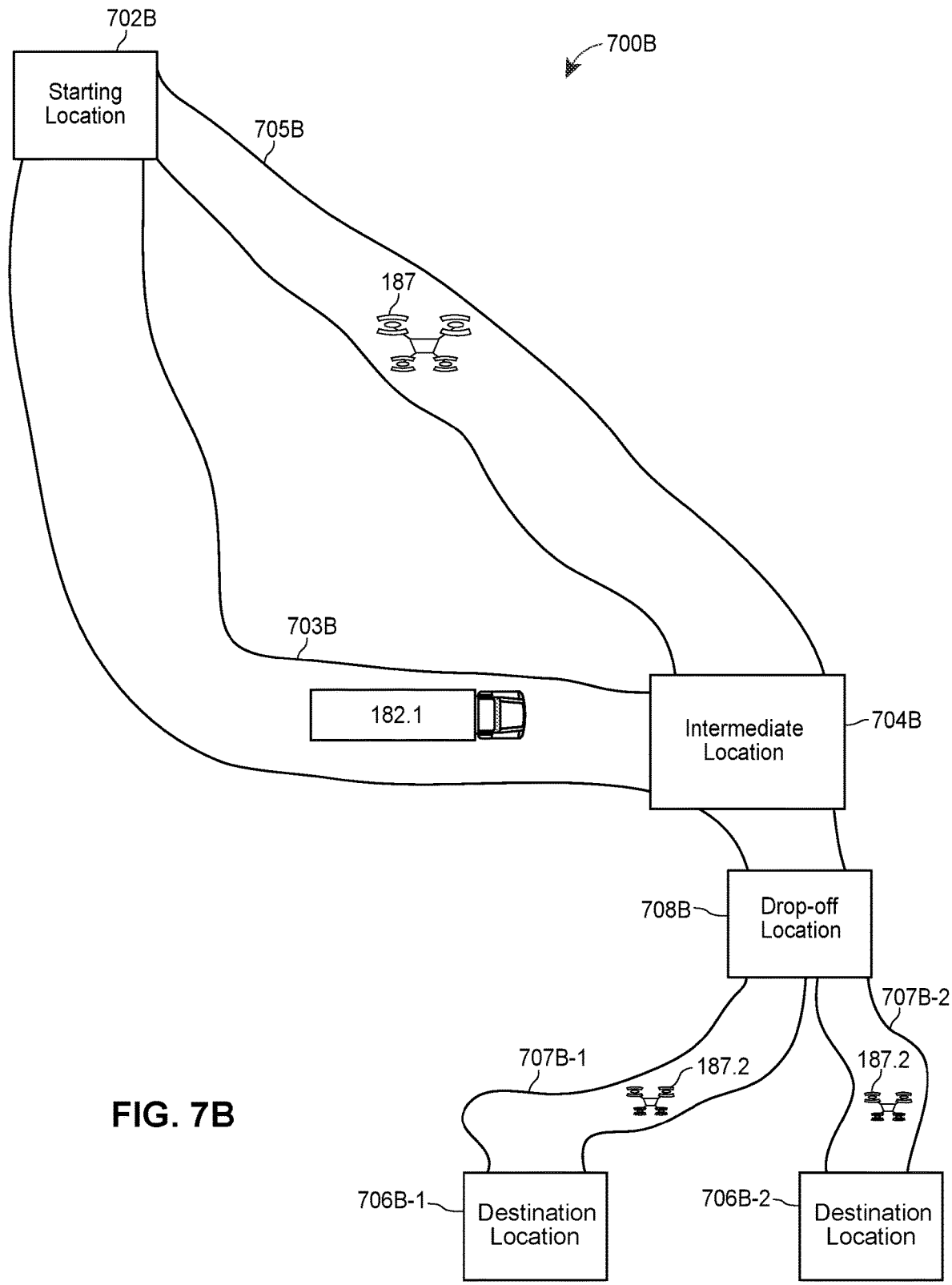
FIG. 7B illustrates an exemplary diagram similar to FIG. 7A, but in which the vehicle transports the loads to a drop-off location, at which point drones carry the loads to the destination locations.

FIG. 7B depicts an exemplary path created by vehicle controller 181.1 and/or external computing device 186 in scenario 700B, in which an autonomous or semi-autonomous vehicle 182.1 travels to an intermediate location 704B, at which point the one or more drones 187 carrying a second load meet the autonomous or semi-autonomous vehicle 182.1. The autonomous or semi-autonomous vehicle 182.1 then transports the one or more drones 187 to a drop-off location 708B, from which point the one or more drones 187 travel to one or more destination locations 706B-1, 706B-2.

In scenario 700B, autonomous or semi-autonomous vehicle 182.1 begins at a starting location 702B. Autonomous or semi-autonomous vehicle 182.1 travels along a first route 703B to a drop-off location 708B. At some point after the autonomous or semi-autonomous vehicle 182.1 leaves the starting location 702B but before reaching the drop-off location 708B, the vehicle controller 181.1 and/or external computing device 186 determines that one or more second loads are to be delivered to the one or more destination locations 706B-1, 706B-2. In response to the determination, the vehicle controller 181.1 and/or external computing device 186 calculates and/or plots a second route 705B from the starting location 702B to an intersection with the first route 703B at an intermediate location 704B. The external computing device 186 then causes one or more drones 187 to transport the second loads to the intermediate location 704B At intermediate location 704B, the one or more second loads are loaded onto the autonomous or semi-autonomous vehicle 182.1. In some embodiments, the one or more drones 187 may also be loaded onto the autonomous or semi-autonomous vehicle 182.1 along with the second loads. The autonomous or semi-autonomous vehicle 182.1 then continues to follow first route 703B until reaching a drop-off location 708B.

At drop-off location 708B, one or more drones 187.2 take the load and exits the drop-off location 708B. In some embodiments, the one or more drones 187.2 may be the same as the one or more drones 187. In further embodiments, the one or more drones 187.2 may be drones that are transported on autonomous or semi-autonomous vehicle 182.1 from starting location 702B. In still further embodiments, the one or more drones 187.2 may be some combination of the two. In some embodiments, the drones 187.2 may already be at drop-off location 708B or may independently meet the autonomous or semi-autonomous vehicle 182.1 at drop-off location 708B. The one or more drones 187.2 transport the load along a third route 707B to a destination location 706B-1. In some embodiments, the one or more drones 187.2 may transport the load along multiple third routes 707B-1 and 707B-2 to multiple respective destination locations 706B-1 and 706B-2. One skilled in the art will appreciate that, though drones 187.2 are described as drones, any unmanned aerial vehicle (UAV) appropriate to the task may be used.

In some embodiments, the first route 703B, second route 705B, and/or third routes 707B-1 and 707B-2 are man-made paths used by vehicles that have no autonomous or semi-autonomous features or pedestrians (e.g., a city street, a highway road, a sidewalk, a driveway, a parking lot, a bridge, etc.). In further embodiments, the first route 703B, second route 705B, and/or third routes 707B-1 and 707B-2 are natural paths (e.g., dirt paths, clear paths through forest, mountain paths, etc.). In yet further embodiments, the first route 703B, second route 705B, and/or third routes 707B-1 and 707B-2 are unmarked paths (e.g., across a field, through a body of water, in the air, etc.). In still further embodiments, the first route 703B, second route 705B, and/or third routes 707B-1 and 707B-2 are some combination of artificial paths, natural paths, and unmarked paths.

In some scenarios, there may be a need to deliver a load without a human element. For example, contactless delivery of meals, groceries, or other packages may be needed or requested. In such circumstances, a drone or other UAV may be used to deliver the load in question. To ensure the load is delivered with the greatest speed, a drop-off point may be designated directly adjacent to the destination location, such as on the street next to a house or in a driveway.

Similarly, some circumstances may not allow for timely or reasonable delivery by a human. For example, supplies may need to be delivered to a location that is adjacent to an accessible locale, but vertically inaccessible (such as a roof of a building).

Figure 7C:
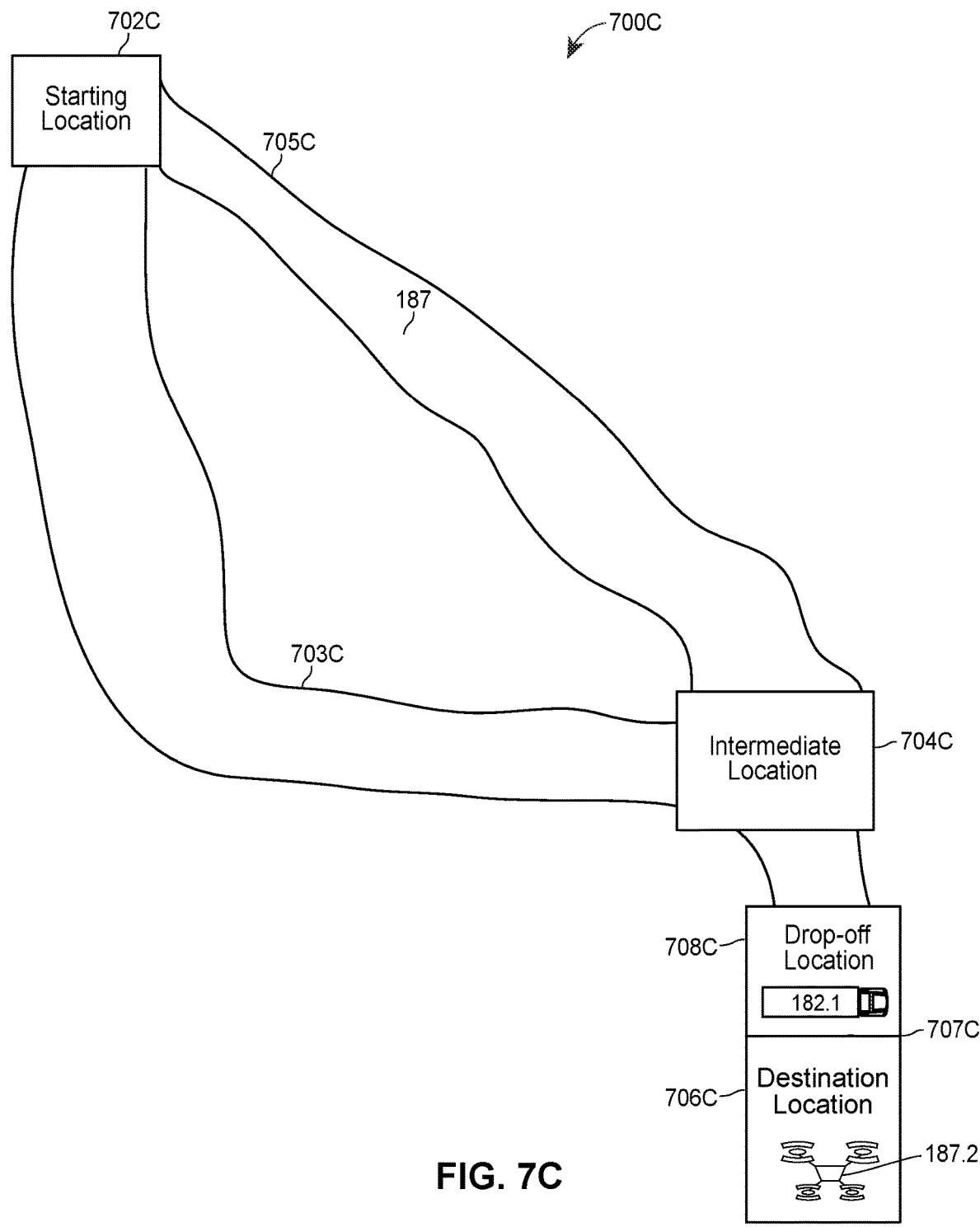
FIG. 7C illustrates an exemplary diagram similar to FIG. 7B, but in which the drop-off location is located adjacent to the destination location.

FIG. 7C depicts an exemplary path created by vehicle controller 181.1 and/or external computing device 186 in scenario 700C, in which an autonomous or semi-autonomous vehicle 182.1 travels to an intermediate location 704C and receives a second load transported by one or more drones 187. The autonomous or semi-autonomous vehicle then transports at least the first and second loads to a drop-off location 708C very near to a destination location 706C, from which point one or more drones 187.2 travel to the destination location 706C.

In scenario 700C, autonomous or semi-autonomous vehicle 182.1 begins at a starting location 702C. Autonomous or semi-autonomous vehicle 182.1 travels along a first route 703C to a drop-off location 708C. After the autonomous or semi-autonomous vehicle 182.1 leaves the starting location 702C, the vehicle controller 181.1 and/or external computing device 186 may determine that a second load is to be delivered to destination location 706C.

In response to the above determination, vehicle controller 181.1 and/or external computing device 186 calculates and/or plots a second route 705C to an intermediate location 704C at an intersection between the first route 703C and the second route 705C. The vehicle controller 181.1 and/or external computing device 186 then causes one or more drones 187 to transport the second load to intermediate location 704C. Upon arriving at intermediate location 704C, the second load is loaded onto the autonomous or semi-autonomous vehicle 182.1, and the autonomous or semi-autonomous vehicle resumes travel to the drop-off location 708C.

In some embodiments, the drop-off location 708C is within the immediate vicinity of the destination location 706C. At drop-off location 708C, one or more drones 187.2 take the load and exit the drop-off location 708C. The one or more drones 187.2 transport the load along a short third route 707C to a destination location 706C. One skilled in the art will appreciate that, though drones 187.2 are described as drones, any unmanned aerial vehicle (UAV) appropriate to the task may be used.

As an example of scenario 700C, consider the instance in which vehicle 182.1 is a food delivery vehicle, the starting location 702C is a restaurant, and the destination location 706C is a house in which a resident has ordered food from the starting location 702C. In such a scenario, the drop-off location 708C may be a portion of the street directly in front of the house or a driveway to the house. Upon reaching the drop-off location 708C, the food delivery vehicle opens an exit port from the vehicle for the drone, which follows path 707C from the food delivery vehicle to the door of the destination location 706C. As such, scenario 700C allows for secure, clean, and contactless delivery.

In some embodiments, the autonomous or semi-autonomous vehicle 182.1 also transports the one or more drones 187.2 from the starting location 702C to the drop-off location 708C along the first route 703C. In further embodiments, the drones 187.2 are at the drop-off location 708C and instead receive the load from the autonomous or semi-autonomous vehicle 182.1.

In some embodiments, the first route 703C, second route 705C, and/or third route 707C are man-made paths used by vehicles having no autonomous or semi-autonomous features or pedestrians (e.g., a city street, a highway road, a sidewalk, a driveway, a parking lot, a bridge, etc.). In further embodiments, the first route 703C, second route 705C, and/or third route 707C are natural paths (e.g., dirt paths, clear paths through forest, mountain paths, etc.). In yet further embodiments, the first route 703C, second route 705C, and/or third route 707C are unmarked paths (e.g., across a field, through a body of water, in the air, etc.). In still further embodiments, the first route 703C, second route 705C, and/or third route 707C are some combination of artificial paths, natural paths, and unmarked paths.

In some scenarios, an autonomous or semi-autonomous vehicle 182.1 may already be carrying one or more drones 187 in addition to a load that is to be delivered. As such, the autonomous or semi-autonomous vehicle 182.1 may proceed directly from a starting location 702D to a drop-off location 708D. Then the drones 187 may exit the autonomous or semi-autonomous vehicle 182.1 and deliver the loads to respective destination location 706D-1, 706D-2.

Figure 7D:
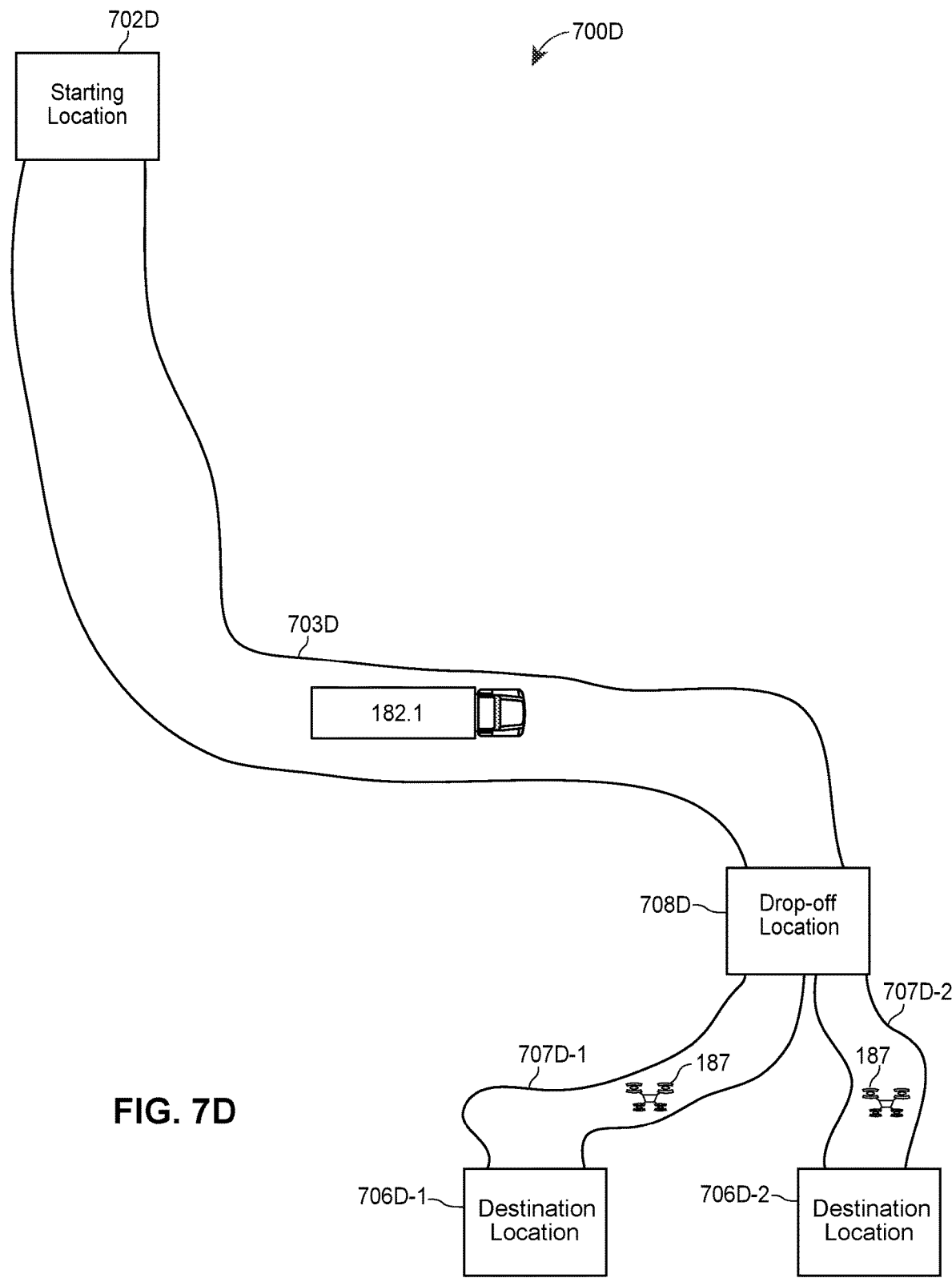
FIG. 7D illustrates an exemplary diagram similar to FIG. 7A, but in which the vehicle transports the entire load from the starting location to the drop-off location and drones transport the load to the destination locations.

FIG. 7D depicts an exemplary path created by vehicle controller 181.1 and/or external computing device 186 in scenario 700D, in which an autonomous or semi-autonomous vehicle 182.1 travels to a drop-off location 708D. At drop-off location 708D, one or more drones 187 begin transporting the load to the destination location 706D.

In some embodiments, the autonomous or semi-autonomous vehicle 182.1 transports the one or more drones 187 along a first route to a drop-off location 708D. In further embodiments, the autonomous or semi-autonomous vehicle 182.1 meets the one or more drones 187 at the drop-off location. After reaching drop-off location 708D, the one or more drones 187 transport the first and/or second loads to the destination location 706D.

Figure 7E:
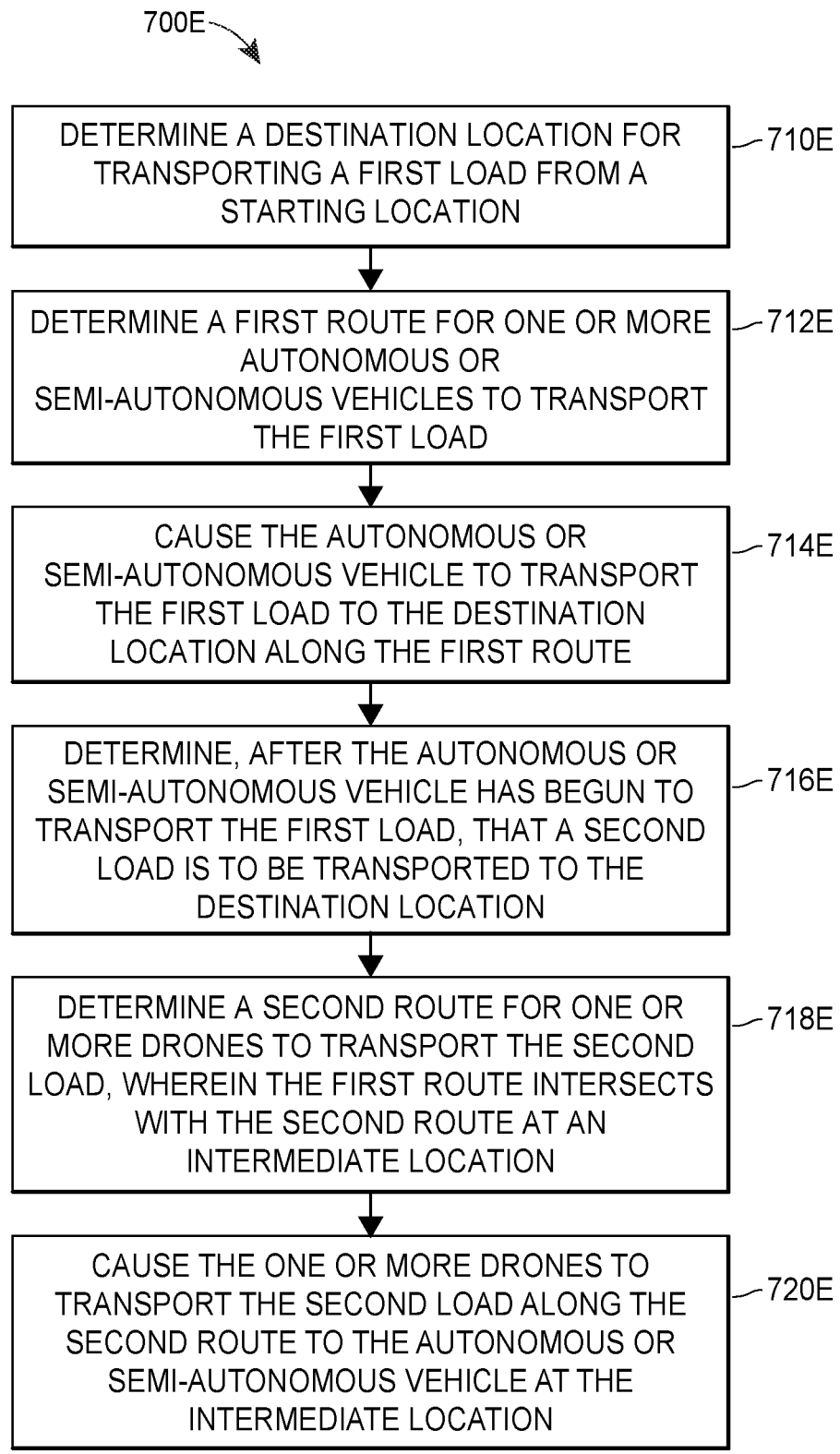
FIG. 7E illustrates an exemplary flow diagram for a computer-implemented method in which a vehicle controller and/or external computing device may calculate and/or plot a first and second route along which an autonomous or semi-autonomous vehicle and drones transport a load.

FIG. 7E depicts an exemplary computer-implemented method 700E in which a vehicle controller 181.1 and/or external computing device 186 may calculate and/or plot a first and second route along which an autonomous or semi-autonomous vehicle 182.1 and drones 187 transport a load. Method 700E can be applied to any or all of scenarios 700A-D as depicted in FIGS. 7A-D.

In method 700E, a vehicle controller 181.1 and/or external computing device 186 may determine a destination location for transporting a first load from a starting location (block 710E). The vehicle controller 181.1 and/or external computing device 186 may then determine a first route for one or more autonomous or semi-autonomous vehicles to transport the first load (block 712E). In response to determining a first route, the vehicle controller 181.1 and/or external computing device may then cause the autonomous or semi-autonomous vehicle to transport the first load to the destination location along the first route (block 714E).

After the autonomous or semi-autonomous vehicle has begun to transport the first load, the vehicle controller 181.1 and/or external computing device 186 may determine that a second load is to be transported to the destination location (block 716E). In response to the determination, the vehicle controller 181.1 and/or external computing device 186 may determine a second route for one or more drones 187 to transport the second load, wherein the first route intersects with the second route at an intermediate location (block 718E). After determining the second route, the vehicle controller 181.1 and/or external computing device 186 may cause the one or more drones 187 to transport the second load along the second route to the autonomous or semi-autonomous vehicle 181.1 at the intermediate location (block 720E).

At block 710E, a vehicle controller 181.1 and/or external computing device 186 may determine a destination location to which a load is to be transported from a starting location. In some implementations, the determination may be due to the vehicle controller 181.1 and/or the external computing device 186 receiving one or more orders for items from one or more parties located within the destination location. In further implementations, the determination may be due to the vehicle controller 181.1 and/or the external computing device 186 receiving a request from a connected database 146 for to transfer items to the destination location.

At block 712E and after determining the destination location, the vehicle controller 181.1 and/or the external computing device 186 determines a first route from the starting location to a drop-off location for one or more autonomous or semi-autonomous vehicles 181.1 to transport the load. At block 714E and after determining the first route, the vehicle controller 181.1 and/or the external computing device 186 causes the autonomous or semi-autonomous vehicle 182.1 to transport the first load to the destination location along the first route. In some embodiments, the autonomous or semi-autonomous vehicles 182.1 transport one or more drones 187.2 as well as the load to the drop-off location.

At block 716E and after the one or more autonomous or semi-autonomous vehicles 182.1 begin transporting the load, but before the one or more autonomous or semi-autonomous vehicles 182.1 arrive at the drop-off location, the vehicle controller 181.1 and/or the external computing device 186 determines that a second load is to be delivered to the destination location.

In some embodiments, vehicle controller 181.1 and/or the external computing device makes the determination in response to an indication that a different delivery has been cancelled and/or modified. In further embodiments, vehicle controller 181.1 and/or the external computing device makes the determination in response to an indication that weather has begun to impact a delivery area. In still further embodiments, vehicle controller 181.1 and/or the external computing device makes the determination in response to an emergency indication. In yet further embodiments, vehicle controller 181.1 and/or the external computing device makes the determination in response to any other similar indication as discussed herein.

At block 718E and after determining that a second load is to be transported to the drop-off location, the vehicle controller 181.1 and/or external computing device 186 determines a second route for one or more drones 187 to transport the second load, wherein the first route intersects with the second route at an intermediate destination. At block 720E and after the vehicle controller 181.1 and/or the external computing device 186 determines the second route, the vehicle controller 181.1 and/or the external computing device 186 causes the one or more drones 187 to transport the second load along the second path to the intermediate location.

Figure 7F:
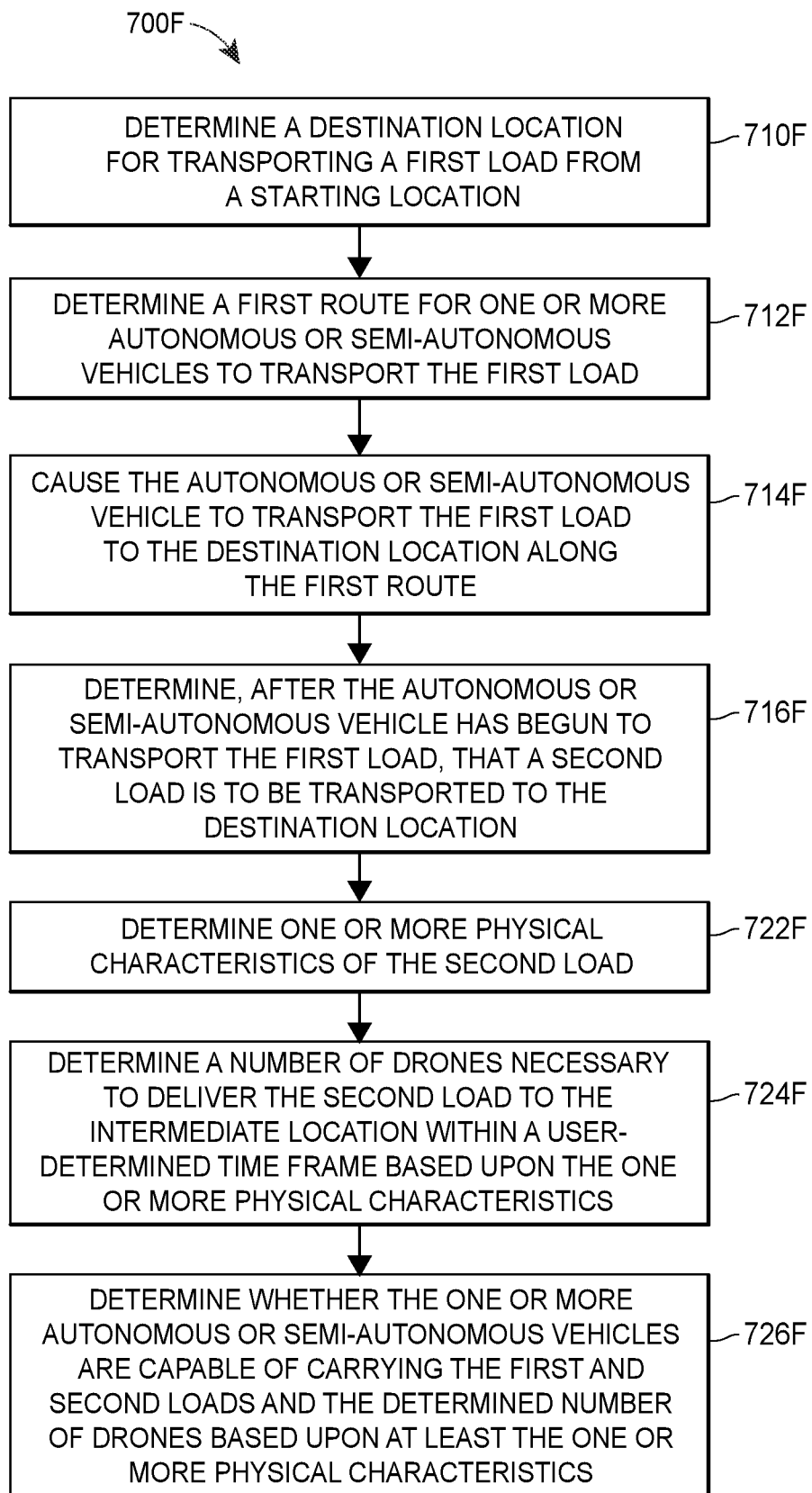
FIG. 7F illustrates an exemplary flow diagram similar to FIG. 7E, but in which the number of drones used to transport the second load is based on determined physical characteristics of the second load.

FIG. 7F depicts an exemplary computer-implemented method 700F in which a vehicle controller 181.1 and/or external computing device 186 may calculate and/or plot a first and second route along which an autonomous or semi-autonomous vehicle 182.1 and drones 187 transport a second load. Method 700F can be applied to any or all of scenarios 700A-D as depicted in FIGS. 7A-D.

In method 700F, the vehicle controller 181.1 and/or external computing device 186 may determine a destination location for transporting a first load from a starting location (block 710F). After determining a destination location, the vehicle controller 181.1 and/or external computing device 186 may determine a first route for one or more autonomous or semi-autonomous vehicles to transport the first load (block 712F). In response to determining the first route, the vehicle controller 181.1 and/or external computing device 186 may then cause the autonomous or semi-autonomous vehicle to transport the first load to the destination location along the first route (block 714F). The vehicle controller 181.1 and/or external computing device 186 may then determine, after the autonomous or semi-autonomous vehicle has begun to transport the first load, that a second load is to be transported to the destination location (block 716F). In response to the determination, the vehicle controller and/or external computing device may determine one or more physical characteristics of the second load (block 722F). The vehicle controller and/or external computing device 186 may then determine a number of drones necessary to deliver the second load to the intermediate location within a user-determined time frame based upon the one or more physical characteristics (block 724F). The vehicle controller and/or external computing device 186 may then determine whether the one or more autonomous or semi-autonomous vehicles are capable of carrying the first and second loads and the determined number of drones based upon at least the one or more physical characteristics (block 726F).

At block 710F, the vehicle controller 181.1 and/or external computing device 186 determines a destination location for transporting a first load from a starting location. At block 712F, the vehicle controller 181.1 and/or external computing device 186 then determines a first route for the one or more autonomous or semi-autonomous vehicles 182.1 to transport the first load and, at block 714F, causes the autonomous or semi-autonomous vehicles 182.1 to transport the first load.

At block 716F and after the one or more autonomous or semi-autonomous vehicles 182.1 have begun to transport the first load, but before reaching the drop-off location, the vehicle controller 181.1 and/or external computing device 186 determines a second route to transport the second load to an intermediate location at the intersection of the first and second route.

At block 722F, the vehicle controller 181.1 and/or external computing device 186, in response to determining that a second load is to be transported, then determines one or more physical characteristics of the second load. In some embodiments, the one or more physical characteristics may include at least one of: (i) size; (ii) shape; (iii) weight; (iv) volume; (v) reaction to environments; (vi) rigidity; (vii) temperature; (viii) fragility; (ix) number of constituent pieces; and (x) any other such factors that are known in the art. In some implementations of the above embodiments, more than one of the factors above may be considered with varying attributed weights. In some implementations, the weight attributed to each of the one or more physical characteristics may be determined by a machine learning algorithm.

At block 724F and in response to the determination of one or more physical characteristics of the second load, the vehicle controller 181.1 and/or external computing device 186 then determines a number of drones necessary to deliver the second load to the intermediate location. In some embodiments, the vehicle controller 181.1 and/or external computing device 186 may also determine the number of drones needed for a plurality of different arrangements. In some implementations, the vehicle controller 181.1 and/or external computing device 186 may then select the arrangement and number of drones to be used based upon at least one of: (i) the number of drones required; (ii) the number of drones available; (iii) the likelihood of damage; (iv) cost-effectiveness; (v) physical characteristics of the second load; and (vi) any other such factor. In further embodiments, the vehicle controller 181.1 and/or external computing device 186 may determine and select the number of drones required in order to deliver the load within a predetermined time-frame.

At block 726F and after determining the number of drones necessary to deliver the second load to the intermediate location, the vehicle controller 181.1 and/or external computing device 186 then determines whether the one or more autonomous or semi-autonomous vehicles 182.1 are capable of carrying the determined number of drones in addition to the first and second loads. In some embodiments, the vehicle controller 181.1 and/or external computing device 186 make the determination based upon at least the one or more physical characteristics of the second load. In further embodiments, the vehicle controller 181.1 and/or external computing device 186 may make the determination based at least upon one or more physical characteristics of the autonomous or semi-autonomous vehicles 182.1.

In some embodiments, the vehicle controller 181.1 and/or external computing device 186 may determine that the one or more autonomous or semi-autonomous vehicles are incapable of carrying the first load, second load, and the requisite number of drones. In such embodiments, the vehicle controller 181.1 and/or external computing device 186 may search for a secondary autonomous or semi-autonomous vehicle (not shown) which is capable of carrying the second load and the requisite number of drones. Depending on the implementation, a secondary autonomous or semi-autonomous vehicle may be one that is en route to the destination location, may be rerouted to the destination location, or may be located at the starting location.

Figure 7G:
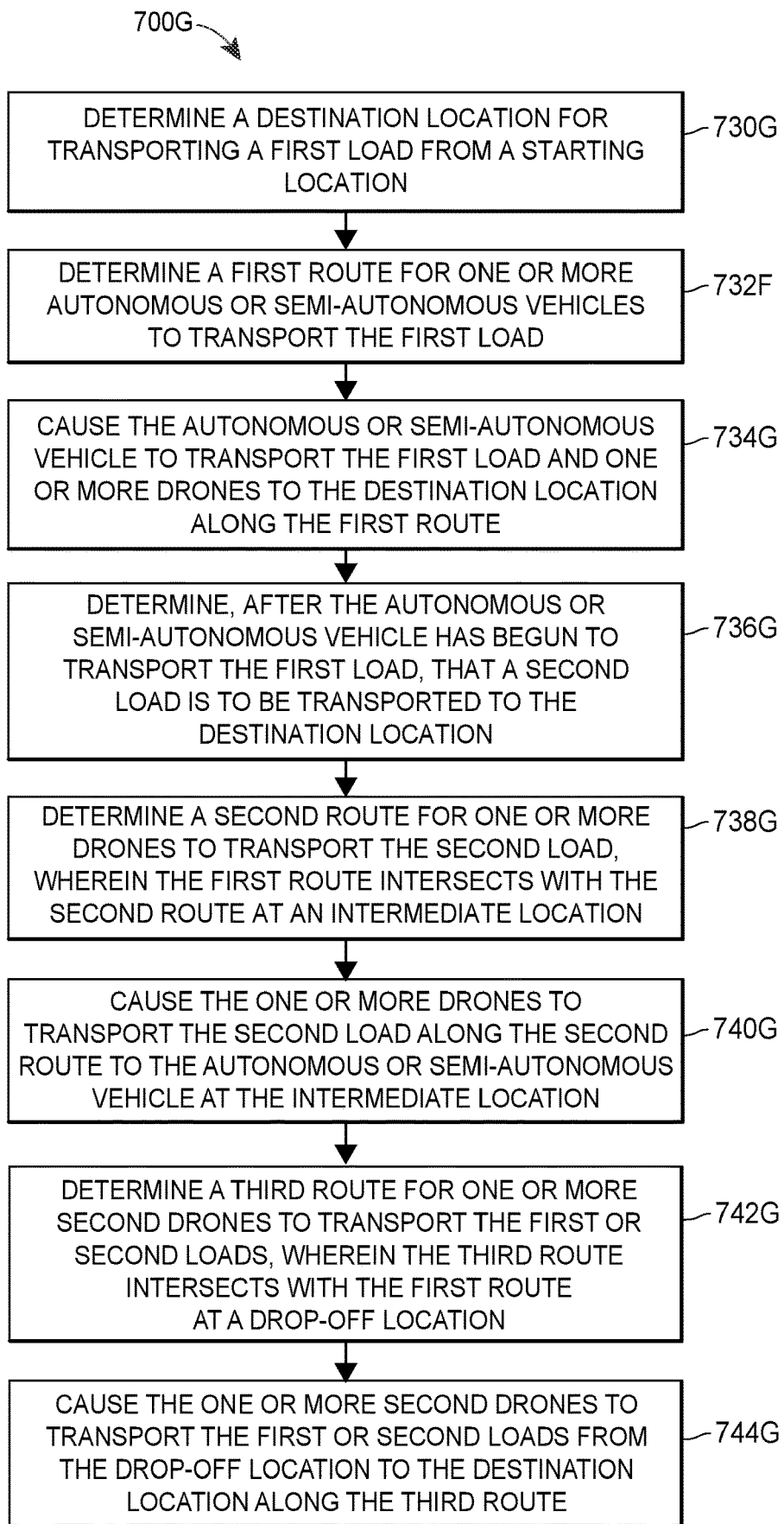
FIG. 7G illustrates an exemplary flow diagram similar to FIG. 7E, but in which the vehicle controller and/or external computing device calculates and/or plots a third route between a drop-off location and the destination location.

FIG. 7G depicts an exemplary computer-implemented method 700G in which a vehicle controller 181.1 and/or external computing device 186 may calculate and/or plot a first and second route along which an autonomous or semi-autonomous vehicle 182.1 and drones 187 transport a second load. The vehicle controller 181.1 and/or external computing device 186 may then determine a third route for one or more drones 187 to transport the first and/or second loads. Method 700G can be applied to any or all of scenarios 700A-D as depicted in FIGS. 7A-D.

In method 700G, the vehicle controller 181.1 and/or external computing device 186 may determine a destination location for transporting a first load from a starting location (block 730G). The vehicle controller 181.1 and/or external computing device 186 may then determine a first route for one or more autonomous or semi-autonomous vehicles to transport the first load (block 732G). In response to determining the first route, the vehicle controller 181.1 and/or external computing device 186 may then cause the autonomous or semi-autonomous vehicle 181.1 to transport the first load and one or more drones to the destination location along the first route (block 734G). The vehicle controller 181.1 and/or external computing device 186 may then determine, after the autonomous or semi-autonomous vehicle 181.1 has begun to transport the first load, that a second load is to be transported to the destination location (block 736G).

In response to the determination, the vehicle controller 181.1 and/or external computing device 186 may then determine a second route for one or more drones 187 to transport the second load, wherein the first route intersects with the second route at an intermediate location (block 738G). The vehicle controller 181.1 and/or external computing device 186 may then cause the one or more drones 187 to transport the second load along the second route to the autonomous or semi-autonomous vehicle 181.1 at the intermediate destination (block 740G).

The vehicle controller 181.1 and/or external computing device 186 may then determine a third route for one or more second drones 187.2 to transport the first and/or second loads, wherein the third route intersects with the first route at a drop-off location (block 742G). In response, to the determination, the vehicle controller 181.1 and/or external computing device 186 may then cause the one or more second drones to transport the first and/or second loads from the drop-off location to the destination location along the third route (block 744G).

At block 730G, the vehicle controller 181.1 and/or external computing device 186 determines a destination location for transporting a first load from a starting location. At block 732G, the vehicle controller 181.1 and/or external computing device 186 then determines a first route for one or more autonomous or semi-autonomous vehicles 182.1 to transport the first load before, at block 734G, causing the one or more autonomous or semi-autonomous vehicles 182.1 to transport the first load to the destination location along the first route. In some embodiments, the one or more autonomous or semi-autonomous vehicles 182.1 may also transport one or more drones 187 to the destination location along the first route.

At block 736G, in some embodiments, after the one or more autonomous or semi-autonomous vehicles 182.1 have begun transporting the first load, the vehicle controller 181.1 and/or external computing device 186 determines that a second load is to be transported to the same destination location as the first load. At block 738G, the vehicle controller 181.1 and/or external computing device 186 then determines a second route for one or more drones 187 to transport the second load, wherein the first route intersects with the second route at an intermediate destination and, at block 740G, causes the one or more drones 187 to transport the second load along the second route to the one or more autonomous or semi-autonomous vehicles 182.1 at the intermediate destination.

At block 742G, the vehicle controller 181.1 and/or external computing device 186 further determines a third route for the one or more drones to transport the first and/or second loads to the destination location from a drop-off location along the first route. At block 744G, the vehicle controller 181.1 and/or external computing device 186 then cause the one or more drones 187 to transport the first and/or second loads from the drop-off location to the destination location along the third route.

In some embodiments, the drop-off location may be located directly adjacent to the destination location. In such embodiments, the one or more drones 187 may transport part or all of the first and/or second load from the autonomous or semi-autonomous vehicle 182.1 at the drop-off location to an entrance of the destination location. In some implementations, the one or more drones 187 leave the load in a previously designated location. In further implementations, the one or more drones 187 leave the load at a porch, table, chair, entrance, or any such location. In still further implementations, the one or more drones 187 may wait at an entrance to the destination location until instructed to leave or until a predetermined time has elapsed. Depending on the embodiment, the one or more drones 187 may cause a notification to be sent to the customer and/or otherwise alert the customer as to the presence of the one or more drones 187.

In some implementations of any of the above embodiments, the one or more drones 187 may be capable of receiving and following voice commands. In further implementations, the voice commands may be analyzed by a natural language processing (NLP) unit of the one or more drones 187. Depending on the implementation, the one or more drones 187 may be able to respond to any of a series of simple words and/or phrases. For example, a user may instruct a drone 187 to drop a package via a command such as "Put it here." The one or more drones 187 may also be able to respond to more complex commands such as "You've got the wrong house, this is for number 123." In some implementations, the one or more drones 187 may use a camera in conjunction with the NLP unit to determine the proper response to a command.

In some embodiments, the one or more drones 187 may only respond to voice commands after verifying the identity of the individual issuing commands. Depending on the implementation, the one or more drones may verify the identity through receiving a username and password, receiving a signal from a registered mobile device, using facial recognition software, or any similar method for verifying an identity.

Though the above disclosure may occasionally refer to a singular autonomous or semi-autonomous vehicle or multiple autonomous or semi-autonomous vehicles, one skilled in the art would appreciate that multiple autonomous or semi-autonomous vehicles may be used in implementing the above techniques and vice versa. Similarly, each of the first route 703A-D, the second route 705A-D, and/or the third route 707A-D may be implemented for multiple autonomous or semi-autonomous vehicles.

Exemplary Methods of Remotely Controlling Operation of an Autonomous Vehicle

Figure 8:
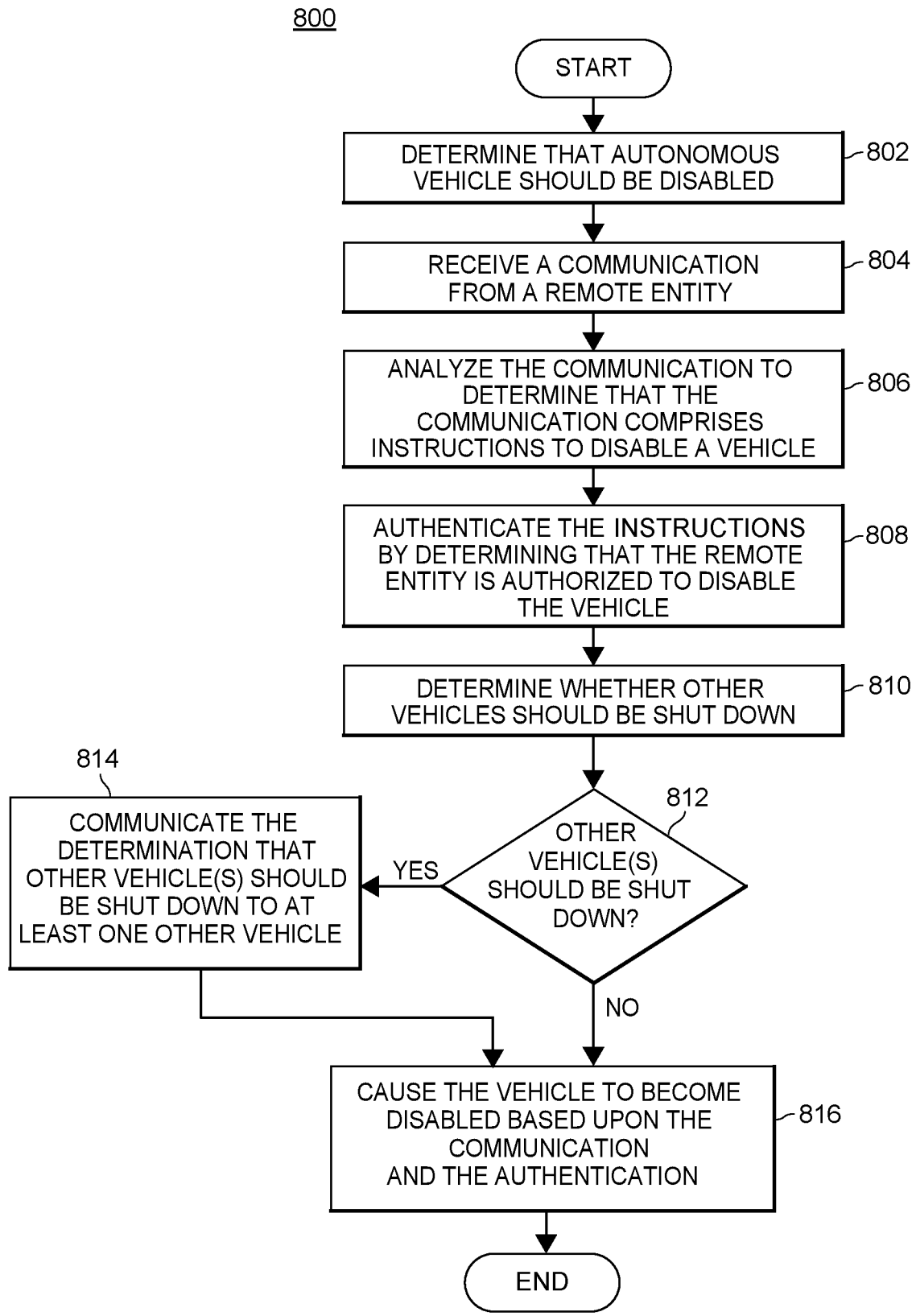
FIG. 8 illustrates a flow diagram of an exemplary computer-implemented method for disabling a vehicle.

FIG. 8 illustrates a flow diagram of an exemplary autonomous vehicle remote control method 800 for disabling a vehicle 108, 182.1-182.N. In some embodiments, the vehicle remote control method 800 may be implemented, at least in part, on a server 140 and/or other external computing device 186. The server 140 may receive communications from vehicles 108, 182.1-182.N which may be operating in a fully autonomous mode of operation (autonomous mode) without any control decisions being made by a vehicle operator, excluding navigation decisions such as selection of a destination or route. In some embodiments, the vehicle 108, 182.1-182.N may be operating without any passengers or with only passengers who are physically or legally unable to operate the vehicle 108, 182.1-182.N in a manual or semi-autonomous mode of operation (manual mode) (e.g., children, persons suffering acute illness, intoxicated or otherwise impaired persons, etc.).

In certain situations, it may be advantageous, or even necessary, to disable and/or stop an autonomous vehicle. For example, if a vehicle is beginning to malfunction, it may be desirable to disable the vehicle before the malfunction becomes worse and/or presents a safety hazard. In another example, it may be determined that the autonomous vehicle has entered an area that the autonomous vehicle is not authorized to enter, and so should be disabled. In yet another example, it may be determined that the vehicle is on a collision course with an infrastructure or another vehicle, and thus should be disabled.

The vehicle remote control method 800 may begin by determining (e.g., at a remote entity) that the autonomous vehicle 108, 182.1-182.N should be disabled (block 802). A communication may then be sent (e.g., from the remote entity) to the autonomous vehicle 108, 182.1-182.N (block 804). The communication may then be analyzed to determine that the communication includes instructions to disable the vehicle (block 806). The instructions may then be authenticated, for example, by determining that the remote entity is authorized to disable the vehicle (block 808). Based upon the analysis of the communication, it may be determined whether other vehicle(s) 108, 182.1-182.N should be shut down (block 810). If other vehicle(s) 108, 182.1-182.N should be shut down (block 812), the determination may be communicated to at least one other vehicle 108, 182.1-182.N (block 814). Regardless of whether other vehicles 108, 182.1-182.N should be shut down, the vehicle 108, 182.1-182.N may be caused to become disabled based upon the communication and the authentication (block 816).

At block 802, a determination is made that the autonomous vehicle should be disabled. In some embodiments, the determination is made by a remote entity; and, in some implementations, the remote entity may be the server 140, the other external computing device 186, the one or several drones 187, the smart infrastructure component 188, a law enforcement agency, an automobile manufacturer, an automobile parts manufacturer, and/or an insurance agency.

In some implementations where the remote entity is the smart infrastructure component 188, the smart infrastructure component may determine that the vehicle 108, 182.1-182.N should be disabled because the vehicle 108, 182.1-182.N is going to collide with the infrastructure component 188. For example, the infrastructure component may be a wall of a building with cameras, sensors (e.g., LIDAR, RADAR, etc.), processors, and/or communication components built into or attached to the wall. In this example, the smart infrastructure 188 may use data from the camera and/or sensors to determine the vehicle 108, 182.1-182.N is going to collide with the infrastructure component, and, consequently, send a communication to the vehicle 108, 182.1-182.N to disable the vehicle 108, 182.1-182.N (e.g., received by the vehicle 108, 182.1-182.N at block 804). In this regard, the communication sent from the smart infrastructure component 188 may include time and distance stopping information required to stop the vehicle 108, 182.1-182.N before the vehicle 108, 182.1-182.N collides with the infrastructure component 188; and, the vehicle 108, 182.1-182.N may thus use this information to determine specifically how to disable the vehicle 108, 182.1-182.N (e.g., how forcefully to apply the brakes, whether to also swerve the vehicle 108, 182.1-182.N while applying the brakes, etc.).

For instance, and to further elaborate, the smart infrastructure 188 may include sensor(s) that may measure the position, velocity, and acceleration of the vehicle 108, 182.1-182.N. The sensor(s) may include one or more of camera(s), LIDAR, RADAR, etc. Based upon the position, velocity, and acceleration of the vehicle 108, 182.1-182.N derived from the sensor(s), the smart infrastructure may determine that the vehicle 108, 182.1-182.N should be disabled so as to prevent an accident, such as the vehicle 108, 182.1-182.N colliding with the smart infrastructure 188, colliding with a pedestrian, entering a dangerous area, etc.

Other factors may also be taken into consideration when determining to disable the vehicle 108, 182.1-182.N. For example, using image and/or video data depicting the vehicle 108, 182.1-182.N, the system may estimate a weight of the vehicle 108, 182.1-182.N. In this regard, the estimated weight may be used as part of a stopping distance calculation in determining if the vehicle 108, 182.1-182.N will collide with the smart infrastructure 188 or other object (e.g., pedestrian). For instance, a heavily loaded pickup truck may have a longer estimated stopping distance than a lighter sedan.

In another example of the remote entity being an infrastructure component 188, the infrastructure component 188 may be a traffic infrastructure component, such as a stoplight, stop sign, etc. In yet another example, the smart infrastructure component 188 may be part of the road that the vehicle 108, 182.1-182.N is traveling on (e.g., a bridge, tunnel, etc.).

In some embodiments, the remote entity comprises a law enforcement agency. For instance, the remote entity may be a law enforcement agency that determines that the vehicle 108, 182.1-182.N is not complying with a government regulation (e.g., the vehicle 108, 182.1-182.N is transporting contraband, violating traffic laws, etc.), and thus should be disabled. In some implementations, the law enforcement agency may, included in the communication sent to the vehicle 108, 182.1-182.N, send information indicating that the vehicle 108, 182.1-182.N has not complied with the government regulation.

In some embodiments, the remote entity comprises an automobile manufacturer or an automobile parts manufacturer. Here, in some implementations, the remote entity may determine that an automobile part of the vehicle 108, 182.1-182.N makes the vehicle 108, 182.1-182.N dangerous to operate; and, when the remote entity determines that the vehicle 108, 182.1-182.N should be shut down, the communication sent to the vehicle 108, 182.1-182.N may include information indicating that the automobile part of the vehicle 108, 182.1-182.N makes the vehicle 108, 182.1-182.N dangerous to operate. In other implementations, the automobile manufacturer or automobile parts manufacturer may determine that the vehicle 108, 182.1-182.N has been modified to include a faulty component; and, this determination may be communicated to an insurance agency to allow the insurance agency to modify or cancel an insurance policy of the vehicle 108, 182.1-182.N.

Furthermore, in some embodiments, the determination to disable the vehicle 108, 182.1-182.N at block 802 is made because the vehicle 108, 182.1-182.N is malfunctioning and/or driving erratically. For example, the vehicle may be determined to be malfunctioning if there is smoke and/or fire coming from a hood of the vehicle 108, 182.1-182.N (e.g., as indicated from image and/or video data). In another example, data from the vehicle 108, 182.1-182.N may be sent to the remote entity; and the remote entity may determine, based upon the received component data, that a particular component is malfunctioning.

In one aspect, any suitable technique may be used to determine that the vehicle 108, 182.1-182.N is driving erratically. For example, the vehicle 108, 182.1-182.N may be determined to be driving erratically if the vehicle is swerving between lanes; driving extremely slow or fast; braking suddenly; etc. This information may be derived from image, video, LIDAR, and/or RADAR data, etc.

Moreover, in some scenarios, the determination to disable the vehicle 108, 182.1-182.N at block 802 is made based upon a determination that the vehicle 108, 182.1-182.N has: (i) entered an area that the vehicle 108, 182.1-182.N is not authorized to enter, or (ii) is on a course to enter the area that the vehicle 108, 182.1-182.N is not authorized to enter. In some embodiments, the determination to disable the vehicle 108, 182.1-182.N at block 802 is made based upon a determination that the vehicle 108, 182.1-182.N is on course to enter either an accident area or a construction area; and, here, the instructions to disable the vehicle 108, 182.1-182.N may comprise instructions to disable the vehicle 108, 182.1-182.N to prevent the vehicle 108, 182.1-182.N from entering either the accident area or the construction area.

At block 804, the vehicle 108, 182.1-182.N receives the communication from the remote entity. The communication may include instructions to disable the vehicle 108, 182.1-182.N. The communication may further include any other information, such as the information discussed above (e.g., time and distance information required to stop the vehicle 108, 182.1-182.N in order to avoid a collision with an infrastructure component 188).

The communication may be received via the network 130, radio links 183a-183f, and/or any other suitable method. In this regard, the communication may be received by, for example, the electronic circuitry 50, the client device 20, the computing device 20, 184, etc. In embodiments where the communication is first sent by the remote entity to the computing device 20, 184, the communication may be forwarded (e.g., by Bluetooth or other short range communication technique) to the vehicle 108, 182.1-182.N (e.g., to the electronic circuitry 50).

In some embodiments, the communication may be received from another vehicle 108, 182.1-182.N. For instance, the communication may be received via a V2V wireless communication protocol.

At block 806, the communication may be analyzed (e.g., at the onboard computer 114, electronic circuitry 50, etc.) to determine that the communication includes instructions to disable the autonomous vehicle 108, 182.1-182.N. In some embodiments, the analysis involves decrypting the communication (e.g., using any suitable technique, such as public and/or private key pairs).

Next, at block 808, the instructions are authenticated (e.g., again at the onboard computer 114, electronic circuitry 50, etc.) by determining that the sender of the instructions (e.g., the remote entity) is authorized to disable the vehicle 108, 182.1-182.N. Any suitable technique may be used to authenticate the instructions by determining that the sender is authorized to disable the vehicle 108, 182.1-182.N. For example, the authentication may be done by determining that the communication has been sent from a law enforcement agency authorized to disable the vehicle 108, 182.1-182.N. In another example, the authentication may be done by the sender of the instructions proving its identity to the recipient (e.g., at the onboard computer 114, electronic circuitry 50, etc.), which may, for instance, be accomplished by use of a username and password, or other identifying data. For example, a user may log into the external computing device 186 with a user name and password, and then send instructions to disable the vehicle 108, 182.1-182.N.

At block 810, it is determined whether other vehicles 108, 182.1-182.N should be shut down. For example, other vehicle(s) 108, 182.1-182.N may be entering an area that they are not authorized to be in, a construction area, a high traffic area, etc. If other vehicle(s) 108, 182.1-182.N should be shut down (block 812), this determination is communicated (block 814) to at least one other vehicle 108, 182.1-182.N (e.g., the other vehicle(s) that should be shut down). The communication may occur via the network 130, radio links 183a-183f, and/or any other suitable method. In some embodiments, the communication may be sent between vehicles 108, 182.1-182.N via a V2V wireless communication protocol.

In one example, the vehicle 108, 182.1-182.N may be approaching an accident area with a pile-up of crashed cars (e.g., there is a dense fog and/or other dangerous conditions that has caused a large, multi-car accident). In this scenario, the vehicle 108, 182.1-182.N may receive a communication from the remote entity that disables the vehicle to safely avoid the collision. Here, the vehicle 108, 182.1-182.N may also determine that there are other vehicle(s) 108, 182.1-182.N traveling behind it; and, so to avoid further collisions, the other vehicle(s) are also instructed to become disabled. In another example, law enforcement may send an instruction to the vehicle 108, 182.1-182.N to instruct other vehicles 108, 182.1-182.N to shut down (e.g., law enforcement is involved in a high-speed chase, and thus would like to shut down nearby vehicles 108, 182.1-182.N for safety reasons). In yet another example, the determination to shut other vehicles 108, 182.1-182.N down may be made because they are approaching a bridge that has been destroyed or is believed to be unsafe.

If it is determined that other vehicles 108, 182.1-182.N should be disabled, at block 814, this determination is communicated to the other vehicles 108, 182.1-182.N. In some embodiments, this may be communicated between vehicles 108, 182.1-182.N via a V2V wireless communication protocol. In other embodiments, the communication may be sent through the network 130 to the other vehicles 108, 182.1-182.N. In yet other embodiments, this communication may be sent to client device(s) 20, 184 in the other vehicle(s) 108, 182.1-182.N; and, subsequently, forwarded to the electric circuitry 50 of the vehicles 108, 182.1-182.N. Additionally or alternatively, the communication may be sent and received through the network 130, or via any suitable wireless network or networks (e.g., a network(s) functioning accordance with IEEE standards, 3GPP standards, 4G standards, 5G standards or other standards, and that may be used in receipt and transmission of data).

At block 816, the vehicle 108, 182.1-182.N is caused to become disabled based upon the communication and the authentication. For instance, the disabling of the vehicle may include ceasing to supply power to a component of an engine of the vehicle, preventing the vehicle from operating in a manual mode, and/or applying brakes of the vehicle. The disabling of the vehicle may further include locking at least one door of the vehicle so that the door may not be opened from an inside and/or outside of the vehicle.

As mentioned above, in some embodiments, the vehicle may be disabled in such a way as to avoid collision with an infrastructure or other component. For example, if the received communication includes time and distance information required to stop the vehicle to avoid a collision, the disabling of the vehicle may include applying the brakes with the force required to avoid the collision; furthermore, the vehicle may be swerved (e.g., by moving the steering wheel) to help avoid a collision. In some embodiments, disabling the vehicle may include ceasing supply of electric power to at least one component of the vehicle 108, 182.1-182.N (e.g., the engine).

In embodiments including applying the brakes of the vehicle 108, 182.1-182.N, any suitable technique may be used to determine a force to apply the brakes with. For example, the vehicle's position, velocity, acceleration, weight, make/model, etc. may be used. For instance, using image and/or video data from smart infrastructure 188, the system may derive and/or estimate the vehicle's position, velocity, acceleration, weight, make/model, etc. From this information, a stopping distance may be estimated; and, from the estimated stopping distance, a force with which to apply the brakes may be calculated.

For example, regarding the vehicle's estimated weight, the system may calculate that a large sports utility vehicle (SUV) has a longer stopping distance than a small sedan. The system may further calculate that the heavier vehicle requires the brakes applied more forcefully than the lighter vehicle.

The vehicle's make/model (e.g., derived from image and/or video data or by any other technique) may be useful in determining the force with which to apply the brakes. For instance, brake and/or other component data of the vehicle's make/model may be used calculate the stopping distance and/or may be used to determine how the stopping distance will be effected by the force applied to the brakes.

Exemplary Autonomous Vehicle Accessibility Indicators

Figure 9A:
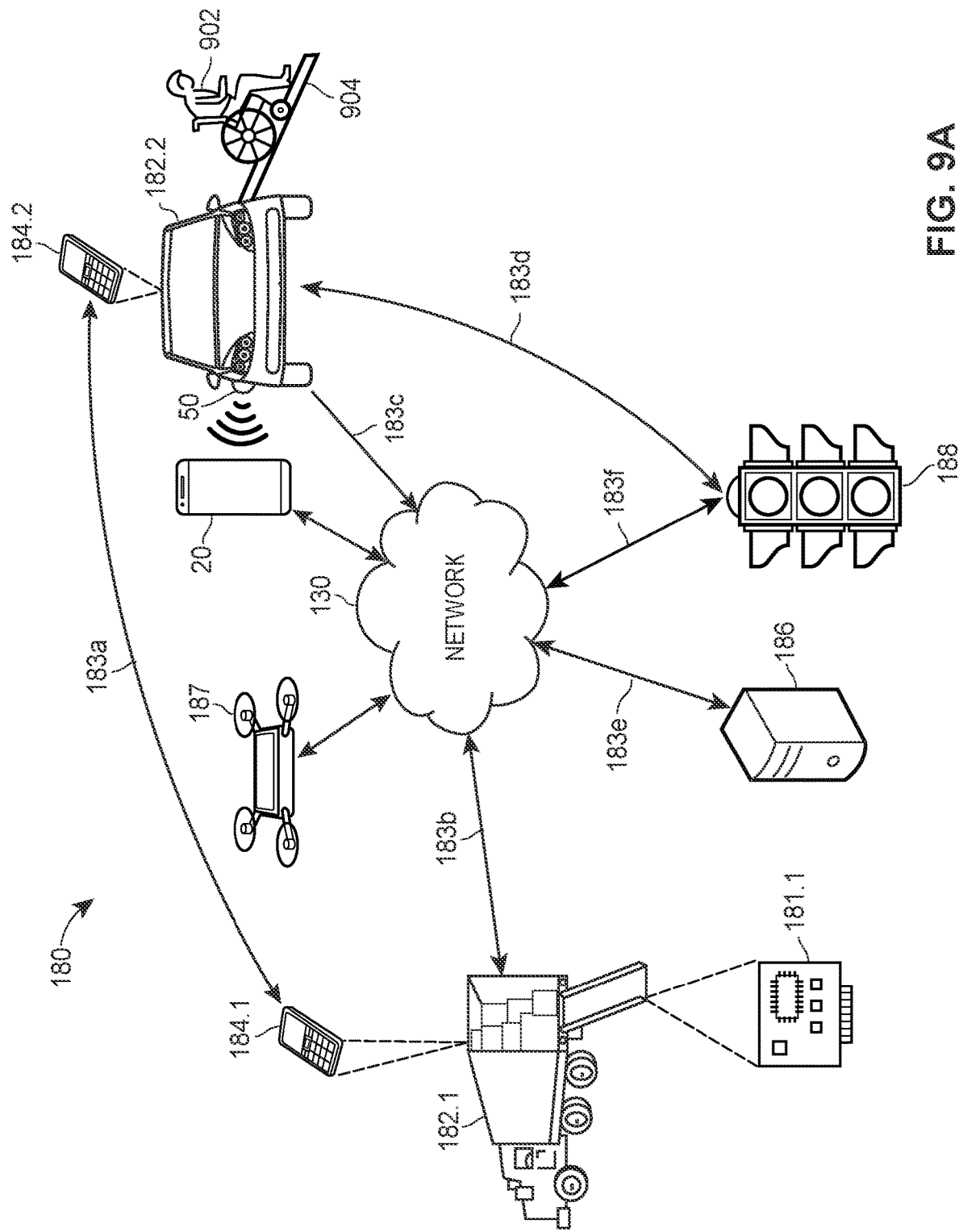
FIG. 9A illustrates a block diagram of an exemplary autonomous vehicle communication system in relation to a person with a disability.

FIG. 9A illustrates a block diagram of an exemplary autonomous vehicle communication system 900 on which the exemplary methods described herein may be implemented. In some aspects, the exemplary system 900 is similar to the exemplary system 180 of FIG. 1B. However, the exemplary system 900 also illustrates a person with a disability 902 initiating entry to vehicle 182.2. In this regard, although the example of FIG. 9A illustrates the person 902 initiating entry to vehicle 182.2, it should be understood that the systems and methods described herein may be applied equally when person 902 is initiating entry to any of vehicles 108, 182.1-182.N.

In one aspect, system 900 may include a network 130, N number of vehicles 182.1-182.N and respective mobile computing devices 184.1-184.N, one or several personal electronic devices (not shown), an external computing device 186, one or several drones 187, and/or a smart infrastructure component 188. In one aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features. As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as V2V wireless communication and/or data transmission via the communication component 122, directly via the mobile computing devices 184, or otherwise. The personal electronic devices may include any type of electronic device. For example, the personal electronic device may be a smart phone, a smart watch, a tablet, a VR headset, a fitness tracker, a personal medical device (e.g., a pace maker, an insulin pump, etc.) and/or monitoring devices thereof, smart implants, a smart bracelet, and so on. The personal electronic device may monitor the conditions of the individual while the individual is present in one of the vehicles 182 and/or operating one of the vehicles 182 in a semi-autonomous mode.

Figure 9B:
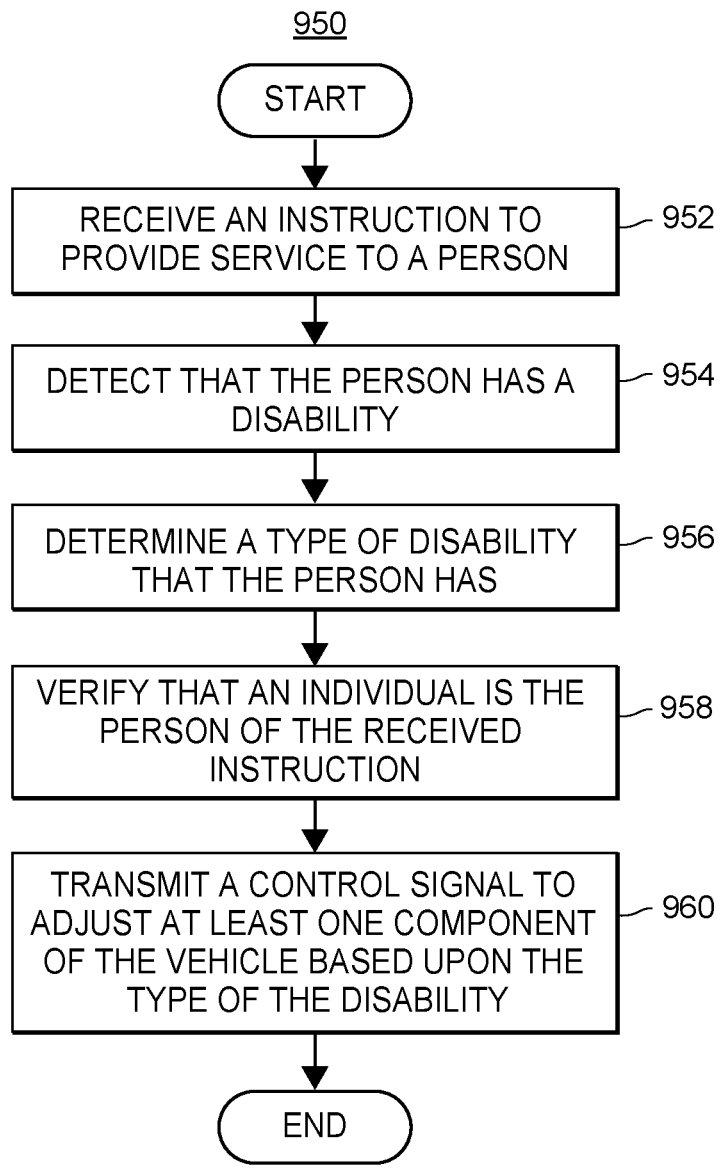
FIG. 9B illustrates a flow diagram of an exemplary computer-implemented method for causing a vehicle to assist a person with a disability.

FIG. 9B illustrates a flow diagram of an exemplary autonomous vehicle computer-implemented method 950 for adjusting a component of a vehicle 108, 182.1-182.N based upon a type of disability. In some embodiments, the autonomous vehicle method 950 may be implemented, at least in part, on a server 140 and/or other external computing device 186. The server 140 may receive communications from vehicles 108, 182.1-182.N which may be operating in a fully autonomous mode of operation (autonomous mode) without any control decisions being made by a vehicle operator, excluding navigation decisions such as selection of a destination or route. In some embodiments, the vehicle 108, 182.1-182.N may be operating without any passengers or with only passengers who are physically or legally unable to operate the vehicle 108, 182.1-182.N in a manual or semi-autonomous mode of operation (manual mode) (e.g., children, persons suffering acute illness, intoxicated or otherwise impaired persons, etc.). In some embodiments, the method 950 may be implemented, at least in part by the controller 204 of the on-board computer 114.

In certain scenarios, it may be advantageous for a component of an autonomous vehicle 108, 182.1-182.N to be adjusted based upon a disability of a person 902. For example, if a person 902 who would like to board the vehicle 108, 182.1-182.N is in a wheelchair (e.g., has a mobility impairment), it may be advantageous for the vehicle 108, 182.1-182.N to deploy a ramp 904 to assist the person 902 in entering the vehicle.

The autonomous vehicle method 950 may begin by receiving (e.g., at the controller 204 of the on-board computer 114) an instruction to provide service to a person 902 (block 952). It may then be detected that the person 902 has a disability (block 954). The type of disability (e.g., a mobility impairment, a vision impairment, and/or a hearing impairment) may then be determined (block 956). A verification that an individual is the person 902 corresponding to the received instruction may then be performed (block 958). Based upon the type of disability, a control signal may be transmitted to adjust at least one component of the vehicle (block 960).

To further explain, at block 952, an instruction is received to provide service to a person 902. The instruction may be received from any suitable source. For instance, the instruction may be received from a mobile computing devices 184, external computing devices 186, servers 140, drones 187, an RFID tag, etc. It should be understood that the instruction may be received via any suitable method. For instance, the instruction may be received through the network 130, or via any suitable wireless network or networks (e.g., a network(s) functioning accordance with IEEE standards, 3GPP standards, 4G standards, 5G standards or other standards, and that may be used in receipt and transmission of data).

In some embodiments, the receiving of the instruction to provide service to the person 902 may include receiving the instruction from a mobile device of the person 902; and/or the type of disability may be determined based upon information received from the mobile device. In some implementations, the instruction may be first sent to the computing device 20, 184, and then may be forwarded (e.g., by Bluetooth or other short range communication technique) to the vehicle 108, 182.1-182.N (e.g., to the electronic circuitry 50).

Additionally or alternatively, the instruction may be received from a drone 187. Here, the drone 187 may have previously identified (e.g., by analysis of image and/or video data) that the person 902 has a disability; and the drone 187 may send the instruction, possibly along with the image and/or video data, information of the type of disability, etc.

In certain implementations, the instruction may be simply received from the computing device 20, 184 of the disabled passenger because the passenger has specified this information. For example, a user may use an app on her computing device 20, 184 to order a ride share service. In some implementations, the receiving of the instruction to provide service to the person 902 may include receiving the instruction in a radio frequency identification (RFID) signal, and/or the type of disability may be determined based upon information received from the RFID signal.

In certain embodiments, the instruction may be received from another vehicle 108, 182.1-182.N. For example, the instruction may be received via a V2V wireless communication protocol.

At block 954, it is detected that the person 902 has a disability. For instance, the system may determine this from information received along with the instruction of operation 952. Alternatively, in some embodiments, this detection may be done by analyzing image/and or video data.

In some embodiments, the detection is done via information received from the computing device 20, 184. For example, the person 902 may use an app on her computing device 20, 184, or order a rideshare service; and may include, as part of the order, information that she is disabled, and further specify the type of her impairment (e.g., mobility, vision, hearing, etc.).

Additionally or alternatively, this detection may be done via analysis of auditory information. For example, the person 902 says "I have a disability." Additionally or alternatively, the detection may be done via the person 902 entering this information into a device (e.g., to a touchscreen) of the autonomous vehicle 108, 182.1-182.N. For example, a user enters an autonomous bus, and then types, into a touch screen, that she is disabled.

At block 956, the type of disability that the person 902 has is determined. For instance, to determine a mobility impairment, the system (e.g., at the controller 204 of the on-board computer 114) may analyze an image and/or video to identify a wheelchair, crutches, or walker, and thus has a mobility impairment. Alternatively, the determination may be made simply by receiving this information directly (e.g., along with the instruction to provide service to the person 902). For instance, the determination may be made based upon data received from the RFID tag.

In some embodiments, to determine that the type of disability includes a vision impairment, the system may analyze an image to identify a walking cane for the visually impaired.

In certain embodiments, the determination may be performed via information received from the computing device 20, 184. For example, the person 902 may use an app on her computing device 20, 184, or order a rideshare service; and may include, as part of the order, information specifying the type of her impairment (e.g., mobility, vision, hearing, etc.). In this regard, the user may further request that a specific action be taken because of the disability (e.g., a person with a vision impairment requests that the vehicle take a haptic action to assist her in entering the vehicle).

In some implementations, this determination may be performed via analysis of auditory information. For example, the person 902 says "I'm blind; please assist me." Additionally or alternatively, the detection may be done via the person 902 entering this information into a device (e.g., to a touchscreen) of the autonomous vehicle 108, 182.1-182.N. For example, a user enters an autonomous bus, and enters, into a touch screen, that she has a hearing impairment.

At block 958, it is verified that an individual is the person 902 of the received instruction. In some embodiments, the verification is performed based upon at least one of: information of a mobile device of the individual; biometrics data of the individual; an RFID tag; a sensor embedded in a wheelchair; a life alert bracelet; and/or a quick response (QR) code. In some embodiments, the verification may be performed via analysis of image and/or video data, such as by verifying a wheelchair, crutches or walking cane in the image and/or video data.

Additionally or alternatively, the verification may be performed by way of analysis of audio data. For example, a speaker system of the vehicle 108, 182.1-182.N broadcasts, "please verify that you have a disability;" and the person 902 responds, "yes, I am blind."

Additionally or alternatively, the verification may be performed by the person 902 entering this information onto a device of the vehicle 108, 182.1-182.N. For example, a touchscreen of a device on an autonomous bus prompts the person 902 to verify that he is disabled; and the person 902 presses a button on the touchscreen confirming that he is disabled. In a related example, the verification may be performed via computing device 20, 184 of the person 902. For example, the autonomous vehicle 108, 182.1-182.N may send a request (e.g., through Bluetooth, through the network 130, or through any other suitable technique) to a rideshare app running on the user's computing device 20, 184 that the user verifies that he is disabled.

At block 960, a control signal is transmitted to adjust at least one component of the vehicle based upon the type of disability. It should be understood that the control signal may be transmitted via any suitable technique. For example, the controller 204 (or any other suitable component) may transmit the control signal to the at least one component of the vehicle (e.g., the ramp 904, brakes, steering wheel, lights, etc.).

In one example, if the type of disability includes a mobility impairment (e.g., the person 902 is in a wheelchair, on crutches, etc.) the adjustment may include deploying a ramp 904 from the vehicle to assist the person 902 in entering the vehicle.

In some embodiments, if the type of disability is a vision impairment, the adjustment may include providing a haptic action to assist the person 902 in entering the vehicle.

In other embodiments, if the type of disability comprises a vision impairment, the adjustment may include (i) transmitting a first control signal to vibrate a handle of the vehicle to assist the person 902 in entering the vehicle, and/or (ii) transmitting a second control signal to vibrate at least one component of an interior of the vehicle to guide the person 902 to a seat of the interior of the vehicle. For example, the vehicle 108 may vibrate a particular seat for the person 902 to sit in, may vibrate steps on the way to the seat, may vibrate the roof of the vehicle 108 so that the person 902 does not bump into the roof, may vibrate any other obstructions on the way to the seat so that the person 902 does not bump into them, etc.

In some embodiments, if the type of disability is a hearing impairment, the adjustment may include activating at least one light of the vehicle to assist the person 902 in entering the vehicle.

In other embodiments, if the type of disability is a hearing impairment, the adjustment may include: (i) transmitting a first control signal to illuminate at least one first light of a door of the vehicle to assist the person 902 in entering the vehicle, and (ii) transmitting a second control signal to illuminate at least one second light of an interior of the vehicle to guide the person 902 to a seat of the interior of the vehicle. For example, the vehicle 108 may illuminate a particular seat for the person 902 to sit in.

Figure 10:
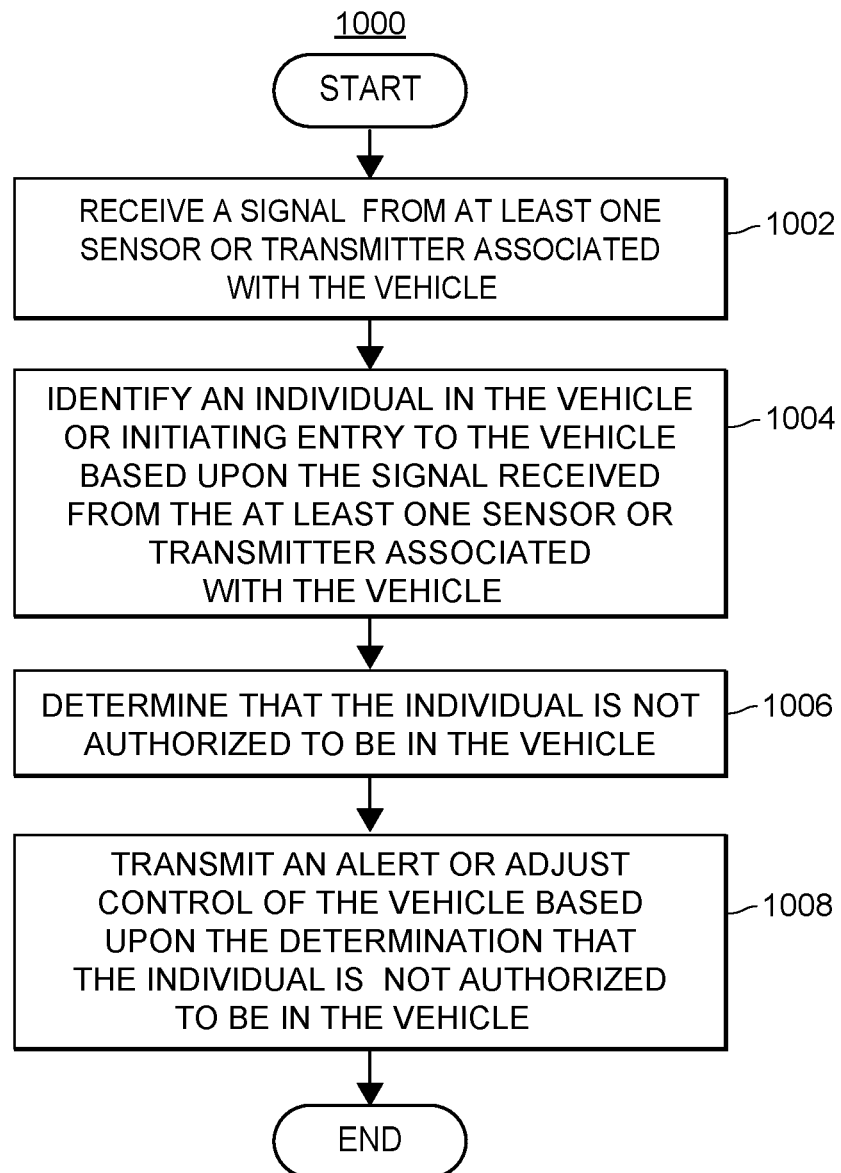
FIG. 10 illustrates a flow diagram of an exemplary computer-implemented method for responding to and identifying an unauthorized individual in the vehicle or initiating entry to the vehicle.

Exemplary Methods for Identifying and Removing Unauthorized Passengers in an Autonomous Vehicle FIG. 10 illustrates a flow diagram of an exemplary autonomous vehicle remote control method 1000 for responding to and identifying an unauthorized individual in the vehicle 108, 182.1-182.N or initiating entry to the vehicle 108, 182.1-182.N. In some embodiments, the vehicle remote control method 1000 may be implemented, at least in part, on a server 140 and/or other external computing device 186. The server 140 may receive communications from vehicles 108, 182.1-182.N which may be operating in a fully autonomous mode of operation (autonomous mode) without any control decisions being made by a vehicle operator, excluding navigation decisions such as selection of a destination or route. In some embodiments, the vehicle 108, 182.1-182.N may be operating without any passengers or with only passengers who are physically or legally unable to operate the vehicle 108, 182.1-182.N in a manual or semi-autonomous mode of operation (manual mode) (e.g., children, persons suffering acute illness, intoxicated or otherwise impaired persons, etc.).

In certain situations, it may be advantageous to identify and/or remove unauthorized passenger(s) from a vehicle 108, 182.1-182.N. For example, if a person is lighting a fire on a vehicle 108, 182.1-182.N, or otherwise creating a dangerous situation, it may be advantageous to determine that the person is unauthorized, and remove the person from the vehicle 108, 182.1-182.N. In another example, it may be desirable to alert law enforcement that an unauthorized individual is in the vehicle 108, 182.1-182.N.

The vehicle remote control method 1000 may begin by receiving (e.g., at the controller 204 of the on-board computer 114) a signal from at least one sensor or transmitter associated with the vehicle 108, 182.1-182.N (block 1002). An individual in the vehicle or initiating entry to the vehicle may then be identified based upon the signal received from the at least one sensor or transmitter associated with the vehicle 108, 182.1-182.N (block 1004). It may then be determined that the individual is not authorized to be in the vehicle 108, 182.1-182.N (block 1006). Based upon the determination that the individual is not authorized to be in the vehicle 108, 182.1-182.N, an alert may be transmitted, or a control of the vehicle 108, 182.1-182.N may be adjusted (block 1008).

To further elaborate, at block 1002, a signal is received from at least one sensor or transmitter associated with the vehicle 108, 182.1-182.N. For instance, the controller 204 of the on-board computer 114 may receive the signal from the electronic circuitry 50, sensors 120, server 140, mobile computing device 184, drone 187, infrastructure component 188, etc.

In some embodiments, the sensor(s) 120 is a camera providing image and/or video data. However, any other type of sensor may be used, for instance, LIDAR, RADAR, infrared sensors, etc.

In certain embodiments, the transmitter may be of a mobile computing device 184. For example, a passenger of the vehicle may see an unauthorized individual attempting to initiate entry to the vehicle 108, 182.1-182.N, and thus use his mobile computing device 184 to communicate the attempted unauthorized entry to the vehicle 108, 182.1-182.N.

At block 1004, an individual in the vehicle or initiating entry to the vehicle may then be identified based upon the signal received from the at least one sensor or transmitter associated with the vehicle 108, 182.1-182.N. In some embodiments, the individual may be identified by creating a profile of the individual by using a facial recognition technique (e.g., from camera or video data).

At block 1006, it may then be determined that the individual is not authorized to be in the vehicle 108, 182.1-182.N. For example, if a profile of the individual was created (e.g., at block 1004), the determination that the individual is not authorized may include: (i) receiving a profile of a person authorized to be in the vehicle; and/or (ii) comparing the profile of the person authorized to be in the vehicle with the profile of the individual to determine that the individual is not authorized to be in the vehicle.

In some implementations, the determination that the individual is not authorized to be in the vehicle 108, 182.1-182.N may include determining that the individual is: lighting a fire; smoking; committing an illegal activity; vandalizing the vehicle 108, 182.1-182.N; inebriated; and/or harming another person in the vehicle 108, 182.1-182.N.

In one aspect, the determination that the person is lighting a fire may be made by any suitable technique. For example, a smoke detector (e.g., built into the vehicle 108, 182.1-182.N, or carried separately by a passenger of the vehicle 108, 182.1-182.N) may be used to determine that there is a fire. In another example, image and/or video data from camera(s) on the vehicle 108, 182.1-182.N may be used to determine that the person is lighting a fire. In another example, the determination may be made from audio data captured aboard the vehicle 108, 182.1-182.N (e.g., a passenger on the vehicle 108, 182.1-182.N screams "fire"). In yet another example, temperature data (e.g., from a thermocouple, infrared temperature sensor, or any other type of temperature sensor aboard the vehicle 108, 182.1-182.N) may be used. In yet another example, audio data from on board the vehicle 108, 182.1-182.N may be analyzed to determine that there is a fire. In still another example, the determination may be made based upon an indication sent from a computing device 184.1, 184.2; for instance, a passenger taps a button on an app to indicate that there is a fire.

Moreover, any of these techniques may be combined to determine that there is a fire aboard the vehicle 108, 182.1-182.N. For example, the system may determine that there is a fire when both: (i) image data indicates some evidence of a fire, and (ii) the temperature aboard the vehicle passes a threshold. In another example, if the temperature passes a threshold, passengers aboard the vehicle 108, 182.1-182.N may be prompted with a question asking if there is a fire aboard the vehicle 108, 182.1-182.N.

Somewhat analogously, the determination that the person is smoking may be made by any suitable technique. For example, image and/or video data from on board the vehicle 108, 182.1-182.N may be analyzed to determine that the person is smoking. In another example, a passenger may use a computing device 184.1, 184.2 to report another passenger that is smoking. In yet another example, a smoke detector may be employed to help determine if a passenger is smoking.

The determination that a person is committing an illegal activity may also be made by any suitable technique. For example, image and/or video data may be used; for instance, this data may be used to determine that one passenger is selling or purchasing an illegal substance. In another instance, the image and/or video data may be analyzed to determine that a passenger is not wearing a mask (e.g., to help prevent the spread of a virus) in a jurisdiction with a mask requirement; in this regard, GPS data or any other kind of data may be used to determine what jurisdiction the vehicle 108, 182.1-182.N is located in.

In another example, one passenger may use a computing device 184.1, 184.2 to report another passenger that is committing an illegal activity. In yet another example, audio data from the vehicle 108, 182.1-182.N may be used (e.g., a passenger screams for help because she is being attacked; a passenger yells that another passenger has a gun; etc.).

The determination that the person is vandalizing the vehicle 108, 182.1-182.N may also be made by any suitable technique. For example, image and/or video data may be analyzed to make this determination. In another example, a passenger may use a computing device 184.1, 184.2 to report another passenger vandalizing the vehicle 108, 182.1-182.N. In yet another example, audio data from the vehicle 108, 182.1-182.N may be used (e.g., a passenger says "stop tearing the seats").

The determination that the person is inebriated may also be made by any suitable technique. For example, image and/or video data may be analyzed to make this determination. In another example, a passenger may use a computing device 184.1, 184.2 to report another passenger that is inebriated. In yet another example, audio data from the vehicle 108, 182.1-182.N may be used (e.g., a passenger says "she's drunk").

The determination that the person is harming another person in the vehicle 108, 182.1-182.N may also be made by any suitable technique. For example, image and/or video data may be analyzed to make this determination. In another example, a passenger may use a computing device 184.1, 184.2 to report another passenger harming another person on the vehicle 108, 182.1-182.N. In yet another example, audio data from the vehicle 108, 182.1-182.N may be used (e.g., a passenger says "she's being attacked").

In some embodiments, the determination that the individual is not authorized to be in the vehicle may include receiving a short-range wireless communication (e.g., Bluetooth) from a mobile device 184 of the individual.

In some embodiments, the determination that the individual is not authorized to be in the vehicle may include receiving biometric data of the individual.

At block 1008, based upon the determination that the individual is not authorized to be in the vehicle 108, 182.1-182.N, an alert may be transmitted, or a control of the vehicle 108, 182.1-182.N may be adjusted. In some embodiments, the transmitting an alert or the adjusting control of the vehicle 108, 182.1-182.N may comprise applying brakes of the vehicle 108, 182.1-182.N, and/or opening a door of the vehicle 108, 182.1-182.N.

In scenarios where it has been detected that the unauthorized individual is attempting to enter the vehicle 108, 182.1-182.N, the adjusting control of the vehicle may include locking a door(s) of the vehicle 108, 182.1-182.N, thereby preventing the unauthorized individual from entering the vehicle.

In some embodiments, the transmitting an alert or the adjusting control of the vehicle 108, 182.1-182.N may include disabling the vehicle 108, 182.1-182.N. For instance, the transmitting an alert or the adjusting control of the vehicle 108, 182.1-182.N may comprise disabling the vehicle 108, 182.1-182.N by: ceasing to supply power to at least one component of an engine of the vehicle; and/or applying brakes of the vehicle.

In some implementations, the transmitting an alert or the adjusting control of the vehicle 108, 182.1-182.N may include sending an alert to a law enforcement agency. In some embodiments, the transmitting an alert or the adjusting control of the vehicle 108, 182.1-182.N may include sending, to a law enforcement agency, a video stream depicting an interior of the vehicle. The alert may be transmitted to the law enforcement agency by any suitable technique; for instance, through the network 130, not through the audible or visible spectrum.

In some embodiments, the transmitting an alert or the adjusting control of the vehicle 108, 182.1-182.N may include sending, to a mobile computing device 184 of the individual, an alert informing the individual that the individual is not authorized to be in the vehicle. In some embodiments, the alert may be transmitted to the mobile computing device 184 through a short range communication technique, such as Bluetooth. In other embodiments, the mobile computing device 184 may be physically connected (e.g., with a cable) to the vehicle 108, 182.1-182.N (e.g., a passenger is charging her smartphone), and the alert may be sent through the cable to the mobile computing device 184.

In some embodiments, the transmitting an alert or the adjusting control of the vehicle 108, 182.1-182.N may include activating an auditory alarm system (e.g., including speakers of the vehicle 108, 182.1-182.N) of the vehicle 108, 182.1-182.N to inform passengers of the vehicle to exit the vehicle because of a dangerous situation.

In some embodiments, the alert may also be broadcast to inform people outside of the vehicle. For example, the alert may cause lights on the outside of the vehicle to illuminate; and/or an auditory alert may be broadcast outside of the vehicle (e.g., speakers on the outside of the vehicle to inform an individual attempting to initiate entry to the vehicle that the individual is not authorized to enter the vehicle). In an example of the auditory alert, speakers on the outside of the vehicle may broadcast: "warning—there is an unauthorized individual in this autonomous vehicle." This may cause law enforcement in the area to approach the vehicle.

In some embodiments, the transmitting an alert or the adjusting control of the vehicle 108, 182.1-182.N may include audibly broadcasting an instruction (e.g., through speakers of the vehicle 108, 182.1-182.N) for the individual to exit the vehicle 108, 182.1-182.N; in this regard, the audibly broadcasted instruction may include a name of the individual, may be above a predetermined decibel level, and/or may be repeated at least a threshold number of times.

By audibly broadcasting the alert at a volume above a predetermined decibel level, the alert may be so loud that the individual cannot comfortably remain within the vehicle 108, 182.1-182.N. Also, by repeating the alert at least a threshold number of times, the alert may irritate the individual causing the individual to exit the vehicle 108, 182.1-182.N. In this manner, the vehicle 108, 182.1-182.N may cause the individual to exit the vehicle 108, 182.1-182.N without forcibly removing the individual from the vehicle 108, 182.1-182.N.

Exemplary Methods of Determining Risk Using Telematics Data

As described herein, telematics data may be collected and used in monitoring, controlling, evaluating, and assessing risks associated with autonomous or semi-autonomous operation of a vehicle 108. In some embodiments, the Data Application installed on the mobile computing device 110 and/or on-board computer 114 may be used to collect and transmit data regarding vehicle operation. This data may include operating data regarding operation of the vehicle 108, autonomous operation feature settings or configurations, sensor data (including location data), data regarding the type or condition of the sensors 120, telematics data regarding vehicle regarding operation of the vehicle 108, environmental data regarding the environment in which the vehicle 108 is operating (e.g., weather, road, traffic, construction, or other conditions). Such data may be transmitted from the vehicle 108 or the mobile computing device 110 via radio links 183 (and/or via the network 130) to the server 140.

The server 140 may receive the data directly or indirectly (i.e., via a wired or wireless link 183e to the network 130) from one or more vehicles 182 or mobile computing devices 184. Upon receiving the data, the server 140 may process the data to determine one or more risk levels associated with the vehicle 108.

In some embodiments, a plurality of risk levels associated with operation of the vehicle 108 may be determined based upon the received data, using methods similar to those discussed elsewhere herein, and a total risk level associated with the vehicle 108 may be determined based upon the plurality of risk levels. In other embodiments, the server 140 may directly determine a total risk level based upon the received data. Such risk levels may be used for vehicle navigation, vehicle control, control hand-offs between the vehicle and driver, settings adjustments, driver alerts, accident avoidance, insurance policy generation or adjustment, and/or other processes as described elsewhere herein.

In some aspects, computer-implemented methods for monitoring the use of a vehicle 108 having one or more autonomous operation features and/or adjusting an insurance policy associated with the vehicle 108 may be provided. In some embodiments, the mobile computing device 110 and/or on-board computer 114 may have a Data Application installed thereon, as described above. Such Data Application may be executed by one or more processors of the mobile computing device 110 and/or on-board computer 114 to, with the customer's permission or affirmative consent, collect the sensor data, determine the telematics data, receive the feature use levels, and transmit the information to the remote server 140. The Data Application may similarly perform or cause to be performed any other functions or operations described herein as being controlled by the mobile computing device 110 and/or on-board computer 114.

The telematics data may include data regarding one or more of the following regarding the vehicle 108: acceleration, braking, speed, heading, and/or location. The telematics data may further include information regarding one or more of the following: time of day of vehicle operation, road conditions in a vehicle environment in which the vehicle is operating, weather conditions in the vehicle environment, and/or traffic conditions in the vehicle environment. In some embodiments, the one or more sensors 120 of the mobile computing device 110 may include one or more of the following sensors disposed within the mobile computing device 110: an accelerometer array, a camera, a microphone, and/or a geolocation unit (e.g., a GPS receiver). In further embodiments, one or more of the sensors 120 may be communicatively connected to the mobile computing device 110 (such as through a wireless communication link).

The feature use levels may be received by the mobile computing device 110 from the on-board computer 114 via yet another radio link 183 between the mobile computing device 110 and the on-board computer 114, such as link 116. The feature use levels may include data indicating adjustable settings for at least one of the one or more autonomous operation features. Such adjustable settings may affect operation of the at least one of the one or more autonomous operation features in controlling an aspect of vehicle operation, as described elsewhere herein.

In some embodiments, the method may further including receiving environmental information regarding the vehicle's environment at the mobile computing device 110 and/or on-board computer 114 via another radio link 183 or wireless communication channel. Such environmental information may also be transmitted to the remote server 140 via the radio link 183 and may be used by the remote server 140 in determining the total risk level. In some embodiments, the remote server 140 may receive part or all of the environmental information through the network 130 from sources other than the mobile computing device 110 and/or on-board computer 114. Such sources may include third-party data sources, such as weather or traffic information services.

The environmental data may include one or more of the following: road conditions, weather conditions, nearby traffic conditions, type of road, construction conditions, location of pedestrians, movement of pedestrians, movement of other obstacles, signs, traffic signals, or availability of autonomous communications from external sources. The environmental data may similarly include any other data regarding a vehicle environment described elsewhere herein.

In further embodiments, the method may include collecting addition telematics data and/or information regarding feature use levels at a plurality of additional mobile computing devices 184 associated with a plurality of additional vehicles 182. Such additional telematics data and/or information regarding feature use levels may be transmitted from the plurality of additional mobile computing devices 184 to the remote server 140 via a plurality of radio links 183 and received at one or more processors of the remote server 140. The remote server 140 may further base the determination of the total risk level at least in part upon the additional telematics data and/or feature use levels. Some embodiments of the methods described herein may include determining, adjusting, generating, rating, or otherwise performing actions necessary for creating or updating an insurance policy associated with the vehicle 108.

Autonomous Vehicle Insurance Policies

The disclosure herein relates in part to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator control other aspects of the operation of the vehicle.

The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator. Operating input from a vehicle operator excludes selection of a destination or selection of settings relating to the one or more autonomous operation features. Autonomous and semi-autonomous vehicles and operation features may be classified using the five degrees of automation described by the National Highway Traffic Safety Administration.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals.

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Autonomous Automobile Insurance

Some aspects of some embodiments described herein may relate to assessing and pricing insurance based upon autonomous (or semi-autonomous) operation of the vehicle 108. Risk levels and/or insurance policies may be assessed, generated, or revised based upon the use of autonomous operation features or the availability of autonomous operation features in the vehicle 108. Additionally, risk levels and/or insurance policies may be assessed, generated, or revised based upon the effectiveness or operating status of the autonomous operation features (i.e., degree to which the features are operating as intended or are impaired, damaged, or otherwise prevented from full and ordinary operation). Thus, information regarding the capabilities or effectiveness of the autonomous operation features available to be used or actually used in operation of the vehicle 108 may be used in risk assessment and insurance policy determinations.

Insurance providers currently develop a set of rating factors based upon the make, model, and model year of a vehicle. Models with better loss experience receive lower factors, and thus lower rates. One reason that this current rating system cannot be used to assess risk for vehicles using autonomous technologies is that many autonomous operation features vary for the same vehicle model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle. The present embodiments may assess and price insurance risks at least in part based upon autonomous operation features that replace actions of the driver. In a way, the vehicle-related computer instructions and artificial intelligence may be viewed as a "driver."

Insurance policies, including insurance premiums, discounts, and rewards, may be updated, adjusted, and/or determined based upon hardware or software functionality, and/or hardware or software upgrades, associated with autonomous operation features. Insurance policies, including insurance premiums, discounts, etc. may also be updated, adjusted, and/or determined based upon the amount of usage and/or the type(s) of the autonomous or semi-autonomous technology employed by the vehicle. In one embodiment, performance of autonomous driving software and/or sophistication of artificial intelligence utilized in the autonomous operation features may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous operation features, artificial intelligence capabilities, rather than human decision making, may be evaluated to determine the relative risk of the insurance policy. This evaluation may be conducted using multiple techniques. Autonomous operation feature technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision. Additionally, actual loss experience of the software in question may be analyzed. Vehicles with superior artificial intelligence and crash avoidance capabilities may experience lower insurance losses in real driving situations. Results from both the test environment and/or actual insurance losses may be compared to the results of other autonomous software packages and/or vehicles lacking autonomous operation features to determine relative risk levels or risk factors for one or more autonomous operation features. To determine such risk levels or factors, the control decisions generated by autonomous operation features may be assessed to determine the degree to which actual or shadow control decisions are expected to succeed in avoiding or mitigating vehicle accidents. This risk levels or factors may be applicable to other vehicles that utilize the same or similar autonomous operation features and may, in some embodiments, be applied to vehicle utilizing similar features (such as other software versions), which may require adjustment for differences between the features.

Emerging technology, such as new iterations of artificial intelligence systems or other autonomous operation features, may be priced by combining an individual test environment assessment with actual losses corresponding to vehicles with similar autonomous operation features. The entire vehicle software and artificial intelligence evaluation process may be conducted with respect to each of various autonomous operation features. A risk level or risk factor associated with the one or more autonomous operation features of the vehicle could then be determined and applied when pricing insurance for the vehicle. In some embodiments, the driver's past loss experience and/or other driver risk characteristics may not be considered for fully autonomous vehicles, in which all driving decisions are made by the vehicle's artificial intelligence. Risks associated with the driver's operation of the vehicle may, however, be included in embodiments in which the driver controls some portion of vehicle operation in at least some circumstances.

In one embodiment, a separate portion of the automobile insurance premium may be based explicitly on the effectiveness of the autonomous operation features. An analysis of how the artificial intelligence of autonomous operation features facilitates avoiding accidents and/or mitigates the severity of accidents in order to build a database and/or model of risk assessment. After which, automobile insurance risk and/or premiums (as well as insurance discounts, rewards, and/or points) may be adjusted based upon autonomous or semi-autonomous vehicle functionality, such as by individual autonomous operation features or groups thereof. In one aspect, an evaluation may be performed of how artificial intelligence, and the usage thereof, impacts automobile accidents and/or automobile insurance claims. Such analysis may be based upon data from a plurality of autonomous vehicles operating in ordinary use, or the analysis may be based upon tests performed upon autonomous vehicles and/or autonomous operation feature test units.

The adjustments to automobile insurance rates or premiums based upon the autonomous or semi-autonomous vehicle-related functionality or technology may take into account the impact of such functionality or technology on the likelihood of a vehicle accident or collision occurring or upon the likely severity of such accident or collision. For instance, a processor may analyze historical accident information and/or test data involving vehicles having autonomous or semi-autonomous functionality. Factors that may be analyzed and/or accounted for that are related to insurance risk, accident information, or test data may include the following: (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Automobile insurance premiums, rates, discounts, rewards, refunds, points, etc. may be adjusted based upon the percentage of time or vehicle usage that the vehicle is the driver, i.e., the amount of time a specific driver uses each type of autonomous operation feature. In other words, insurance premiums, discounts, rewards, etc. may be adjusted based upon the percentage of vehicle usage during which the autonomous or semi-autonomous functionality is in use. For example, automobile insurance risks, premiums, discounts, etc. for an automobile having one or more autonomous operation features may be adjusted and/or set based upon the percentage of vehicle usage that the one or more individual autonomous operation features are in use, which may include an assessment of settings used for the autonomous operation features. In some embodiments, such automobile insurance risks, premiums, discounts, etc. may be further set or adjusted based upon availability, use, or quality of Vehicle-to-Vehicle (V2V) wireless communication to a nearby vehicle also employing the same or other type(s) of autonomous communication features.

Insurance premiums, rates, ratings, discounts, rewards, special offers, points, programs, refunds, claims, claim amounts, etc. may be adjusted for, or may otherwise take into account, the foregoing functionalities, technologies, or aspects of the autonomous operation features of vehicles, as described elsewhere herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Other Matters

In some aspect, customers may opt-in to a rewards, loyalty, or other program. The customers may allow a remote server to collect sensor, telematics, vehicle, mobile device, smart home, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis. The other functionality discussed herein may also be provided to customers in return for them allowing collection and analysis of the types of data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods for autonomous vehicle services and operations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for optimizing delivery routes and delivering loads using a combination of one or more autonomous or semi-autonomous vehicles and one or more drones, comprising:
    determining, by one or more processors, a destination location for transporting a first load from a starting location;
    determining, by the one or more processors, a first route for one or more autonomous or semi-autonomous vehicles to transport the first load;
    causing, by the one or more processors, the autonomous or semi-autonomous vehicle to transport the first load to the destination location along the first route;
    determining, by the one or more processors and after the autonomous or semi-autonomous vehicle has begun to transport the first load, that a second load is to be transported from the starting location to the destination location;
    determining, by the one or more processors, a second route for one or more drones to transport the second load to the autonomous or semi-autonomous vehicle at an intermediate location that intersects with the first route; and
    causing, by the one or more processors, the one or more drones to transport the second load along the second route to the autonomous or semi-autonomous vehicle at the intermediate location.

2. The computer-implemented method of claim 1, wherein:
    the first route is determined based upon at least one of: (i) geographical data for a geographic area including the starting location and the destination location, or (ii) one or more vehicle characteristics of the one or more autonomous or semi-autonomous vehicles; and
    the second route is determined based upon at least one of: (i) the geographical data and (ii) one or more vehicle characteristics of the one or more drones.

3. The computer-implemented method of claim 1, wherein the one or more drones are one or more first drones and further comprising causing, by the one or more processors, the one or more autonomous or semi-autonomous vehicles to transport one or more second drones along the first route.

4. The computer-implemented method of claim 3, further comprising:
    determining, by the one or more processors, a third route for the one or more second drones to transport the first or second loads, wherein the third route intersects with the first route at a drop-off location; and
    causing, by the one or more processors, the one or more second drones to transport the first or second loads from the drop-off location to the destination location along the third route.

5. The computer-implemented method of claim 4, wherein:
    the drop-off location is adjacent to the destination location; and
    the one or more second drones transport the first or second loads to an entrance of the destination location.

6. The computer-implemented method of claim 1, further comprising:
    in response to the one or more drones transporting at least the second load, receiving a verbal command directed to the one or more drones; and
    performing, by the or more drones, one or more tasks based upon the verbal command.

7. The computer-implemented method of claim 1, further comprising:
    determining, by the one or more processors, one or more physical characteristics of the second load;
    determining, by the one or more processors, a number of drones necessary to deliver the second load to the intermediate location within a user-determined time frame based upon the one or more physical characteristics of the second load; and
    determining, by the one or more processors, whether the autonomous or semi-autonomous vehicle is capable of carrying the first and second loads and the determined number of drones based upon at least the one or more physical characteristics of the first and second loads.

8. A computer system configured to optimize delivery routes and deliver loads using a combination of one or more autonomous or semi-autonomous vehicles and one or more drones, the computer system comprising one or more local or remote processors, transceivers, and/or sensors configured to:
    determine a destination location for transporting a first load from a starting location;
    determine a first route for one or more autonomous or semi-autonomous vehicles to transport the first load;
    cause the autonomous or semi-autonomous vehicle to transport the first load to the destination location along the first route;

determine, after the autonomous or semi-autonomous vehicle has begun to transport the first load, that a second load is to be transported from the starting location to the destination location;

determine a second route for one or more drones to transport the second load to the autonomous or semi-autonomous vehicle at an intermediate location that intersects with the first route; and cause the one or more drones to transport the second load along the second route to the autonomous or semi-autonomous vehicle at the intermediate location.

9. The computer system of claim 8, wherein:

the first route is determined based upon at least one of: (i) geographical data for a geographic area including the starting location and the destination location, or (ii) one or more vehicle characteristics of the one or more autonomous or semi-autonomous vehicles; and the second route is determined based upon at least one of: (i) the geographical data and (ii) one or more vehicle characteristics of the one or more drones.

10. The computer system of claim 8, wherein the one or more drones are one or more first drones and the one or more local or remote processors, transceivers, and/or sensors are further configured to cause the one or more autonomous or semi-autonomous vehicles to transport one or more second drones along the first route.

11. The computer system of claim 10, wherein the one or more local or remote processors, transceivers, and/or sensors are further configured to:

determine a third route for the one or more second drones to transport the first or second loads, wherein the third route intersects with the first route at a drop-off location; and cause the one or more second drones to transport the first or second loads from the drop-off location to the destination location along the third route.

12. The computer system of claim 11, wherein:

the drop-off location is adjacent to the destination location; and the one or more second drones transport the first or second loads to an entrance of the destination location.

13. The computer system of claim 8, wherein the one or more local or remote processors, transceivers, and/or sensors are further configured to:

in response to the one or more drones transporting at least the second load, receive a verbal command directed to the one or more drones; and perform, by the or more drones, one or more tasks based upon the verbal command.

14. The computer system of claim 8, wherein the one or more local or remote processors, transceivers, and/or sensors are further configured to:

determine one or more physical characteristics of the second load;

determine a number of drones necessary to deliver the second load to the intermediate location within a user-determined time frame based upon the one or more physical characteristics of the second load; and determine whether the autonomous or semi-autonomous vehicle is capable of carrying the first and second loads and the determined number of drones based upon at least the one or more physical characteristics of the first and second loads.

15. A non-transitory computer-readable medium storing thereon a set of instructions that, when executed by one or more processors, causes the one or more processors to:

determine a destination location for transporting a first load from a starting location;

determine a first route for one or more autonomous or semi-autonomous vehicles to transport the first load;

cause the autonomous or semi-autonomous vehicle to transport the first load to the destination location along the first route;

determine, after the autonomous or semi-autonomous vehicle has begun to transport the first load, that a second load is to be transported from the starting location to the destination location;

determine a second route for one or more drones to transport the second load to the autonomous or semi-autonomous vehicle at an intermediate location that intersects with the first route; and cause the one or more drones to transport the second load along the second route to the autonomous or semi-autonomous vehicle at the intermediate location.

16. The non-transitory computer-readable medium of claim 15, wherein:

the first route is determined based upon at least one of: (i) geographical data for a geographic area including the starting location and the destination location, or (ii) one or more vehicle characteristics of the one or more autonomous or semi-autonomous vehicles; and the second route is determined based upon at least one of: (i) the geographical data and (ii) one or more vehicle characteristics of the one or more drones.

17. The non-transitory computer-readable medium of claim 15, wherein the one or more drones are one or more first drones and the instructions further cause the one or more processors to cause the one or more autonomous or semi-autonomous vehicles to transport one or more second drones along the first route.

18. The non-transitory computer-readable medium of claim 17, wherein the instructions further cause the one or more processors to:

determine a third route for the one or more second drones to transport the first or second loads, wherein the third route intersects with the first route at a drop-off location; and cause the one or more second drones to transport the first or second loads from the drop-off location to the destination location along the third route.

19. The non-transitory computer-readable medium of claim 18, wherein:

the drop-off location is adjacent to the destination location; and the one or more second drones transport the first or second loads to an entrance of the destination location.

20. The non-transitory computer-readable medium of claim 15, wherein the instructions further cause the one or more processors to:

determine one or more physical characteristics of the second load;

determine a number of drones necessary to deliver the second load to the intermediate location within a user-determined time frame based upon the one or more physical characteristics of the second load; and determine whether the autonomous or semi-autonomous vehicle is capable of carrying the first and second loads and the determined number of drones based upon at least the one or more physical characteristics of the first and second loads.

* * * * *